United States Patent
Yoshioka et al.

(10) Patent No.: US 8,131,467 B2
(45) Date of Patent: Mar. 6, 2012

(54) ROUTE INFORMATION DISPLAY DEVICE AND ROUTE INFORMATION DISPLAY METHOD

(75) Inventors: Mototaka Yoshioka, Osaka (JP); Jun Ozawa, Nara (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/048,049

(22) Filed: Mar. 13, 2008

(65) Prior Publication Data

US 2008/0177462 A1 Jul. 24, 2008

Related U.S. Application Data

(63) Continuation of application No. 11/918,604, filed as application No. PCT/JP2006/322858 on Nov. 16, 2006.

(30) Foreign Application Priority Data

Dec. 7, 2005 (JP) .................................. 2005-354052

(51) Int. Cl.
*G01C 21/00* (2006.01)
(52) U.S. Cl. ........ 701/437; 701/411; 701/414; 701/417; 701/418; 701/423; 701/424; 701/425; 701/465
(58) Field of Classification Search .................. 701/117, 701/200, 201, 204, 208–210; 340/995.1, 340/995.12–995.14, 995.27
See application file for complete search history.

(56) References Cited

U.S. PATENT DOCUMENTS

| | | | |
|---|---|---|---|
| 5,845,228 A | * | 12/1998 | Uekawa et al. ............... 701/209 |
| 5,906,654 A | * | 5/1999 | Sato .............................. 701/210 |
| 6,016,485 A | * | 1/2000 | Amakawa et al. ............ 705/400 |
| 6,064,941 A | | 5/2000 | Nimura et al. |
| 6,098,015 A | | 8/2000 | Nimura et al. |
| 6,223,124 B1 | * | 4/2001 | Matsuno et al. .............. 701/209 |

(Continued)

FOREIGN PATENT DOCUMENTS

EP 0 803 705 10/1997

(Continued)

OTHER PUBLICATIONS

International Search Report issued Feb. 13, 2007 in the International (PCT) Application of which the present application is the U.S. National Stage.

(Continued)

*Primary Examiner* — Jack W Keith
*Assistant Examiner* — Adam Tissot
(74) *Attorney, Agent, or Firm* — Wenderoth, Lind & Ponack, L.L.P.

(57) ABSTRACT

A route information display device calculates a branch point in routes to a plurality of inputted destinations, and uses the branch point to control information modes. A route information display device includes: a departure point input unit that detects a current location of the user; a multiple destination input unit that accepts input of a plurality of destinations; a route search unit that searches for respective routes from the current location to the plurality of destinations; a branch point calculation unit that calculates a branch point of the respective searched routes; and a route information display unit that displays information regarding routes to the branch point and information regarding routes beyond the branch point in different modes, wherein the route information display device supports easy comprehension of information by the user by calculating a branch point of a plurality of inputted destinations and providing information in consideration of the branch point.

3 Claims, 59 Drawing Sheets

U.S. PATENT DOCUMENTS

| | | |
|---|---|---|
| 6,771,189 B2 | 8/2004 | Yakota |
| 6,832,139 B2 * | 12/2004 | Johnson et al. ................ 701/23 |
| 7,496,484 B2 * | 2/2009 | Agrawala et al. ................ 703/2 |
| 2002/0188400 A1 | 12/2002 | Sato et al. |
| 2003/0028319 A1 | 2/2003 | Khavakh et al. |
| 2003/0158658 A1 * | 8/2003 | Hoever et al. ................ 701/209 |
| 2005/0033511 A1 | 2/2005 | Pechatnikov et al. |
| 2005/0149253 A1 * | 7/2005 | Nambata ................ 701/201 |
| 2005/0187707 A1 * | 8/2005 | Yokota et al. ................ 701/209 |

FOREIGN PATENT DOCUMENTS

| | | |
|---|---|---|
| EP | 0 833 291 | 4/1998 |
| JP | 09-287969 | 11/1997 |
| JP | 10-153449 | 6/1998 |
| JP | 11-149596 | 6/1999 |
| JP | 2000-304560 | 11/2000 |
| JP | 2002-243486 | 8/2002 |
| JP | 2003-344074 | 12/2003 |
| JP | 2003344074 A * | 12/2003 |
| JP | 2004-132884 | 4/2004 |
| JP | 2004-177209 | 6/2004 |
| JP | 2005-912249 | 4/2005 |
| JP | 2005-189056 | 7/2005 |
| JP | 2005-201726 | 7/2005 |
| JP | 2005201726 A * | 7/2005 |
| JP | 2005-283575 | 10/2005 |

OTHER PUBLICATIONS

Japanese Office Action(in Japanese language) issued for corresponding Japanese patent application No. 2007-513546.

U.S. Office Action issued Dec. 17, 2010 in U.S. Appl. No. 11/918,604.

Office Action dated Feb. 2, 2011, issued in related U.S. Appl. No. 12/047,925.

U.S. Office Action dated May 11, 2011, issued in related U.S. Appl. No. 12/047,925.

Office Action dated Sep. 13, 2011 in U.S. Appl. No. 11/918,604, filed Oct. 16, 2007 (Yoshioka et al.).

* cited by examiner

FIG. 4

| Searched route ID | Destination | | | | | | | |
|---|---|---|---|---|---|---|---|---|
| 01 | Miyazato Golf Course | Hana 1 Machi | Hana 2 Machi | No. 111 | Hanahi-gashi IC | Ohigashi IC | | ... |
| | | 8:45 | 8:50 | 8:56 | 9:15 | 9:30 | | ... |
| 02 | Sakura Golf Course | Hana 1 Machi | Hana 2 Machi | No. 111 | Hanahi-gashi IC | Kawami-chi IC | | ... |
| | | 8:45 | 8:50 | 8:56 | 9:15 | 9:45 | | ... |
| ... | | ... | ... | ... | ... | ... | | |

← Branch point

FIG. 6

| Category | Mode format | Display item | | | | |
|---|---|---|---|---|---|---|
| Golf course | Contrast map format | Branch point arrival time | Estimated time of arrival | Hole details | Course fees | |
| Restaurant | Contrast menu format | Branch point arrival time | Estimated time of arrival | Business hours | Availability of parking lot | Recommended dishes |
| Supermarket | Contrast menu format | Branch point arrival time | Estimated time of arrival | Business hours | Availability of parking lot | Daily special |
| .. | .. | .. | .. | .. | .. | .. |

FIG. 18

| Travel history ID | Time and date | Departure point | Destination | Route | | | | | | |
|---|---|---|---|---|---|---|---|---|---|---|
| | | | | Hana 1 Machi | Hana 2 Machi | No. 111 | Yamano 2 Machi | Yamano 3 Machi | ... | |
| 01 | 03/8/12 | Home | Miyazato Golf Course | 8:45 | 8:50 | 8:56 | 9:05 | 9:30 | ... | ... |
| 02 | ... | ... | ... | ... | ... | ... | ... | ... | ... | ... |
| | | | | Hana 1 Machi | Raku Intersection | Midori 1 Machi | Midori 2 Machi | Midori 3 Machi | ... | |
| 05 | 03/8/30 | Home | Super Donkey | 17:45 | 17:50 | 17:56 | 18:00 | 18:10 | ... | ... |
| 06 | ... | ... | ... | ... | ... | ... | ... | ... | ... | ... |

FIG. 19

| Searched route ID | Destination | | | | | | | |
|---|---|---|---|---|---|---|---|---|
| 01 | Miyazato Golf Course | Hana 1 Machi | Hana Machi IC | Hanahi-gashi IC | Ohigashi IC | ... | ... | ... |
| | | 8:45 | 8:50 | 9:15 | 9:30 | ... | ... | ... |
| 02 | Sakura Golf Course | Hana 1 Machi | Hana Machi IC | Hanahi-gashi IC | Kawami-chi IC | ... | ... | ... |
| | | 8:45 | 8:50 | 9:15 | 9:45 | ... | ... | ... |
| ... | ... | ... | ... | ... | ... | ... | ... | ... |

← Branch point (at Hanahi-gashi IC, 9:15)

FIG. 29

| Searched route ID | Destination | Route | | | | | | |
|---|---|---|---|---|---|---|---|---|
| 01 | Karaoke Dom | Raku 1 Machi | Raku 2 Machi | Raku Dori 1 | Karaoke Dom | ... | ... | ... |
| | | 0:05 | 0:10 | 0:20 | 0:25 | ... | ... | ... |
| 02 | Star Bowling | Raku 1 Machi | Raku 3 Machi | Raku 4 Machi | Kyo 4 Machi | Kyo 3 Machi | Star Bowling | ... |
| | | 0:05 | 0:07 | 0:10 | 0:20 | 0:25 | 0:27 | ... |
| ... | ... | ... | ... | ... | ... | ... | ... | ... |

FIG. 31

| Searched route ID | Destination | Route | | | | | | |
|---|---|---|---|---|---|---|---|---|
| 01 | Karaoke Dom | Raku 1 Machi | Raku 2 Machi | Raku Dori 1 | Karaoke Dom | ... | | ... |
| | | 0:05 | 0:10 | 0:20 | 0:25 | | | ... |
| 02 | Star Bowling | Raku 1 Machi | Hana 3 Machi | Raku 4 Machi | Kyo 4 Machi | Kyo 3 Machi | Star Bowling | ... |
| | | 0:05 | 0:07 | 0:10 | 0:20 | 0:25 | 0:27 | ... |
| 03 | Star Bowling | Raku 1 Machi | Raku 2 Machi | Raku 4 Machi | Kyo 4 Machi | Kyo 3 Machi | Star Bowling | ... |
| | | 0:05 | 0:10 | 0:12 | 0:22 | 0:27 | 0:29 | ... |
| 04 | Star Bowling | Raku 1 Machi | Raku 2 Machi | Raku Dori 1 | Kyo 3 Machi | Star Bowling | ... | ... |
| | | 0:05 | 0:10 | 0:20 | 0:35 | 0:37 | ... | ... |
| ... | ... | ... | ... | ... | ... | ... | ... | ... |

FIG. 33

| Searched route ID | Destination | Route | | | | | | | |
|---|---|---|---|---|---|---|---|---|---|
| 01 | Karaoke Dom | Raku 1 Machi | Raku 2 Machi | Raku Dori 1 | Karaoke Dom | ... | ... | ... | ... |
| | | 0:05 | 0:10 | 0:20 | 0:25 | ... | ... | ... | ... |
| 02 | Star Bowling | Raku 1 Machi | Hana 3 Machi | Raku 4 Machi | Kyo 4 Machi | Kyo 3 Machi | Star Bowling | ... | ... |
| | | 0:05 | 0:07 | 0:10 | 0:20 | 0:25 | 0:27 | ... | ... |
| 05 | Star Bowling | Raku 1 Machi | Raku 2 Machi | Raku Dori 1 | Karaoke Dom | Ura Raku 1 | Kyo 2 Machi | Kyo 3 Machi | Star Bowling |
| | | 0:05 | 0:10 | 0:20 | 0:25 | 0:26 | 0:28 | 0:30 | 0:32 |
| ... | ... | ... | ... | ... | ... | ... | ... | ... | ... |

FIG. 36

| Searched route ID | Destination | Route | | | | | | | |
|---|---|---|---|---|---|---|---|---|---|
| 01 | Karaoke Dom | Raku 1 Machi | Raku 2 Machi | Raku Dori 1 | Karaoke Dom | | | ... | |
| | | 0:05 | 0:10 | 0:20 | 0:25 | | | ... | |
| 02 | Star Bowling | Raku 1 Machi | Hana 3 Machi | Raku 4 Machi | Kyo 4 Machi | Kyo 3 Machi | Star Bowling | ... | |
| | | 0:05 | 0:07 | 0:10 | 0:20 | 0:25 | 0:27 | ... | |
| ... | | ... | ... | ... | ... | ... | ... | ... | |

FIG. 38

| Searched route ID | Destination | Route | | | | | | | | |
|---|---|---|---|---|---|---|---|---|---|---|
| 01 | Karaoke Dom | Raku 1 Machi | Raku 2 Machi | Raku Dori 1 | Karaoke Dom | ... | ... | ... | ... | ... |
| | | 0:05 | 0:10 | 0:20 | 0:25 | ... | ... | ... | ... | ... |
| 02 | Star Bowling | Raku 1 Machi | Hana 3 Machi | Raku 4 Machi | Kyo 4 Machi | Kyo 3 Machi | Star Bowling | ... | ... | ... |
| | | 0:05 | 0:07 | 0:10 | 0:20 | 0:25 | 0:27 | ... | ... | ... |
| 03 | Star Bowling | | Raku 2 Machi | Raku 4 Machi | Kyo 4 Machi | Kyo 3 Machi | Star Bowling | ... | ... | ... |
| | | | 0:10 | 0:12 | 0:22 | 0:27 | 0:29 | ... | ... | ... |
| 04 | Star Bowling | | | Raku Dori 1 | Kyo 3 Machi | Star Bowling | ... | ... | ... | ... |
| | | | | 0:20 | 0:35 | 0:37 | ... | ... | ... | ... |
| 05 | Star Bowling | | | | Karaoke Dom | Ura Raku 1 | Kyo 2 Machi | Kyo 3 Machi | Star Bowling | ... |
| | | | | | 0:25 | 0:26 | 0:28 | 0:30 | 0:32 | ... |
| ... | ... | ... | ... | ... | ... | ... | ... | ... | ... | ... |

FIG. 47

| Searched route ID | Destination | Route | | | | | | | | | | |
|---|---|---|---|---|---|---|---|---|---|---|---|---|
| 01 | Movie Theater A | Raku 1 Machi | Raku 2 Machi | Ura Raku 2 | Ura Raku 3 | Movie Theater A | ... | ... | ... | ... | ... | ... |
| | | 0:05 | 0:15 | 0:25 | 0:35 | 0:50 | ... | ... | ... | ... | ... | ... |
| 02 | Movie Theater B | Raku 1 Machi | Raku 3 Machi | Raku 4 Machi | Kyo 4 Machi | Movie Theater B | ... | ... | ... | ... | ... | ... |
| | | 0:05 | 0:10 | 0:20 | 0:35 | 0:40 | ... | ... | ... | ... | ... | ... |
| 03 | Movie Theater B | | Raku 2 Machi | Raku Dori 1 | Kyo 3 Machi | Kyo 4 Machi | Movie Theater B | ... | ... | ... | ... | ... |
| | | | 0:15 | 0:20 | 0:35 | 0:40 | 0:45 | ... | ... | ... | ... | ... |
| 04 | Movie Theater B | | | Ura Raku 2 | Ura Raku 4 | Kyo 2 Machi | Kyo 3 Machi | Kyo 4 Machi | Movie Theater B | ... | ... | ... |
| | | | | 0:25 | 0:30 | 0:40 | 0:45 | 0:50 | 0:55 | ... | ... | ... |
| 05 | Movie Theater B | | | | Ura Raku 3 | Kyo 1 Machi | Kyo 2 Machi | Kyo 3 Machi | Kyo 4 Machi | Movie Theater B | ... | |
| | | | | | 0:35 | 0:60 | 0:80 | 0:85 | 0:90 | 0:95 | ... | |
| ... | ... | ... | ... | ... | ... | ... | ... | ... | ... | ... | ... | ... |

FIG. 53

| Category | Duration of stay |
|---|---|
| Fastfood | 15 minutes |
| Restaurant | 1 hour |
| Movie theater | 2 hours |
| Bowling | 1 hour |

FIG. 55

| Travel history ID | Time and date | Departure point | Destination | Route | | | | |
|---|---|---|---|---|---|---|---|---|
| | | | | | Home | Hana 1 Machi | Hana 2 Machi | Macdoness Burgers |
| 01 | 06/9/10 | Home | Macdoness Burgers | | 9:40 | 9:45 | 9:50 | 10:00 |
| 02 | 06/9/10 | Macdoness Burgers | Star Bowling | | Macdoness Burgers | Ura Raku | Star Bowling | ... |
| | | | | | 10:18 | 10:30 | 10:41 | ... |
| ... | ... | ... | ... | | ... | ... | ... | ... |

ROUTE INFORMATION DISPLAY DEVICE AND ROUTE INFORMATION DISPLAY METHOD

This application is a continuation application of Ser. No. 11/918,604, filed Oct. 16, 2007, which is the National Stage of International Application No. PCT/JP2006/322858 filed Nov. 16, 2008.

BACKGROUND OF THE INVENTION

TECHNICAL FIELD

The present invention relates to a destination display device that displays a destination of a user, and is applied, in particular, to a destination display device applied to a mobile terminal device such as a vehicle navigation system (hereinafter referred to as a car navigation system).

BACKGROUND ART

Conventionally, there is a device that displays information related to final destinations corresponding to a searched keyword, such as "restaurant", inputted at a mobile terminal such as a car navigation system (Patent Reference 1). In addition, there is a device that searches a plurality of routes to a single inputted destination, and displays the plurality of searched routes and branch points thereof as a simplified schematic drawing (Patent Reference 2).

Patent Reference 1: Japanese Laid-Open Patent Application No. 2004-132884
Patent Reference 2: Japanese Laid-Open Patent Application No. 2005-91249

However, displaying information related to a plurality of searched destinations according to the above-mentioned Patent Reference 1 is merely performed as a list-display of searched destinations. Therefore, displaying route information and traffic information to each searched destination, which are information normally required by a user, necessitates selecting and displaying a destination one by one, and furthermore, it is difficult to compare and comprehend such information.

In addition, a user may often require not just route information to each destination, but also information related to branch points that are boundaries between common and different portions among the routes to the respective destinations. For instance, a branch point is a point that is invariably passed regardless of which destination the user is headed. An estimated time of arrival at the branch point or traffic information is information that is important to the user, and in some cases, the user may also require an arrival time at a destination beyond the branch point.

On the other hand, with respect to the calculating of a branch point, the above-mentioned Patent Reference 2 discloses a device that searches a plurality of travel routes with respect to a single inputted destination and calculates a branch point from congruities and differences among the searched travel routes. However, the device disclosed in the Patent Reference 2 is limited to one destination, and is not arranged to calculate branch points for a plurality of different destinations as is the case with the present invention.

As a result, when selecting a single final destination from a plurality of different destinations by focusing on branch points, it is difficult for the user to receive effective support for such decision making.

In consideration thereof, an object of the present invention is to provide a route information display device that calculates a branch point among routes to a plurality of inputted destinations, and uses the branch point to control information modes.

SUMMARY OF THE INVENTION

In order to solve the aforementioned problem, a route information display device of the present invention includes: a departure point input unit which accepts input of a departure point; a multiple destination input unit which accepts input of a plurality of different destination points; a route search unit which searches for routes from the departure point to the respective destinations as point sequences; a branch point calculation unit which calculates a last point among points that are shared by the respective routes as a branch point; and a route information display unit which displays information regarding the route using the branch point A route information display device according to the present invention enables a user to comprehend necessary information among information regarding a plurality of inputted destinations in an easy manner by, for instance, contrasting and displaying information required by the user such as estimated times of arrival at branch points, congestion information, as well as information regarding routes to respective destinations beyond the branch points.

BRIEF DESCRIPTION OF DRAWINGS

FIG. 4 is a diagram showing searched routes according to the first embodiment.
FIG. 6 is a diagram showing mode information according to the first embodiment.
FIG. 18 is a diagram showing travel histories according to the second embodiment.
FIG. 19 is a diagram showing calculation of a branch point according to the second embodiment.

FIG. 29 is a diagram showing branch point calculation according to the variation of the second embodiment.

FIG. 31 is a diagram showing branch point calculation according to the variation of the second embodiment.

FIG. 33 is a diagram showing branch point calculation according to the variation of the second embodiment.

FIG. 36 is a diagram showing branch point calculation according to the third embodiment.

FIG. 38 is a diagram showing branch point calculation according to the third embodiment.

FIG. 47 is a diagram showing route search according to the variation of the third embodiment.

FIG. 53 is a diagram showing durations of stay for respective categories according to the fourth embodiment.

FIG. 55 is a diagram showing travel histories according to the fourth embodiment.

NUMERICAL REFERENCES

Figure 1:
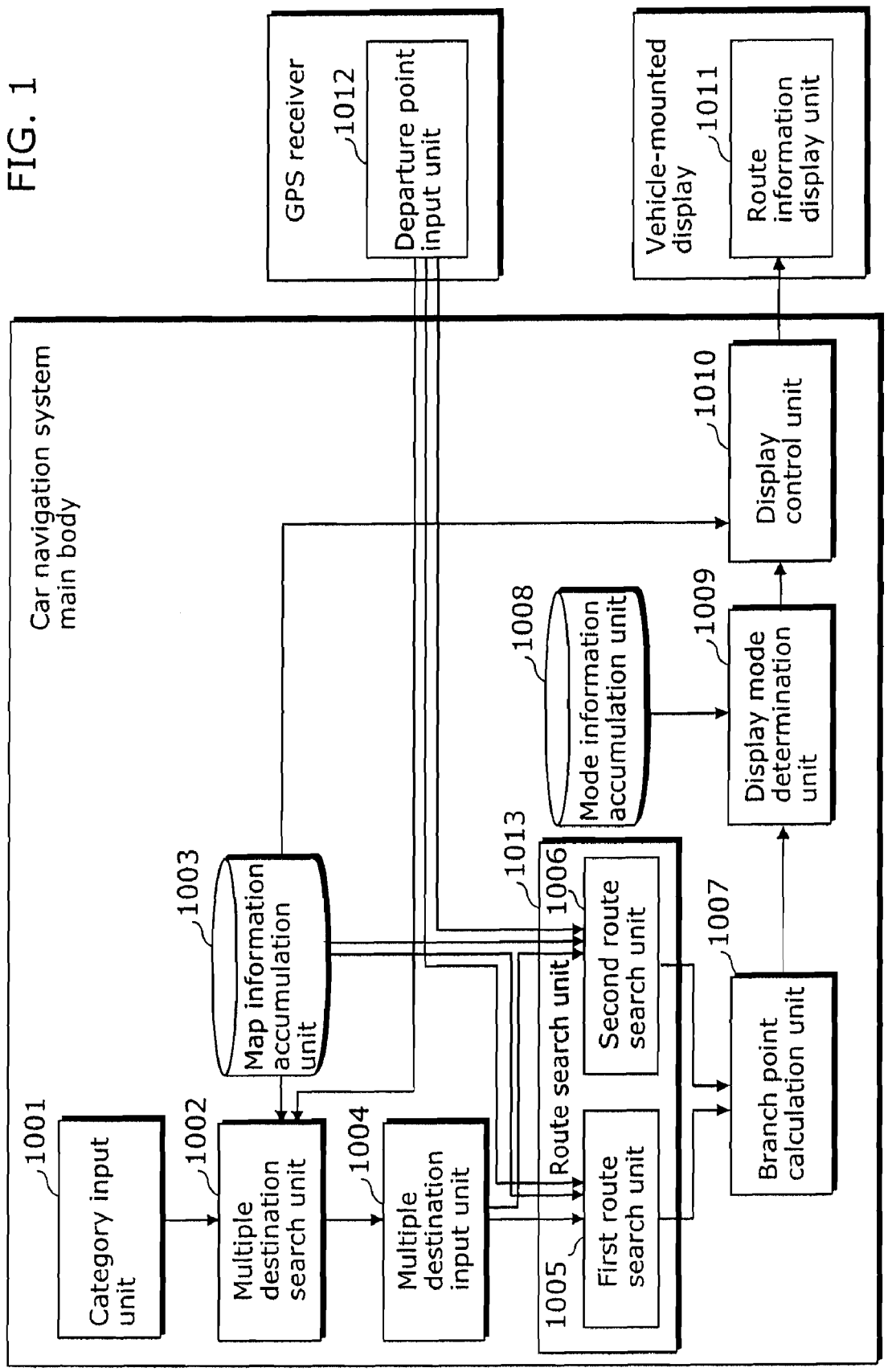
FIG. 1 is a system configuration diagram according to a first embodiment.

1001 Category input unit
1002 Multiple destination search unit
1003 Map information accumulation unit
1004 Multiple destination input unit
1005 First route search unit
1006 Second route search unit
1007 Branch point calculation unit
1008 Mode information accumulation unit
1009 Display mode determination unit
1010 Display control unit
1011 Route information display unit
1012 Departure point input unit
1013 Route search unit
1021 Branch point candidate calculation unit
1022 Branch point selection unit
1023 Branch point candidate selection unit
1024 Destination selection unit
1025 Branch point route search unit
1026 Route comparison unit
1027 Destination estimated arrival time input unit
1028 Destination category judgment unit
1101 Travel history accumulation unit

DETAILED DESCRIPTION OF THE INVENTION

A route information display device of the present invention includes a departure point input unit which accepts input of a departure point; a multiple destination input unit which accepts input of a plurality of different destination points; a route search unit which searches for routes from the departure point to the respective destinations as point sequences; a branch point calculation unit which calculates a last point among points that are shared by the respective routes as a branch point; and a route information display unit which displays information regarding the route using the branch point.

Furthermore, the route information display device further includes: a destination selection unit which selects one of the destinations inputted to the destination input unit; a branch point candidate selection unit which selects, as a branch point candidate, a point included in a route from the departure point to the destination selected by the destination selection unit; a branch point route search unit which searches for a route from the branch point selected by the branch point candidate selection unit to a destination inputted to the destination input unit other than the destination selected by the destination selection unit; and a branch point selection unit which selects a branch point from the route searched out by the branch point route search unit. Here, the route information display unit may display information regarding the route using the branch point selected by the branch point selection unit.

The route information display device further includes a route comparison unit which compares, using route costs, the route searched out by the branch point route search unit with the route from the departure point to the destination which has been searched out by the route search unit. Here, the branch point selection unit may select from the branch point candidates a branch point having a route cost that is within a predetermined range, according to the route comparison unit, and the display unit may display information regarding the route using the branch point selected by the branch point selection unit.

The route information display device further includes a destination estimated arrival time acquisition unit which acquires estimated times of arrival at the respective destinations inputted to the destination input unit. Here, the branch point selection unit may select a branch point from the branch point candidates based on the route searched out by the branch point route search unit and the destination estimated times of arrival.

Furthermore, in the route information display device, the destination estimated arrival time acquisition unit may acquire the estimated times from an external information providing service via a network.

The route information display device further includes a destination classification judgment unit which judges classifications of destinations inputted to the destination input unit. Here, the branch point selection unit may select the branch point by setting the destinations as branch point candidates according to similarities/differences of the classifications of the destinations classified by the destination classification judgment unit.

The route information display device further includes a destination duration-of-stay judgment unit which judges a duration of stay for each classification of the destinations inputted to the destination input unit. Here, the branch point selection unit may select the branch point according to the durations of stay judged by the destination duration-of-stay judgment unit.

The route information display device further includes a travel history accumulation unit which accumulates a point and a transit time history of the point. Here, the branch point selection unit may judge, using the travel history accumulation unit, whether a history that passes through the destinations inputted to the destination input unit exists, and to select the branch point according to whether the pass-through exists.

The route information display device further includes a traffic regulation accumulation unit which accumulates information regarding a traffic regulation of a route. Here, the branch point selection unit may correct the location of the selected branch point based on the traffic regulation indicated by the information accumulated in the traffic regulation accumulation unit.

Furthermore, in the route information display device, the route search unit further searches for a plurality of different routes from the departure point to the respective destinations, the branch point calculation unit further includes: a branch point candidate calculation unit which selects a route from the routes searched out by the route search unit per destination, and to calculate a plurality of branch point candidates using combinations of the selected routes; and a branch point selection unit which selects a branch point from the branch point candidates, based on distances from the departure point to the branch point candidates calculated by the branch point candidate calculation unit. Here, the route information display unit may display information regarding the route using the branch point selected by the branch point selection unit.

Furthermore, in the route information display device, the branch point selection unit may select a branch point at a location that is further away from the departure point.

Furthermore, in the route information display device, the display unit may display information regarding the route from the departure point to the branch point and the information regarding the route from the branch point to the destination inputted to the destination input unit in different modes.

Furthermore, in the route information display device, the display mode for the display unit may be changed according to a degree of coincidence of classifications of the destinations inputted to the destination input unit.

Furthermore, in the route information display device, when the classifications of the destinations differ, the display unit may display information regarding a route from the departure point to the branch point calculated by the branch point calculation unit.

Furthermore, in the route information display device, when the classifications of the destinations are the same, the display unit may display information regarding a route from the branch point calculated by the branch point calculation unit to the destination.

Furthermore, in the route information display device, display contents displayed by the display unit are changed based on a distance from the departure point to the branch point calculated by the branch point calculation unit.

Furthermore, in the route information display device, when the distance from the departure point to the branch point calculated by the branch point calculation unit is greater than a predetermined distance, the display unit may display information regarding the route from the departure point to the branch point.

Furthermore, in the route information display device, when the distance from the departure point to the branch point calculated by the branch point calculation unit is shorter than a predetermined distance, the display unit may display information regarding the route from the branch point to the destination.

Furthermore, in the route information display device, the display unit may change and display information regarding a route, according to the ratio of the distance from the departure point to the branch point calculated by the branch point calculation unit to the distance from the branch point to the destination.

Furthermore, in the route information display device, based on the scale of map information displayed by the display unit and the distances between the plurality of destinations inputted to the destination input unit, when all of the destinations are not displayed at the same time, the display unit may display information regarding the route from the departure point to the branch point.

Furthermore, the present invention may not only be realized as a route information display device such as described above, but also as a route information display method or a computer program.

A route information display device according to the present invention will be described below with reference to the drawings.

(First Embodiment)

FIG. 1 is a system configuration diagram showing an example of a route information display device according to the present embodiment. The route information display device is realized as, for instance, a car navigation system, and may be configured using a car navigation system main body, a vehicle-mounted display, and a GPS (Global Positioning System) receiver.

A category input unit 1001 is a unit to which a category or the like that becomes a keyword for searching for a destination is inputted. This category is an example of a destination classification. A map information accumulation unit 1003 is a unit which accumulates facility information or map information. Based on the map information accumulated in the map information accumulation unit 1003, a multiple destination search unit 1002 searches for a plurality of destinations falling under the above-mentioned category to be used as input for a multiple destination input unit 1004.

Generally, in cases where a destination is searched using a car navigation system, a name or the like of the destination is often directly inputted, or a category or the like is inputted to search for a destination which is then set as a final destination. Even in the present embodiment, a plurality of destinations may be directly inputted to the multiple destination input unit 1004, or a plurality of destinations may be used as input values for the multiple destination input unit 1004 by inputting a category to the category input unit 1001 and searching for destinations falling under the category by the multiple destination search unit 1002.

A departure point input unit 1012 is a unit to which a departure point is inputted. A user him/herself inputs a given departure point. According to the present embodiment, the departure point input unit 1012 may be configured by a GPS or the like as a unit which searches for a current location of the user, whereby a current position at which the search had been performed may be used as a departure point. In the present embodiment, the departure point input unit 1012 is assumed to be a unit configured by a GPS or the like which searches for a current location of the user at predetermined intervals, whereby a current point at which a search is performed will be inputted as a departure point.

Figure 2:
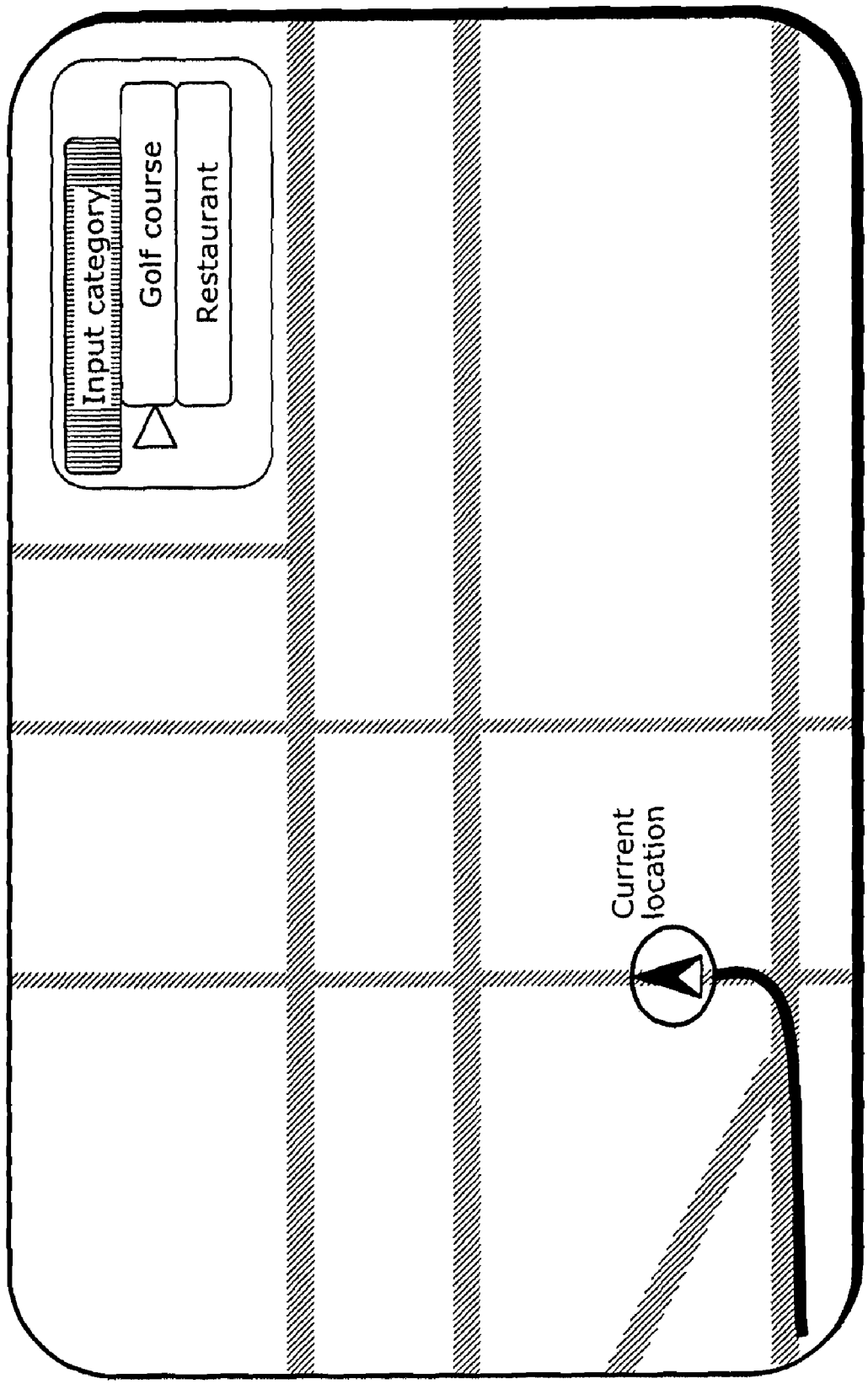
FIG. 2 is a diagram showing a display screen according to the first embodiment.

FIG. 2 is a diagram showing a display example of a route information display unit 1011 that is a screen of a car navigation system. The screen shown in FIG. 2 is displaying a current location of the user detected by the departure point input unit 1012, map information related to the current location based on the map information accumulated in the map information accumulation unit 1003, and the like. The screen depicted in FIG. 2 also shows an example of a category input. For instance, it is shown that a category "golf course" has been inputted in an "input category" window at the upper right of the screen. The multiple destination search unit 1002 will search for a plurality of destinations falling under the category "golf course".

The multiple destination search unit 1002 is a unit which searches for a plurality of destinations falling under the inputted category based on the map information accumulated in the map information accumulation unit 1003. Incidentally, the scope of search may be narrowed down based on the user's current location detected by the departure point input unit 1012.

Figure 3:
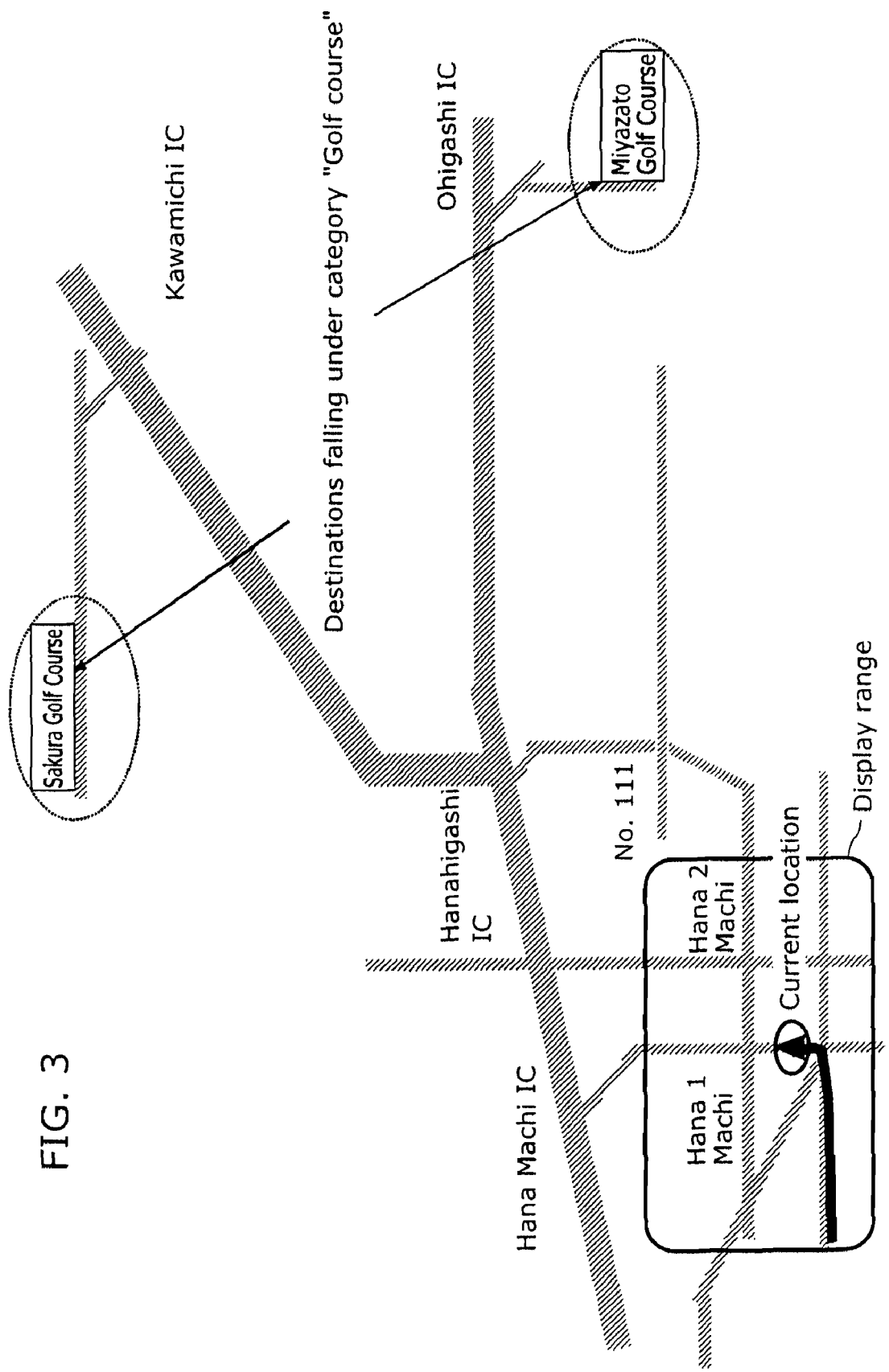
FIG. 3 is a diagram showing a plurality of destinations according to the first embodiment.

FIG. 3 is a map representation of a positional relationship between searched destinations. The map shows that "Sakura Golf Course" and "Miyazato Golf Course" have been identified as destinations falling under the inputted category "golf course". Next, the plurality of searched destinations is inputted to the multiple destination input unit 1004, routes to these destinations are searched by a first route search unit 1005 and a second route search unit 1006, and a point whereat branching occurs is calculated from the searched routes by a branch point calculation unit 1007.

Conventionally, when displaying a plurality of searched destinations, information such as maps are generally displayed by, for instance, switching screens for each destination. Otherwise, instead of displaying maps, names and the like of a plurality of searched destinations are merely displayed as a list.

However, when a user searches for destinations, there are many cases where the user will desire to comprehend map information while contrasting routes of the plurality of destinations and the like instead of independent map information for the respective destinations. For instance, a point that is common among the routes to the plurality of destinations or, in other words, a branch point, is a point that is inevitably visited by the user. Thus, the estimated time of arrival or route information to this point is of interest to the user. In addition, on the other hand, conditions of routes to the respective destinations beyond the branch point or congestion information and the like are also information that are required by the user in advance, and in many cases, a destination will be ultimately determined by contrasting these information and considering changes in the conditions.

In consideration thereof, for the present invention, a method will be described in which a branch point of routes to a plurality of inputted destinations are calculated, and information modes are changed based on the branch point.

The first route search unit 1005 included in a route search unit 1013 is a unit which calculates a route to a single destination among a plurality of destinations inputted to the multiple destination input unit 1004. In addition, the second route search unit 1006 included in the route search unit 1013 is a unit which calculates a route to another destination among the plurality of inputted destinations. Based on the calculated routes, a branch point of the routes is calculated by the branch point calculation unit 1007.

FIG. 4 shows routes to a plurality of searched destinations. Incidentally, route search is generally calculated using the Dijkstra method or the like, based on route costs (route lengths, route times and the like) of a road network accumulated in map information. In the present embodiment, for instance, it is assumed that intersections and the like are nodes, whereby route search is performed using route costs of links between nodes. In FIG. 4, a searched route ID "01" is a route searched by the first route search unit 1005, and indicates that a route to a final destination "Miyazato Golf Course" which passes the nodes of "Hana 1 Machi (intersection)", "Hana 2 Machi (intersection)", "No. 111 (intersection)", "Hanahigashi IC (interchange)", and "Ohigashi IC (interchange)" has been searched.

In the same manner, a searched route ID "02" is a route searched by the second route search unit 1006, and indicates that a route to a final destination "Sakura Golf Course" which passes the nodes of "Hana 1 Machi (intersection)", "Hana 2 Machi (intersection)", "No. 111 (intersection)", "Hanahigashi IC (interchange)", and "Kawamichi IC (interchange)" has been searched.

The branch point calculation unit 1007 is a unit which calculates a branch point based on the searched routes. For instance, judgment on whether a node matches may be performed as needed on a sequence of searched nodes, whereby a last matching node may be calculated as a branch point. In other words, a route to each of the above-mentioned destinations from a departure point (in the present example, the current position where a search was commenced is the departure point) is searched as a point sequence, and a last point among points common to each of the above-mentioned routes will be calculated as a branch point.

More specifically, in the case of the routes shown in FIG. 4, the nodes "Hana 1 Machi", "Hana 2 Machi", "No. 111", and "Hanahigashi IC" match, while the nodes "Ohigashi IC" and "Kawamichi IC" are different. Thus, "Hanahigashi IC", which matches last, is the branch point.

Figure 5:
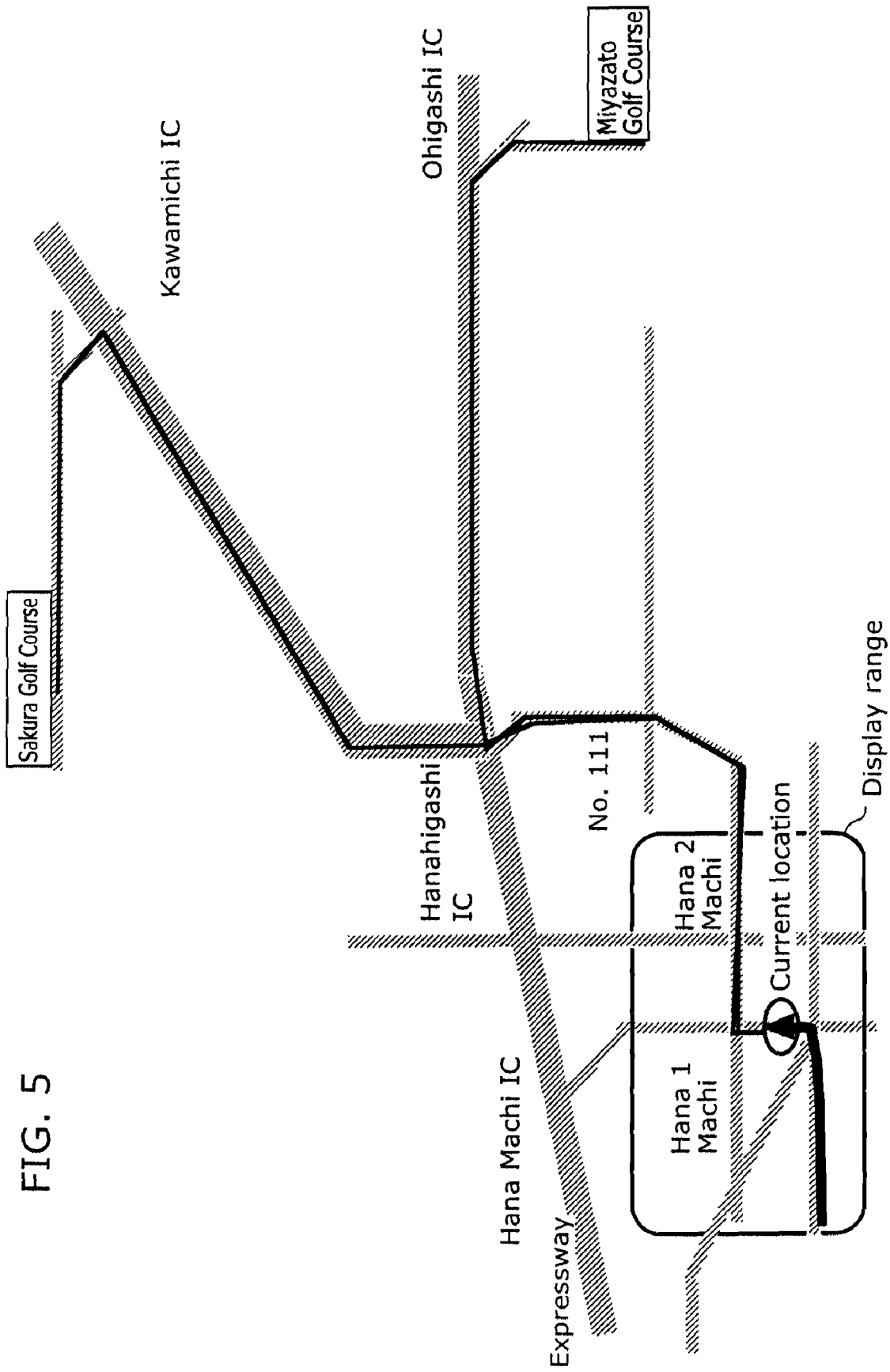
FIG. 5 is a diagram showing searched routes according to the first embodiment.

FIG. 5 is a map representation of the afore-mentioned searched routes and the calculated branch point. First, a display screen displaying a current location of the user and the vicinity thereof is shown. In addition, a route that passes "Hana 1 Machi", "Hana 2 Machi", "No. 111", "Hanahigashi IC" and "Kawamichi IC" is searched as a route from the current location to one of the destinations, "Sakura Golf Course", and is indicated by the black bold line. In the same manner, a route that passes "Hana 1 Machi", "Hana 2 Machi", "No. 111", "Hanahigashi IC" and "Ohigashi IC" is searched as a route to "Miyazato Golf Course". Furthermore, a branch point has been calculated to be "Hanahigashi IC", and it will be understood that a route beyond "Hanahigashi IC" to "Miyazato Golf Course" branches approximately eastward (rightward), while a route to "Sakura Golf Course" branches approximately northward (upward).

A display mode determination unit 1009 is a unit which determines a mode for displaying information related to the plurality of destinations, such as routes to the respective destinations. For instance, determination shall be made by referencing information on modes (hereinafter referred to as mode information) accumulated in a mode information accumulation unit 1008. Then, under the control of a display control unit 1010, information is displayed on the route information display unit 1011 that is a display of a car navigation system and the like.

Conventionally, when displaying information related to such searched destinations, for instance, routes and the like are generally displayed for each destination. However, when a user searches for destinations, there are many cases where the user will desire to comprehend information by contrasting so that such routes and the like to the plurality of destinations are more easily understood, instead of independent information for respective destinations.

For instance, in the case of the above example, the points up to the branch point "Hanahigashi IC" will be inevitably passed by the user regardless of which golf course the user is headed. Thus, the estimated time of arrival or route information to "Hanahigashi IC" is a matter of concern to the user. In addition, there may be cases where it is preferable to contrast and display differences in estimated times of arrival beyond the branch point or differences in route information so that the differences are immediately apparent, instead of displaying individually.

For instance, when a congestion has occurred before "Hanahigashi IC" and the arrival at "Hanahigashi IC" will be delayed, the user's actions may be facilitated if such information may be contrasted and comprehended without cumbersome operations, such as heading for "Miyazato Golf Course" which may be reached in a short amount of time. Alternatively, it will be possible to provide the user with necessary information, such as "taking an excursion today to go to "Sakura Golf Course" if the branch point "Hanahigashi IC", which will be inevitably passed regardless of which golf course the user is headed, may be reached in a short period of time".

In addition, since the points up to the branch point will be inevitably passed but either one of the routes will be selected beyond the branch point, there may be cases where, for instance, a user who is not good at driving will desire easier roads. In other words, conditions and the like of routes beyond the branch point are also information required by the user, and by contrasting and displaying such information, promotion of safer driving may also be possible. Accordingly, the present invention controls display modes based on branch points.

FIG. 6 is a diagram showing an example of mode information accumulated in the mode information accumulation unit 1008. In the present embodiment, for mode information, it is assumed that information such as "category" and "mode format", as well as "display items" as information related to destinations such as facilities, are accumulated. Information related to a plurality of destinations is displayed by referencing such mode information. A specific example will now be described with reference to the drawings.

Figure 7:
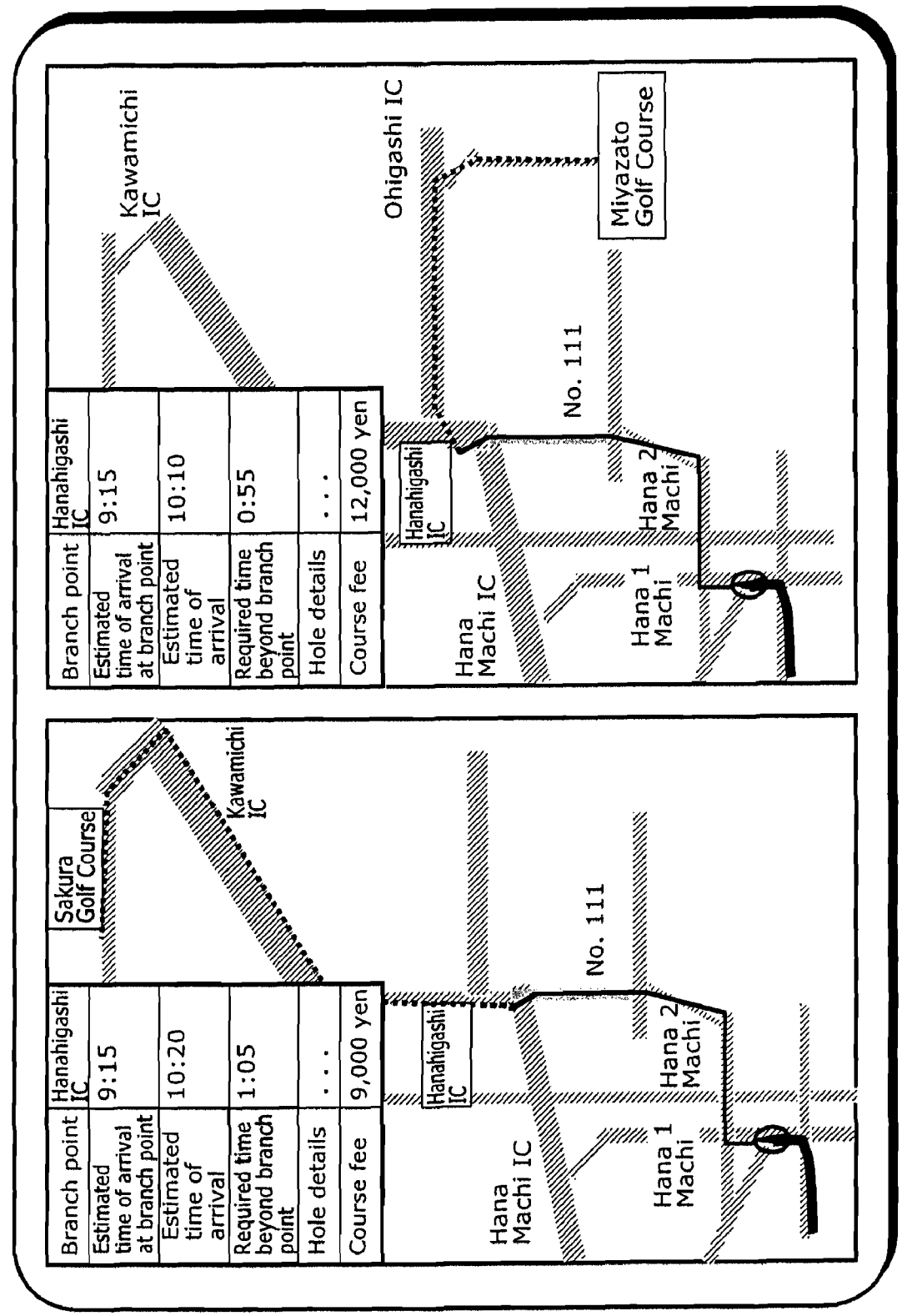
FIG. 7 is a diagram showing a display example of a screen according to the first embodiment.

FIG. 7 is information related to "Sakura Golf Course" and "Miyazato Golf Course" which is displayed on the route information display unit 1011. Conventionally, when displaying information related to such a plurality of destinations, for instance, routes and the like are generally displayed for each destination. Therefore, comparisons of differences and the like between both routes may not be performed, and screens must be switched on a case-by-case basis.

In this light, the present embodiment provides a "contrast map format" as a "mode format" of mode information, which contrasts and displays maps of both routes. In addition, in the present embodiment, a branch point "Hanahigashi IC" is calculated by the branch point calculation unit 1007, and an estimated time of arrival of "9:15" at the branch point is shown. This is because the user will inevitably pass the points up to the branch point "Hanahigashi IC" regardless of which golf course the user is headed, and the estimated time of arrival, congestion information and the like to "Hanahigashi IC" are matters of concern to the user.

Furthermore, estimated times of arrival and amounts of time required beyond the branch point regarding "Sakura Golf Course" and the "Miyazato Golf Course" are displayed such that the differences therebetween are immediately apparent, namely, an estimated time of arrival at "Miyazato Golf Course" of "10:10", in contrast to an estimated time of arrival at "Sakura Golf Course" of "10:20", as well as an amount of time required for the route beyond the branch point of "55 minutes" in contrast to "1 hour 5 minutes".

As a result, for instance, when a congestion has occurred before "Hanahigashi IC" and the arrival at "Hanahigashi IC" will be delayed, it will now be possible to enable the user to contrast and comprehend these information without cumbersome operations, such as heading for "Miyazato Golf Course" which may be reached in a short amount of time.

Additionally, in order to enable the difference between the route to the branch point "Hanahigashi IC" and the routes beyond the branch point to the respective destinations to be comprehended more easily, the routes are displayed, for instance, in different colors (for instance, using red or the like for the black bold line that is the route to the branch point "Hanahigashi IC", while using orange or the like for the dotted lines beyond the branch point). The route to the branch point is a route that will be inevitably passed regardless of which destination the user is headed, while the user will select either one of the routes beyond the branch point. In consideration thereof, by displaying routes before and beyond the branch point in different colors, information may be comprehended more easily.

In the case of a car navigation system, when considering the limitation in screen size as well as the task of driving, it is imperative that a significant amount of information is comprehended from the screen in a short period of time. For instance, by changing the colors of both routes, route information or a difference thereof may be easily contrasted and comprehended, which may lead to a more accurate understanding of information or may result in supporting safe driving.

Incidentally, with a plurality of routes with different destinations, there are cases where the directions of routes will differ significantly beyond the branch point, unlike a plurality of routes that are simply searched with respect to a single destination. For instance, in the case of FIG. 5, it is obvious that the direction of the routes differ significantly, with the route to "Miyazato Golf Course" extending westward, and the route to "Sakura Golf Course" extending northward.

When attempting to display such destinations with significantly different directions in a single screen, there may be cases where the scale of the screen becomes too small or the destinations will not fit into the screen.

In consideration thereof, the present invention uses branch points to control modes thereof. For instance, since the route to the branch point is a route that is inevitably passed regardless of which destination the user is headed, map information and the like may be arranged to be displayed in a single screen while considering the current location and the branch point, and contrasting and displaying information beyond the branch point. A specific example will now be described with reference to the drawings.

When the destinations of both routes differ significantly, such as shown in FIG. 5 where "Sakura Golf Course" lies in a northward direction (upward direction) with respect to the current location while "Miyazato Golf Course" lies in a eastward direction (rightward direction) with respect to the current location, there is a risk that the scale of the map will become too broad if the screen is reduced to allow both destinations to fit therein, and as a result, comprehension of the screen may become difficult. In this light, an area of the map to be displayed is determined by considering the current location and the location of the branch point "Hanahigashi IC" which will be inevitably passed regardless of which destination the user is headed.

Figure 8:
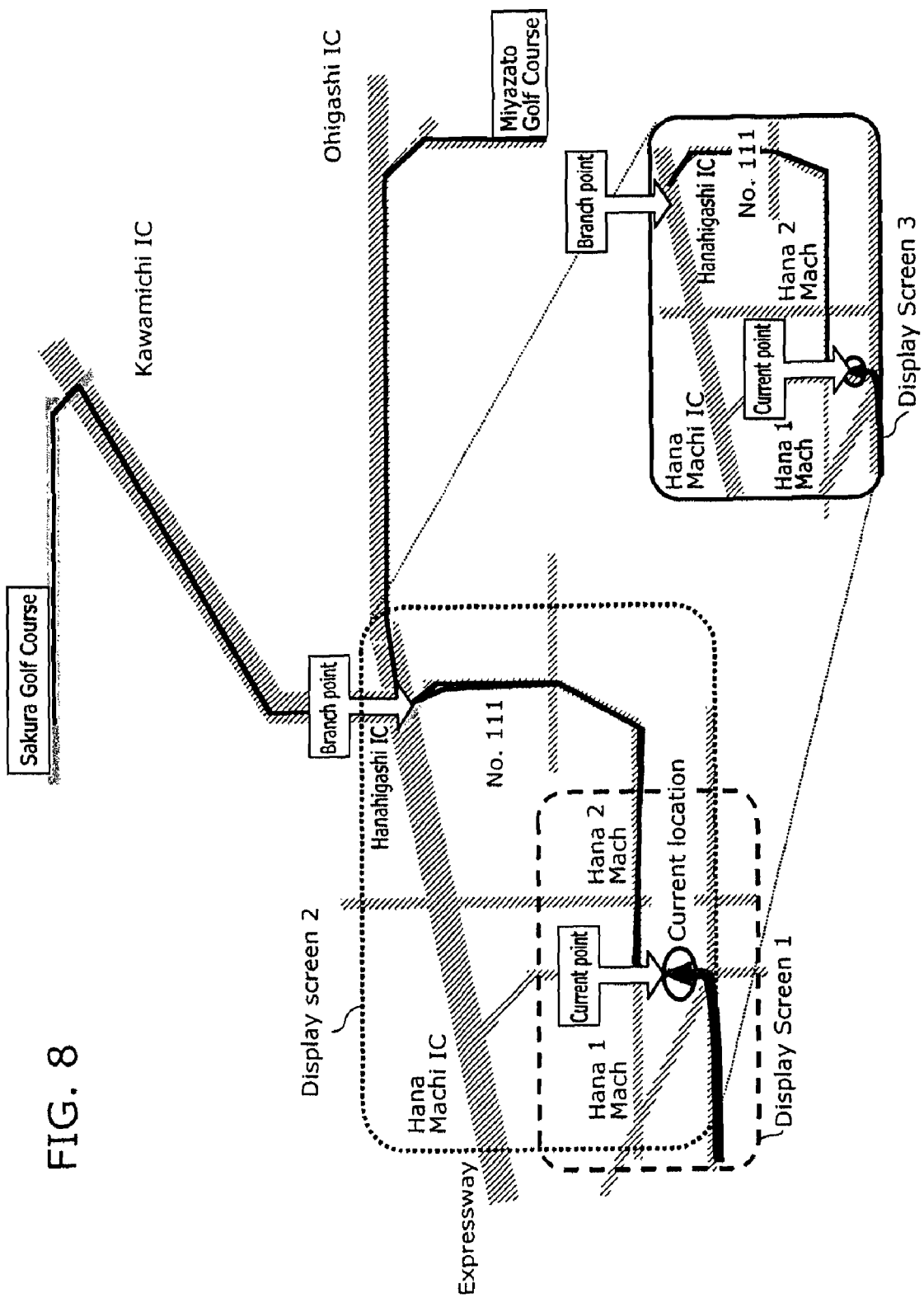
FIG. 8 is a diagram describing determination of a display area according to the first embodiment.

FIG. 8 is a diagram for describing determination of a display area in consideration of a branch point. A display screen 1 shown in FIG. 8 is, for instance, a default display screen, and displays an area having the current location at the center. Since the current location is displayed at the center in the display screen 1, it is impossible to comprehend the route or the like up to the branch point "Hanahigashi IC".

Therefore, a display area is determined so as to display the current location and the branch point "Hanahigashi IC" to generate a display screen 2. For instance, in this case, an area is determined so that the current location is fitted in the bottom left of the display screen 2, while the branch point is fitted in the top right of the screen. Then, the scale of the display screen 2 is controlled according to the size of the route information display unit 1011 that is a display screen of a car navigation system or the like to generate a display screen 3. Next, by displaying the display screen 3 on the display, it is now possible to comprehend the route to the branch point while comprehending the current location.

Figure 9:
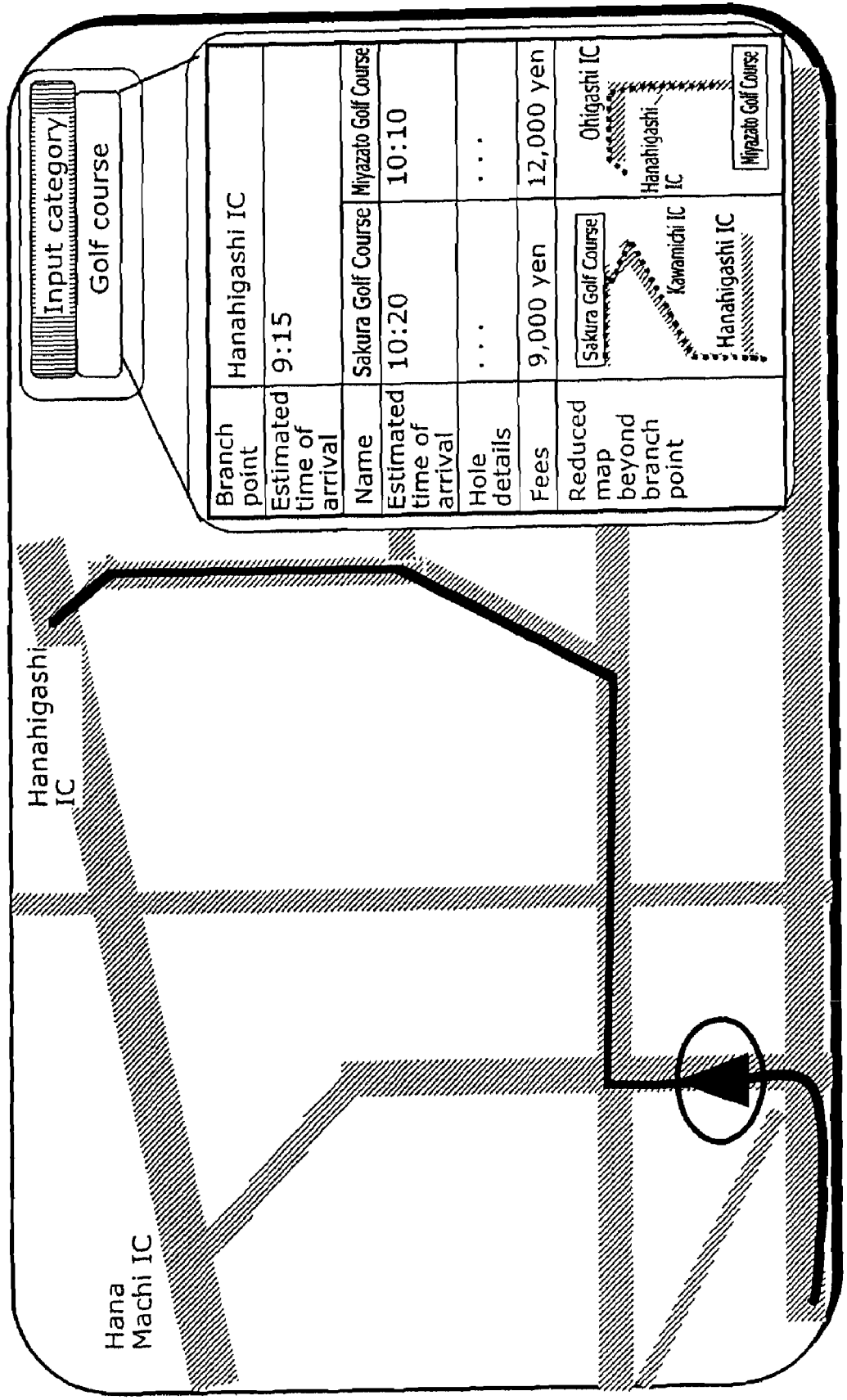
FIG. 9 is a diagram showing a display example of a screen according to the first embodiment.

FIG. 9 is a diagram showing an example that displays a route to the calculated branch point "Hanahigashi IC". The branch point "Hanahigashi IC" is a point that the user will inevitably pass regardless of which of the plurality of inputted destinations the user is headed, and route information to the branch point and an estimated time of arrival are matters of concern to the user. Therefore, by displaying information up to the branch point, and also displaying information beyond the branch point so that the information may be contrasted, it is now possible to have the user comprehend necessary information more easily. Additionally, in FIG. 9, information beyond the branch point is displayed on the right-hand side of the screen so that the information may be contrasted and comprehended. For instance, the differences between the two destinations are contrasted and displayed, such as an estimated time of arrival at "Miyazato Golf Course" of "10:10" in contrast with an estimated time of arrival at "Sakura Golf Course" of "10:20". Furthermore, as for reduced-scale maps beyond the branch point, reduced-scale maps of the route from "Hanahigashi IC" to "Sakura Golf Course" and the route from "Hanahigashi IC" to "Miyazato Golf Course" are contrasted and displayed. While it is likely that displaying all routes which include the branch point may result in a map having a scale that is too small, thereby making comprehension of the screen difficult, it is possible to allow comprehension of only required information by contrasting routes beyond the branch point using reduced-scale maps and the like.

Alternatively, it is also possible to consider map scales and the like which have been set by the user. Generally, the user will set a detailed scale when wishing to comprehend the vicinity of the current location in greater detail, and will set a broad scale when wishing to comprehend route information for further ahead or for an entire route. For instance, when a detailed scale has been set in order to better comprehend the current location, as seen in the display example shown in FIG. 9, information up to the branch point may be displayed across the entire screen, while contrasting and displaying information beyond the branch point to the side of the screen.

On the other hand, in a case where the user regularly uses the system and is already more or less familiar with information of the vicinity of the current location, and a broad scale has been set in order to comprehend route information for further ahead instead, information beyond the branch point may be contrasted and displayed over the entire screen in order to comprehend beyond the branch point in greater detail, as shown in FIG. 7. Even with the same route information, different users may desire to comprehend different information. Use of the present invention thus enables information to be provided according to the needs of the user.

Figure 11:
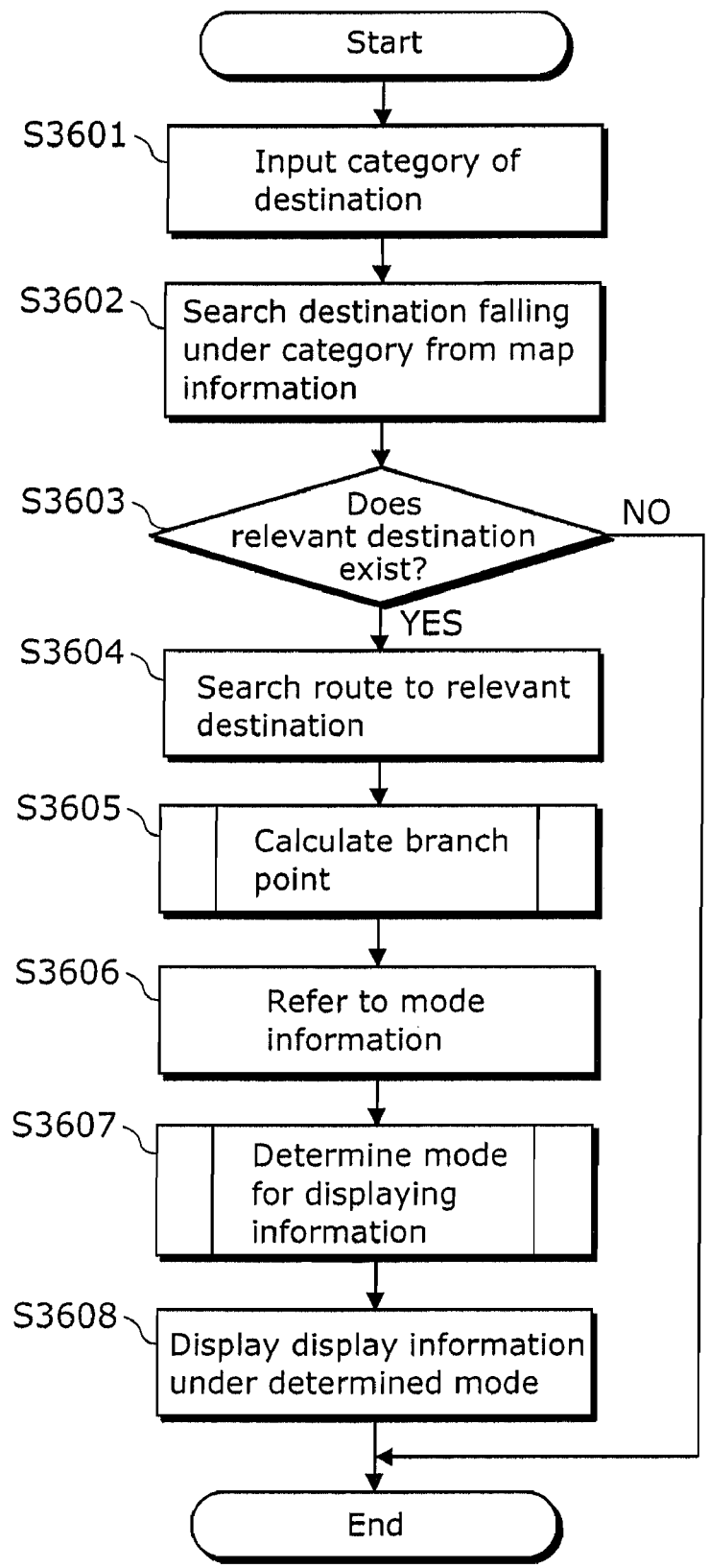
FIG. 11 is a flowchart according to the first embodiment.
Figure 12:
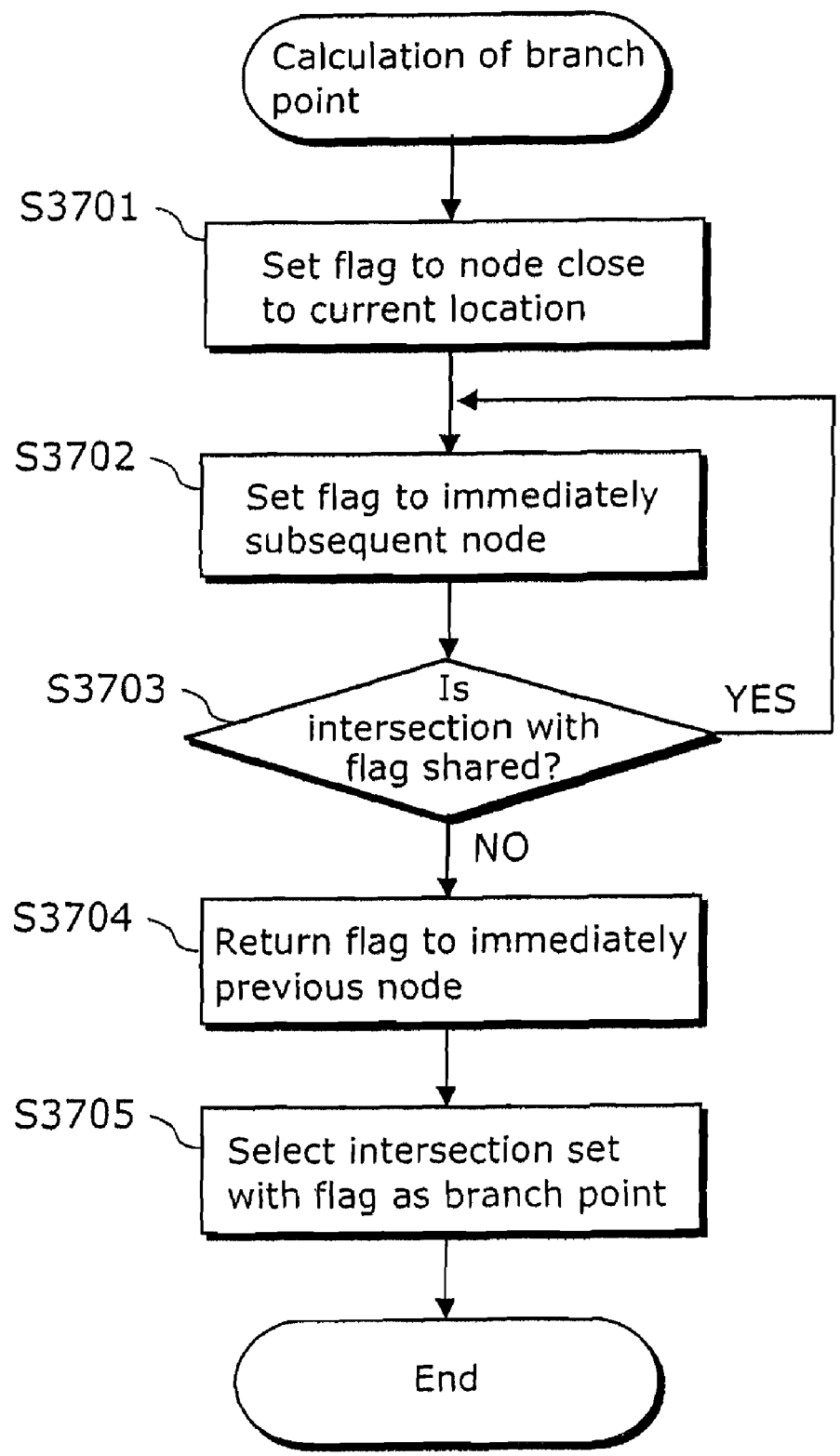
FIG. 12 is a flowchart according to the first embodiment.
Figure 13:
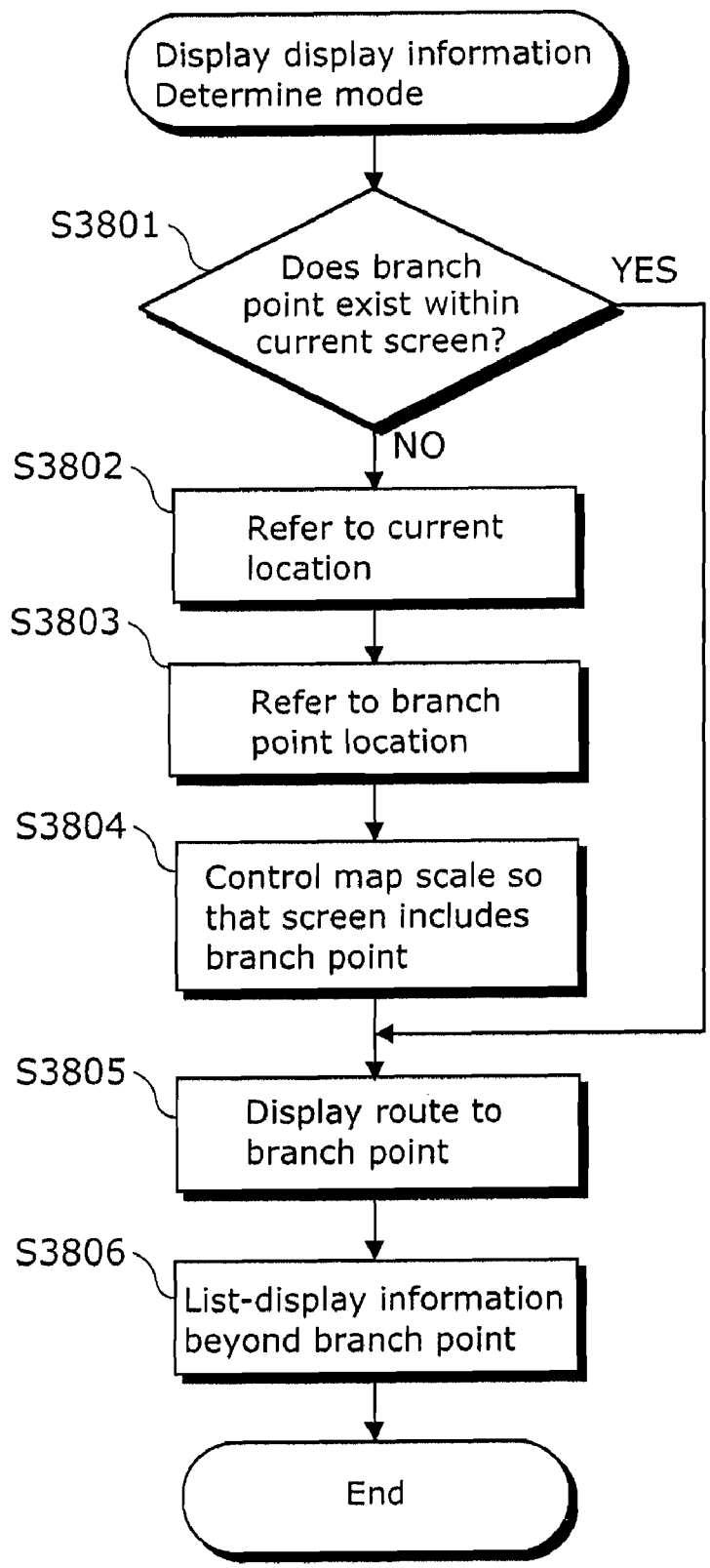
FIG. 13 is a flowchart according to the first embodiment.

A flowchart of the present embodiment will now be described with reference to FIGS. 11, 12 and 13. First, a category is inputted to the category input unit 1001 (S3601). Then, destinations falling under the inputted category are searched from map information accumulated in the map information accumulation unit 1003 (S3602).

Judgment is performed on whether a relevant destination exists in the map information (S3603). If so, the processing proceeds to step S3604, and if not, the processing is concluded. If so (Yes in S3603), routes to the relevant destination are searched by the first route search unit 1005 and the second route search unit 1006 (S3604). Then, a branch point is calculated by the branch point calculation unit 1007 (S3605).

Calculation of a branch point is commenced by setting a flag to a node nearest to the current position (S3701), and setting the flag to an immediately subsequent node (S3702). With the searched route shown in FIG. 5, a flag is set to the intersection "Hana 1 Machi". Next, judgment is performed in whether the set flag is shared (S3703). If shared (Yes in S3703), the processing proceeds to step S3702, and if not (No in S3703), the processing proceeds to step S3704. In the present embodiment, since "Hana 1 Machi" is shared, a flag is set to the immediately subsequent node (S3702). The Flag moves to "Hanahigashi IC" by repeating this loop. In other words, this indicates that the route thus far is shared.

Next, as a result of setting the flag to the immediately subsequent node (S3702), flags will be set to different nodes, namely, "Ohigashi IC" and "Kawamichi IC" (No in S3703). In this case, the flag is returned to the immediately previous node (S3704), and the node to which the flag is set is calculated as a branch point (S3705). In other words, "Hanahigashi IC" becomes the branch point.

Next, mode information accumulated in the mode information accumulation unit 1008 is referred to (S3606), and an information display mode is determined by the display mode determination unit 1009 using the calculated branch point (S3607). For instance, assuming that the display mode is the display example shown in FIG. 9, a description will now be given with reference to FIG. 8. First, judgment is made on whether a branch point exists in the current screen (S3801). If a branch point exists in the current screen (Yes in S3801), the processing proceeds to step S3805. If not (No in S3801), the current location is referred to (S3802), and the location of the branch point is referred to (S3803). Then, a screen is generated so that the current location and the location of the branch point fit into the current screen, and the scale of the screen is reduced according to the size of the display (S3804).

In the case of FIG. 8, since no branch points exist in the current screen of the display screen 1 (No in S3801), the current location and the location of "Hanahigashi IC" are referred to (S3802, S3803), and a display area is determined so that the locations fit into the screen to generate a display screen 2. Next, the screen is reduced to generate a display screen 3 (S3804). Since a plurality of destinations are relatively distant or mutually separated, attempting to fit both into the current screen may result in a screen scale that is too broad, thereby making route information hard to comprehend. On the other hand, since at least the route up to the branch point is shared, such an adverse effect may be avoided by reduction so that at least up to the branch point is included. Next, the route up to the branch point is displayed. The route up to the branch point is displayed (S3805), and information beyond the branch point is further displayed so that, for instance, information may be contrasted and comprehended (S3806). The information is then displayed on the route information display unit 1011 in the mode determined by these flows (S3608).

FIG. 9 is a diagram showing a screen displayed on the route information display unit 1011. In the current screen in FIG. 9, the current location and up to the branch point "Hanahigashi IC" are displayed in a scale and at positions which enable the locations to fit into the screen. In addition, the route up to the branch point "Hanahigashi IC" is indicated by a bold line. Furthermore, an estimated time of arrival at the branch point "Hanahigashi IC" of "9:15", as well as "estimated times of arrival" and the like at the respective destinations "Miyazato Golf Course" and "Sakura Golf Course" are also displayed. In this manner, by calculating a branch point, and performing display so that information up to the branch point and information beyond the branch point may be contrasted, it is possible to comprehend information necessary for travel in an easier mariner.

(Description of Minimum Components According to the First Embodiment)

Additionally, in the present embodiment, with respect to input to the multiple destination input unit 1004, it is arranged that components such as the category input unit 1001 and the like are provided and points falling under a category is searched from the map information accumulation unit 1003 by the multiple destination search unit 1002. However, the arrangement is not limited to this example. Instead, a destination may be directly inputted to the multiple destination input unit 1004 to perform route search and calculate a branch point.

Furthermore, while route search has been described by providing respective route search units, namely, the first route search unit 1005 and the second route search unit 1006, a search of respective routes may be successively performed by, for instance, a single route search unit (for instance, using the first route search unit 1005 as a route search unit 1005).

Moreover, while modes accumulated in the mode information accumulation unit 1008 have been referred to in order to change modes based on a branch point, such mode information is not a requisite component, and information related to a branch point may be directly displayed on the route information display unit 1011 instead.

Figure 14:
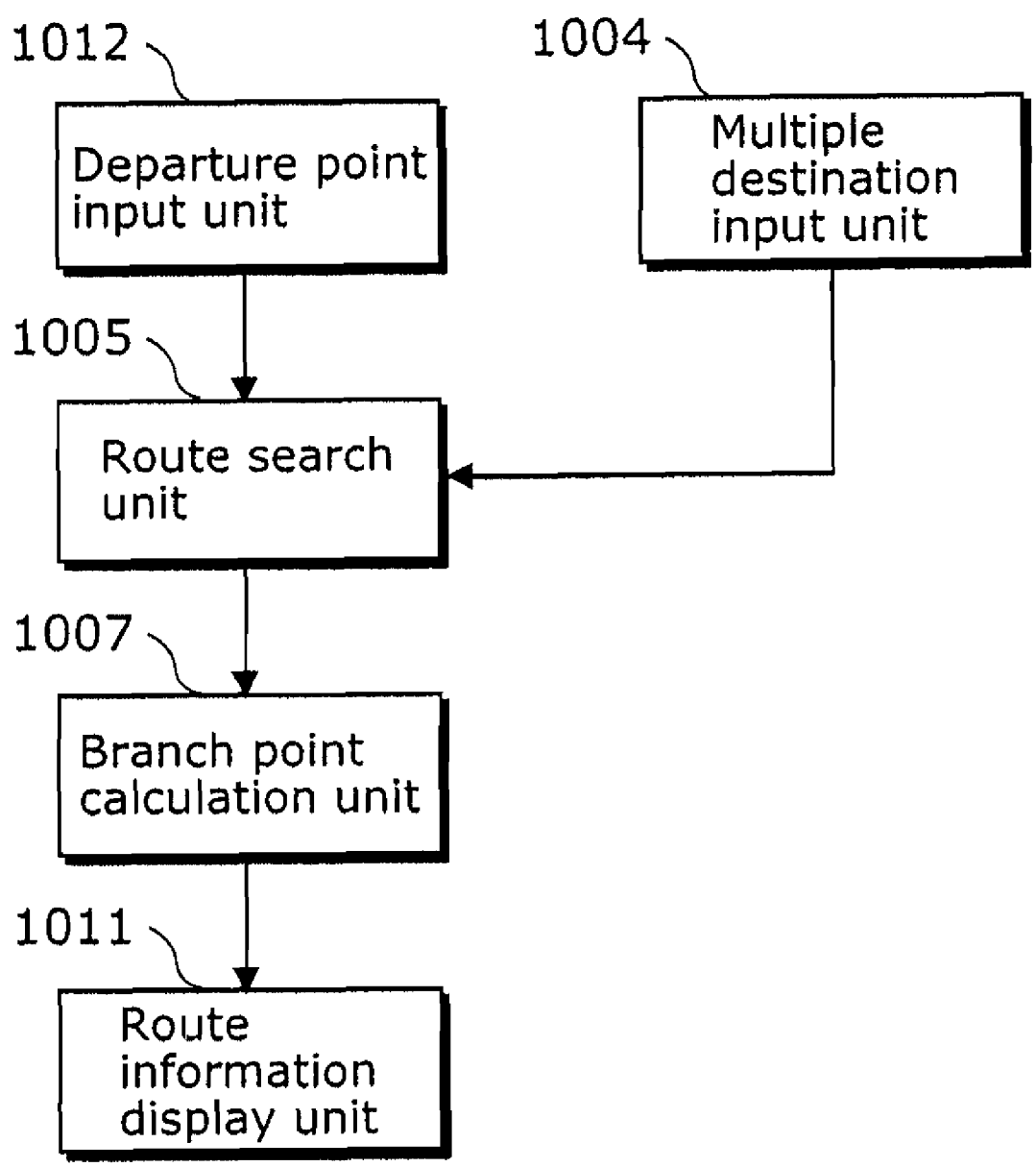
FIG. 14 is a system configuration diagram according to the first embodiment.

In other words, the minimum components required to implement the present invention is not limited to FIG. 1 and, for instance, the present invention may be implemented with the components shown in FIG. 14. FIG. 14 shows system components of the present invention, including: the multiple destination input unit 1004; the departure point input unit 1012; a route search unit 1005; the branch point calculation unit 1007; and the route information display unit 1011. Details of the respective components are as described above. Routes from a departure point inputted at the departure point input unit 1012 to respective destinations inputted to the multiple destination input unit 1004 are searched by the route search unit 1005, and a branch point is calculated by the branch point calculation unit 1007. Information on the calculated branch point is thus displayed on the route information display unit 1011.

(Variation Regarding Display Modes According to the First Embodiment)

As for display modes of information related to destinations, while a description has been provided on a display example in which, for instance, "Miyazato Golf Course" and "Sakura Golf Course" are used as examples and map information is contrasted based on a branch point, display modes are not limited to this example. For instance, mode may be controlled according to a category of destinations. The mode information shown in FIG. 6 described that the category "golf course" is displayed using the "contrast map format". In addition, based on this mode information, it is shown that FIG. 7 is an example of displaying that enabled route maps to the destinations "Miyazato Golf Course" and "Sakura Golf Course" to be contrasted and comprehended. For instance, with destinations such as a "golf course" which generally involve taking an excursion, since travel directions or travel distances beyond the branch point vary significantly, differences in information beyond the branch point are often information of greater interest to the user. In consideration thereof, in the case of, for instance, a "golf course" and the like, maps are contrasted and displayed so that differences in information beyond the branch point may be comprehended more easily.

On the other hand, with the mode information shown in FIG. 6, the "contrast menu format" is arranged as a display mode for the category "restaurant". This is because when searching for a plurality of relatively close destinations such as the category "restaurant", and displaying information to the destinations, travel distances beyond the branch point are often also short or destinations may be changed easily compared to "golf courses" which are relatively distant. Therefore, instead of displaying the differences in information beyond the branch point in detail, information up to the branch point may be displayed in detail.

Figure 15:
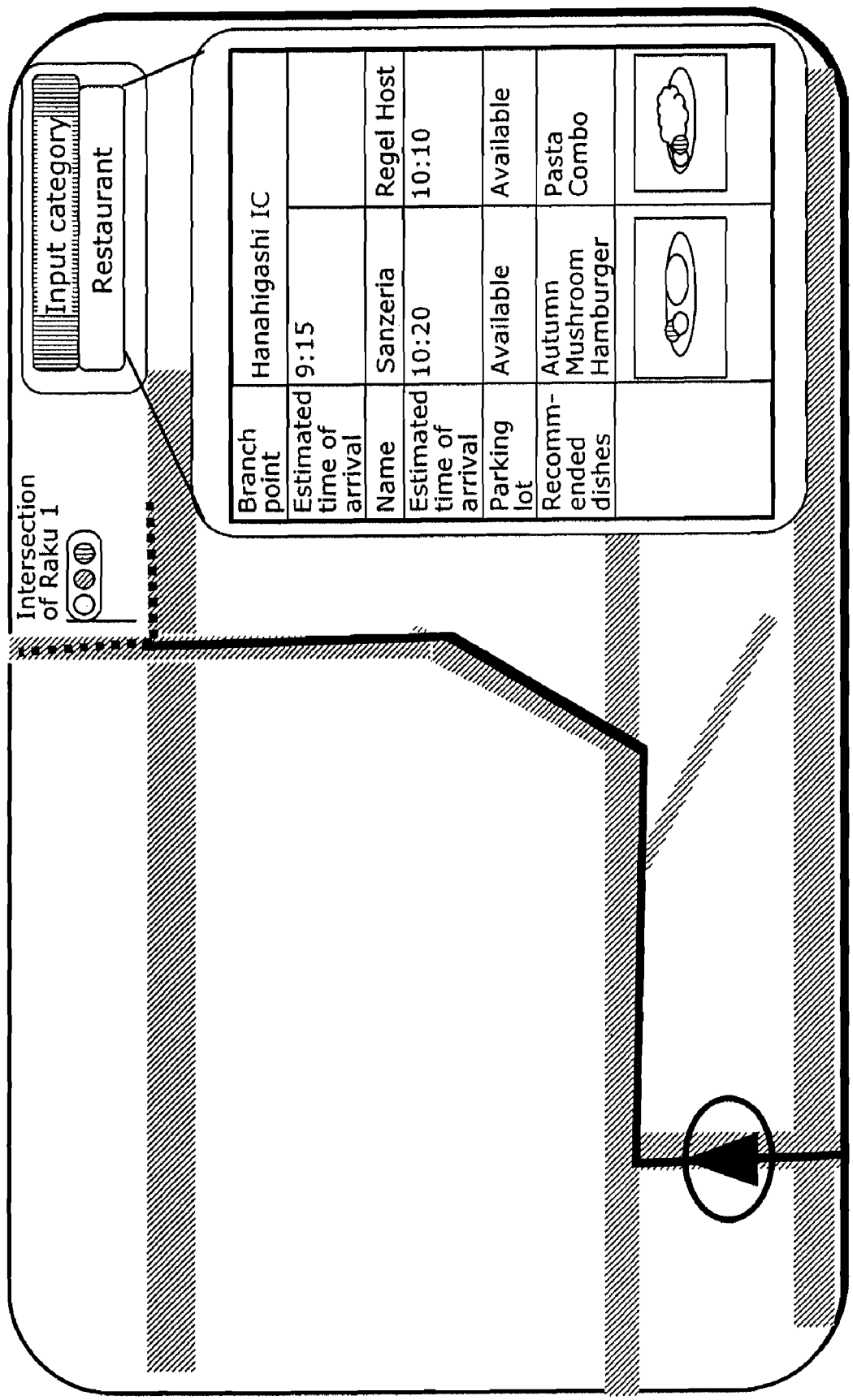
FIG. 15 is a diagram showing a display example of a screen according to the first embodiment.

For instance, in FIG. 15, a display area is determined in consideration of the current location and the location of the branch point, as shown in the present embodiment, and a route to a branch point is displayed on a screen. The screen shown in FIG. 15 depicts a route to, for instance, "Raku 1 Machi intersection", which has been calculated as a branch point.

Incidentally, when a category such as "golf course" is the same as described above, in many cases, instead of heading for both destinations, the user ultimately select either one of the destinations and head for that destination. Therefore, display is performed by contrasting beyond the branch point to enable the differences beyond the branch point to be comprehended more easily.

On the other hand, when categories differ, there may be cases where the user intends to ultimately head for both destinations instead of selecting either one, but initially would like to comprehend information for either one of the destinations or information up to the branch point. Therefore, in cases where, for instance, categories differ, information up to the branch point may be displayed in detail.

Figure 16:
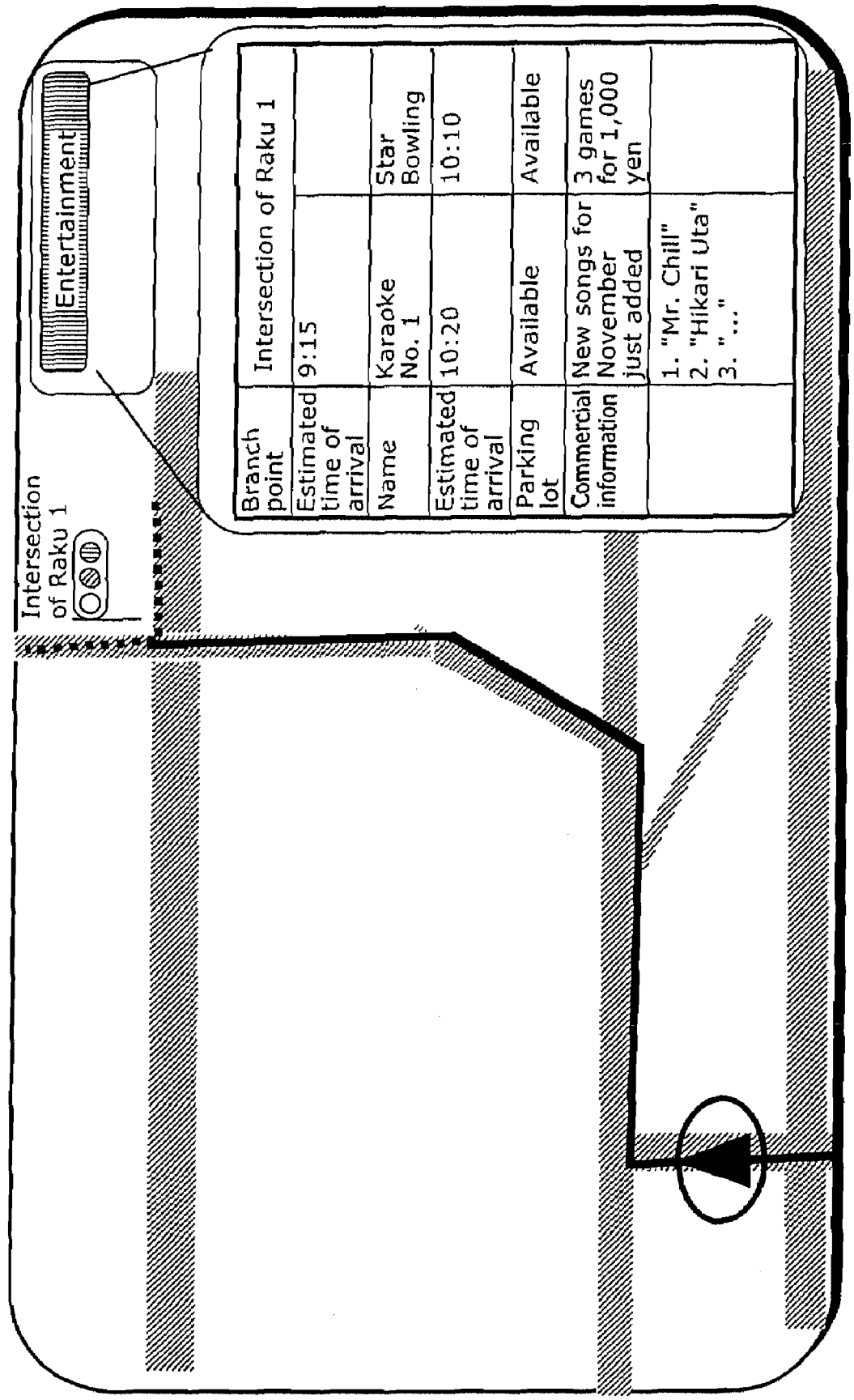
FIG. 16 is a diagram showing a display example of a screen according to the first embodiment.

For instance, in FIG. 16, "entertainment" has been inputted as a search keyword, and "Karaoke No. 1", which belongs to a category "Karaoke", and "Star Bowling", which belongs to a category "bowling", have been searched and are displayed. In addition, display is performed using the entire screen, together with map information, in order to show information up to "Raku 1 Machi intersection", which has been calculated as a branch point, in greater detail. As seen, in cases where categories differ, information up to the branch point may be displayed in detail.

Additionally, display modes may be arranged to be changed according to distances to and directions of destinations beyond the branch point, instead of category. When calculating routes to a plurality of different destinations, routes to the respective destinations often vary significantly beyond the branch point. When attempting to display destinations with significantly different directions and the like in a single screen, there may be cases where the scale of the screen becomes too small or the destinations do not fit into the screen. Therefore, for instance, thresholds may be set for directions as well as distances beyond the branch point, whereby, in a case equal to or greater than the threshold, display may be performed under a mode such as a format for detailed display of information up to the branch point (for instance, FIGS. 9 and 15) and the like.

Furthermore, modes may be changed according to the distance from the current position to the branch point, or according to a ratio of the distance to the branch point with respect to the distance from the current position to the destination. Alternatively, modes may be changed not only according to the ratio of distances, but also according to a ratio of arrival times. For instance, in a case where an arrival time at the branch point is 2 hours, and the arrival times at the respective destinations beyond the branch point are approximately 1 hour, the ratio of the arrival time at the branch point and the arrival times beyond the branch point with respect to a total travel time of 3 hours is 2:1.

In other words, in this case, since the drive to the branch point constitutes a greater portion of the total travel time and it is therefore conceivable that the information which the user primarily desires to comprehend is information up to the branch point, control may be performed so that, for instance, displaying is performed in the display mode in which information up to the branch point is displayed in detail (for instance, FIG. 9).

Accordingly, to be specific, the display control unit 1010 should be arranged to compare the distance between the above-mentioned departure point and the above-mentioned branch point with a threshold, and when the distance is greater than the threshold, adopt a display mode which displays information from the departure point to the branch point in detail. It is needless to say that the display control unit 1010 may adopt such a display mode according to the ratio of the distance between the above-mentioned departure point and the above-mentioned branch point and the distance between the above-mentioned branch point to a destination.

Figure 10:
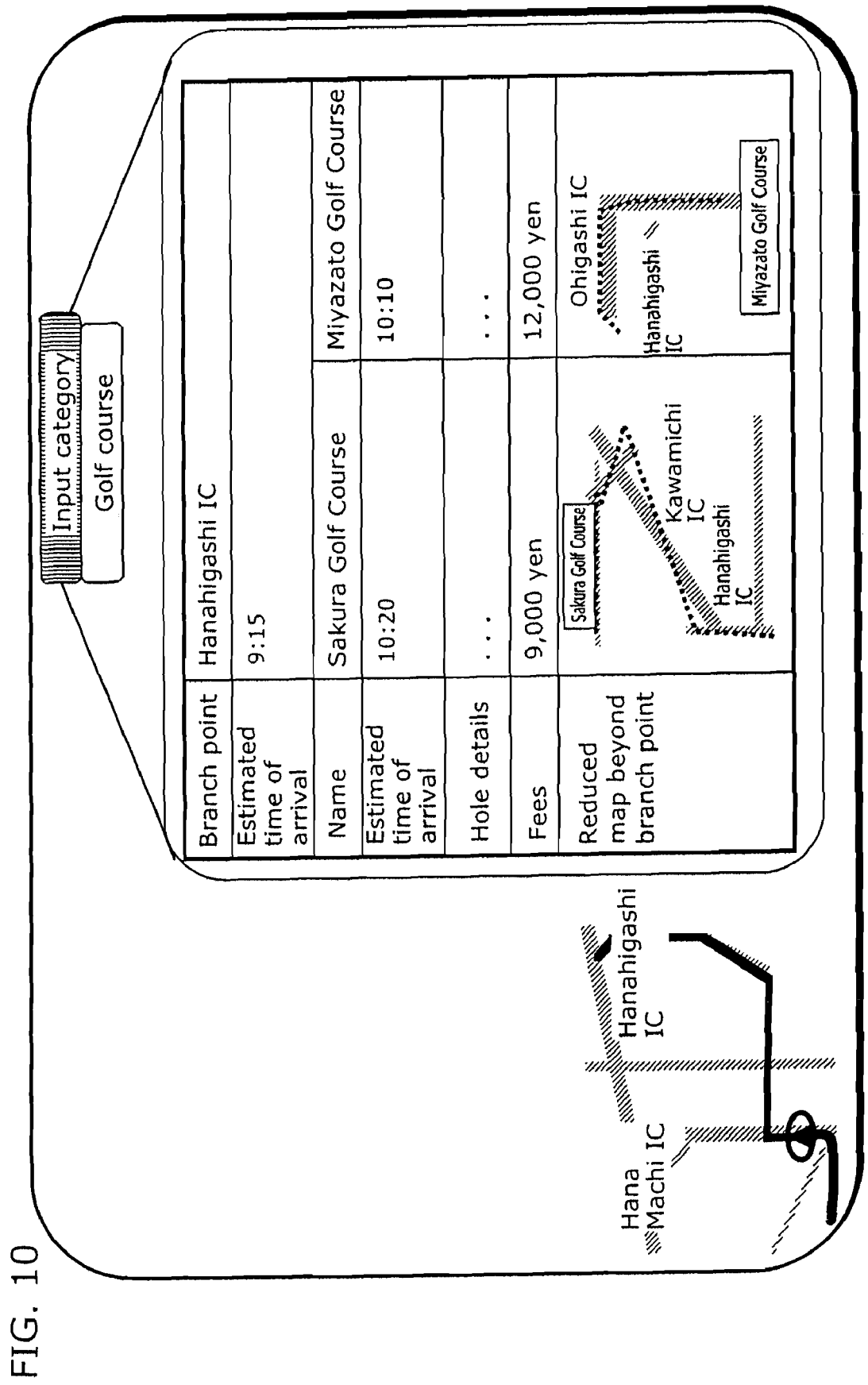
FIG. 10 is a diagram showing a display example of a screen according to the first embodiment.

Conversely, in cases where the drive up to the branch point constitutes a smaller portion of the total travel time, a display mode that displays a route from the branch point to a destination in detail (for instance, FIG. 10) may be adopted.

Accordingly, to be specific, the display control unit 1010 should be arranged to compare the distance between the above-mentioned departure point and the above-mentioned branch point with a threshold, and when the distance is shorter than the threshold, adopt a display mode which displays information from the branch point to the destination in detail. It is needless to say that the display control unit 1010 may adopt such a display mode according to the ratio of the distance between the above-mentioned departure point and the above-mentioned branch point and the distance between the above-mentioned branch point to a destination.

By switching display modes in this manner, information required by the user may now be automatically displayed in appropriate modes without cumbersome operations.

(Second Embodiment)

For the above embodiment, a method has been described in which a branch point on routes to a plurality of inputted destinations are calculated, and modes of information related to the destinations are controlled using the branch point. For instance, when searching for a plurality of destinations and determining which destination to head for, information up to the branch point is a matter of interest to the user, and in many cases, a subsequent destination will be determined according to the congestion condition or the estimated time of arrival at the branch point. In addition, there are also cases where a destination to which the user will ultimately head for is determined by contrasting and displaying information beyond the branch point. Therefore, by controlling the modes of such provided information using the branch point, it is now possible to enable information to be comprehended without cumbersome operations.

On the other hand, as for the calculation of a branch point according to the above-described embodiment, a branch point is calculated by, for instance, respectively searching routes to a plurality of inputted destinations and referencing common points and differences thereof. Since the searched routes are searched based on route costs (required time, distance and the like) of a road network which are accumulated in map information, a branch point is not necessarily appropriate to the user. For instance, depending on the user, there may be cases where a specific route is passed when heading for any of the inputted destinations, and as a result, branch points may vary.

In consideration thereof, for the present embodiment, a method will be described which, for instance, accumulates histories of usual traveling of the user, and calculates a branch point in consideration of the travel histories.

Figure 17:
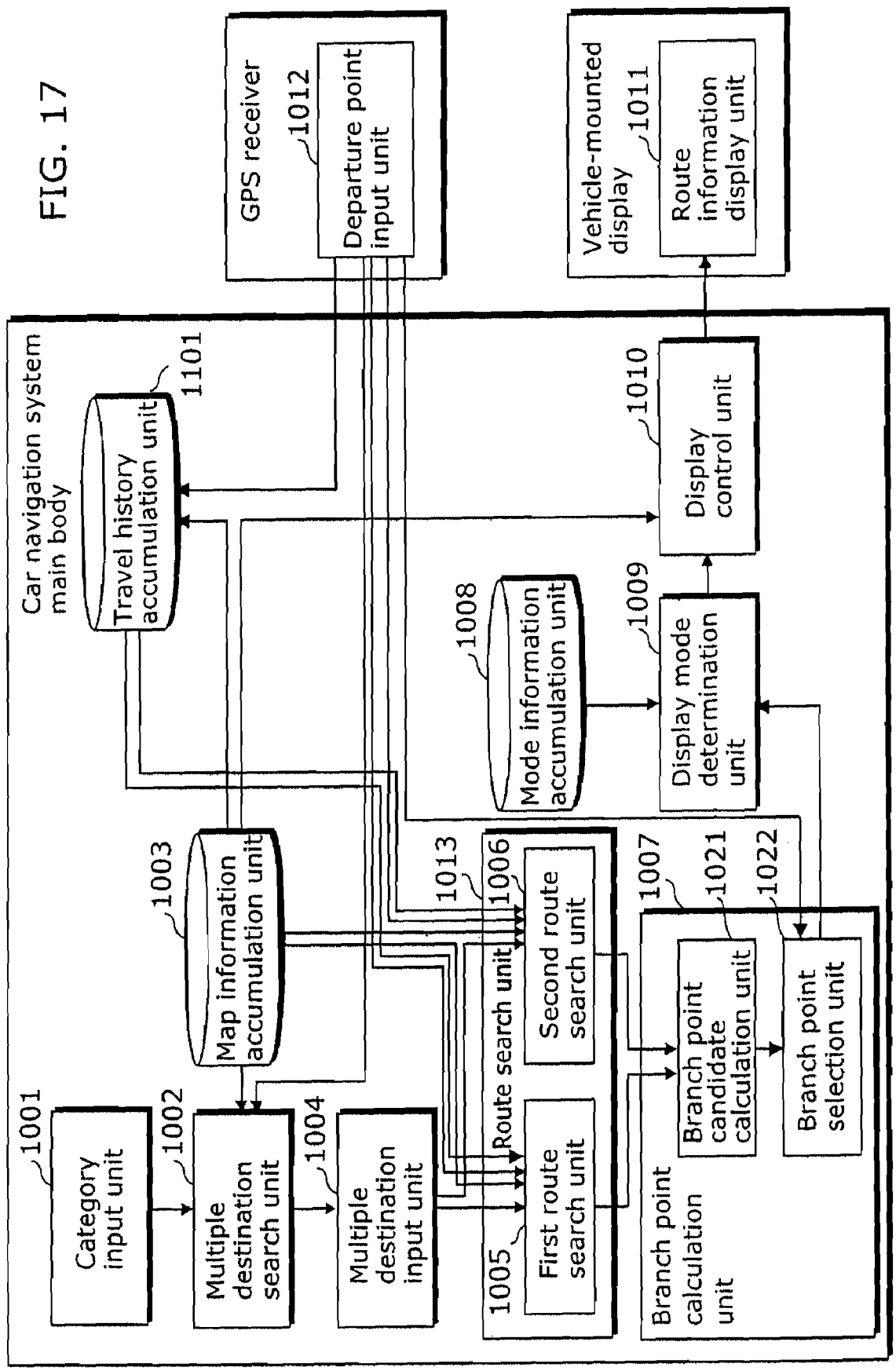
FIG. 17 is a system configuration diagram according to a second embodiment.

FIG. 17 is a system configuration diagram according to the present embodiment. The same reference numbers are assigned to the components shown in the above-described embodiment and the descriptions about the same components will not be provided.

A travel history accumulation unit 1101 is a unit which accumulates past traveling of the user as a history. In the present embodiment, it is assumed that a travel history is accumulated according to, for instance, a sequence of passed intersections, based on latitude/longitude information detected by the departure point input unit 1012 that is configured by a GPS and the like and map information accumulated in the map information accumulation unit 1003.

Incidentally, in the present embodiment, while the departure point input unit 1012 is arranged as a unit which detects a current location of the user, a unit for detecting a current location of the user may be provided separately and positional information acquired therefrom may be accumulated as a travel history. Generally, a GPS provided in a car navigation system and the like detects latitude and longitude at 1 second intervals. As a result, the sequence of latitude/longitude information detected with traveling of the user will become enormous. In addition, detected latitudes and longitudes generally have some margin of error. Therefore, in consideration of ease of subsequent matching and searching, accumulation will be performed according to a sequence of nodes such as passed intersections using map information, instead of a sequence of latitude/longitude information.

Furthermore, in the present invention, route search and calculation of branch points are based on a sequence of these nodes. Therefore, even from the context of consistency therewith, a travel history is preferably accumulated as a node sequence. Incidentally, while, in the present embodiment, the travel history accumulation unit 1101 performs conversion of a node sequence from latitude/longitude information, the conversion may alternatively be performed by separately providing a unit which performs conversion.

FIG. 18 shows histories of destinations accumulated in the travel history accumulation unit 1101. For instance, a sequence of a departure point, passed intersections and transit times, and arrival at a final destination is accumulated as a single travel history. For instance, travel history ID "01" indicates that, previously, the user had left "home", passed "Hana 1 Machi (intersection)", "Hana 2 Machi", "No. 111", "Yamano 2 Machi" and "Yamano 3 Machi", and arrived at "Miyazato Golf Course". In the present embodiment, these travel histories are used to calculate a branch point on routes to a plurality of searched destinations. A description will now be provided using a specific example.

In a similar manner to the above-described embodiment, it is assumed that, for instance, "golf course" is inputted as a destination category, and that "Miyazato Golf Course" and "Sakura Golf Course" are searched out. Then, routes to the plurality of destinations are searched by the first route search unit 1005 and the second route search unit 1006.

FIG. 19 shows the searched routes. In FIG. 19, a searched route ID "01" is a route searched by the first route search unit 1005, and indicates that a route to a final destination "Miyazato Golf Course" which passes the nodes of "Hana 1 Machi", "Hana Machi IC (interchange)", "Hanahigashi IC", and "Ohigashi IC", has been searched out. In the same manner, a searched route ID "02" is a route searched by the second route search unit 1006, and indicates that a route to a final destination "Sakura Golf Course" which passes the nodes of "Hana 1 Machi", "Hana Machi IC", "Hanahigashi IC", and "Kawamichi IC", has been searched out.

Additionally, in the same manner as the above-described embodiment, a calculation of a branch point by the branch point calculation unit 1007 reveals that the nodes "Hana 1 Machi", "Hana Machi IC" and "Hanahigashi IC" match, while the nodes "Ohigashi IC" and "Kawamichi IC" differ. Thus, "Hanahigashi IC", which matches last, becomes the branch point.

Figure 20:
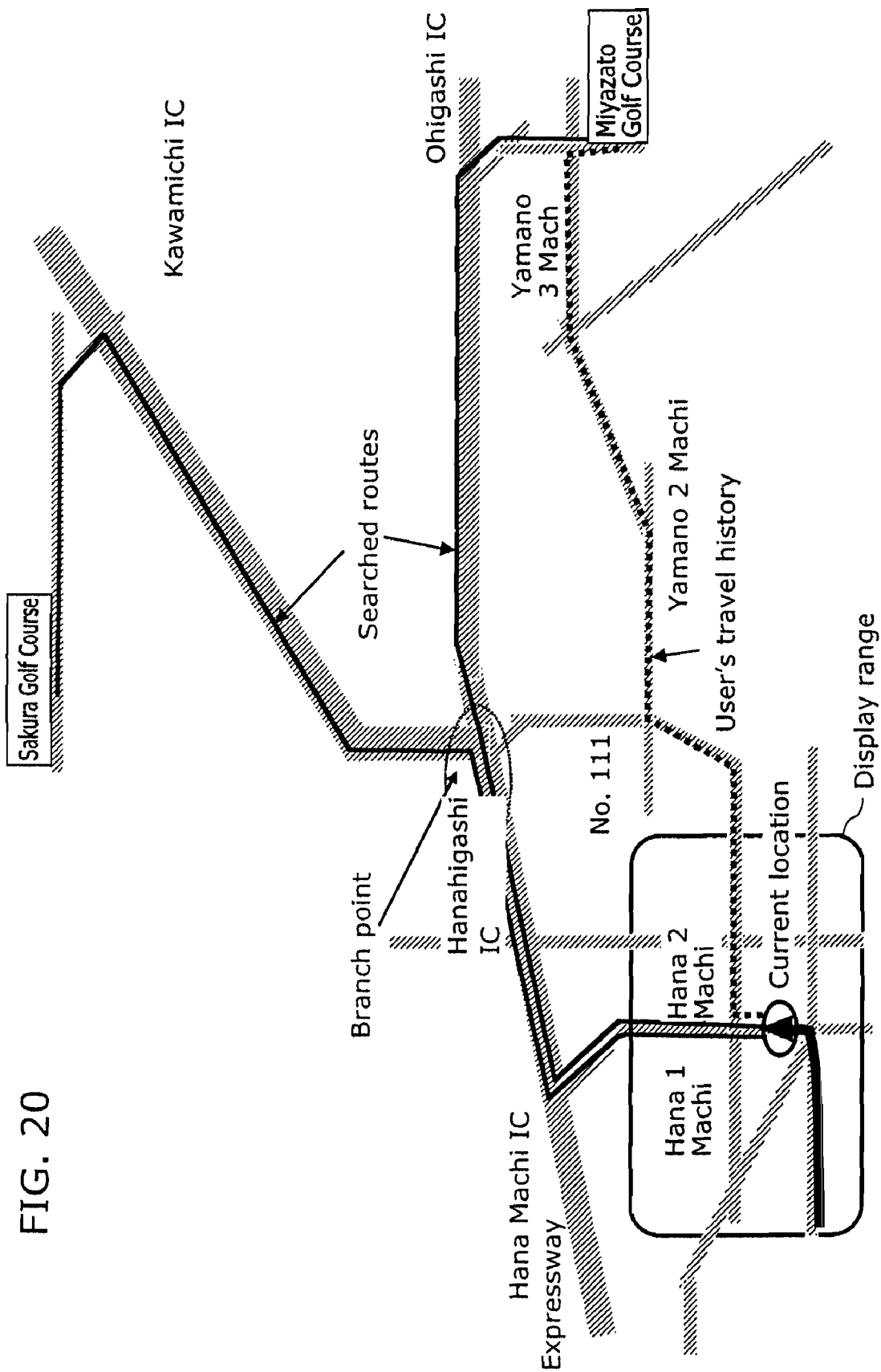
FIG. 20 is a diagram showing searched routes according to the second embodiment.

FIG. 20 is a map representation of a relationship between the afore-mentioned searched routes. FIG. 20 shows a current location of the user, "Miyazato Golf Course" and "Sakura Golf Course" which are destinations, as well as the searched routes to the respective golf courses. As shown in FIG. 20, the routes to both golf courses proceed from the current location and straight through the intersection "Hana 1 Machi", gets on the expressway at "Hana Machi IC", and branches at "Hanahigashi IC". After passing "Hanahigashi IC" that is the branch point, a route to "Miyazato Golf Course" via "Ohigashi IC" and a route to "Sakura Golf Course" via "Kawamichi IC" are indicated by black bold lines.

However, in a case where a branch point is simply calculated using the respective destinations as final destinations and by searching for routes to the respective destinations, a branch point suitable to the user is not necessarily calculated. For instance, the routes and the branch point shown in FIG. 20 are a result of searching for respective routes by using the respective destinations of "Miyazato Golf Course" and "Sakura Golf Course" as final destinations. Generally, as described in the above embodiment, a route search unit provided in a car navigation system and the like is arranged to calculate a route having a minimum cost based on the route costs of a road network which are accumulated in the map information. Therefore, in FIG. 20, shortest routes to the destinations "Miyazato Golf Course" and "Sakura Golf Course" which use the expressway are searched, and a branch point of "Hanahigashi IC" is calculated accordingly.

On the other hand, a route indicated by the black dotted line is a previous travel history of the user which is accumulated in the travel history accumulation unit 1101 shown in FIG. 18. For instance, for the case of the present example, suppose that the user uses general roads instead of the expressway to reach "Miyazato Golf Course" in order to save on expressway tolls. To be specific, a history is accumulated in which, after turning right at "Hana 1 Machi", the user reached "Miyazato Golf Course" via "Hana 2 Machi", "No. 111", "Yamano 2 Machi" and "Yamano 3 Machi" (FIG. 18).

Figure 21:
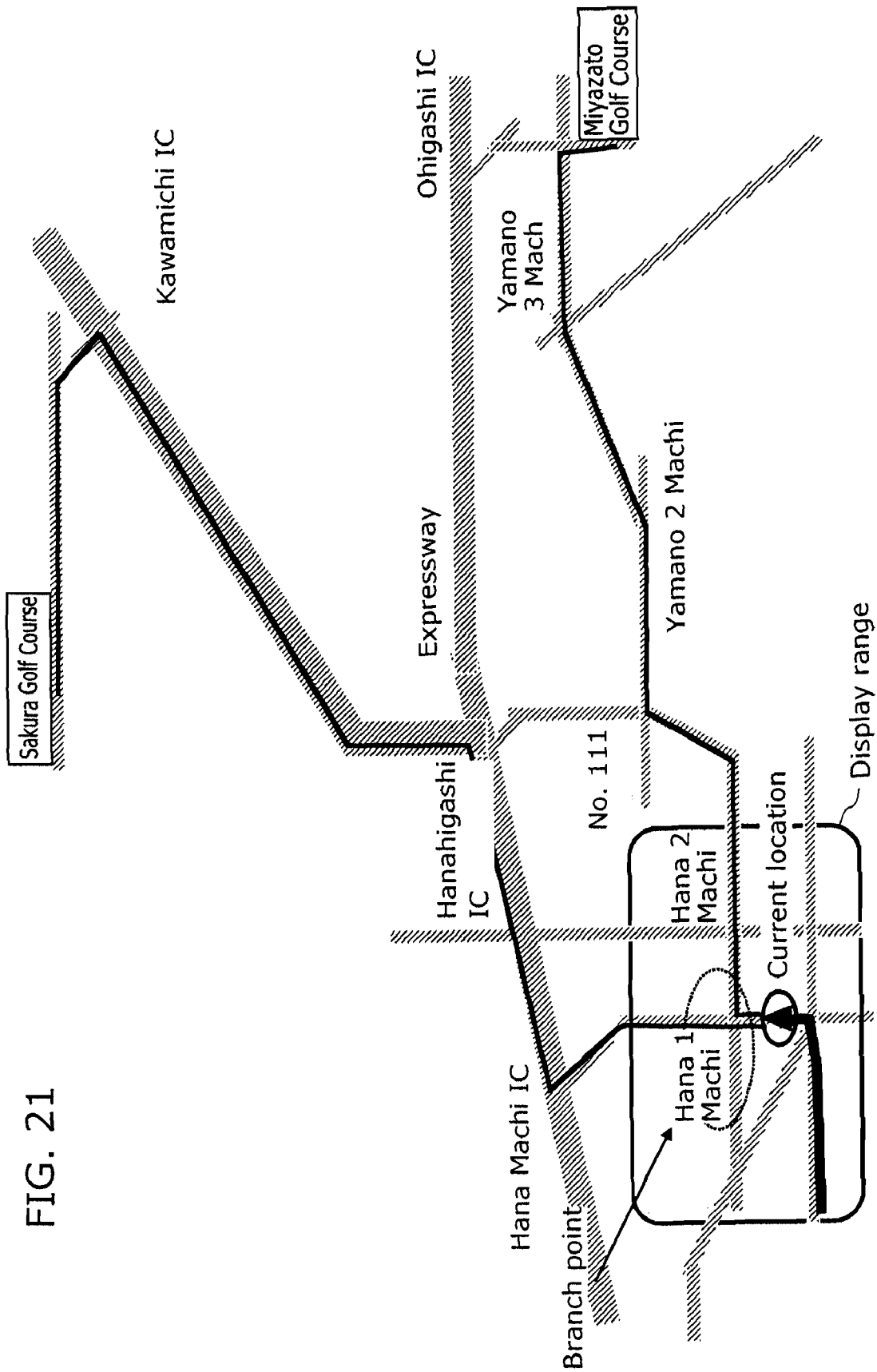
FIG. 21 is a diagram showing searched routes according to the second embodiment.

In this case, when the user ultimately decides to head for "Miyazato Golf Course", the branch point for the user is not "Hanahigashi IC" but "Hana 1 Machi". In other words, when the user determines to head for "Miyazato Golf Course", the user must turn right at "Hana 1 Machi". On the other hand, when the user determines to head for "Sakura Golf Course", the user must drive straight through "Hana 1 Machi". Therefore, the branch point is obviously "Hana 1 Machi" (FIG. 21). Additionally, it is necessary to encourage the user to decide where the user is ultimately headed by contrasting and displaying, prior to the user passing the branch point "Hana 1 Machi", traffic information up to the branch point or information beyond the branch point.

As seen, a branch point calculated by simply searching for routes to the respective destinations is not necessary suitable to the user. Therefore, travel histories of the user may be accumulated, whereby a branch point may be calculated by reflecting the travel histories. A travel history reflects tendencies in the everyday activities of the user, such as a tendency in which the user does not use expressways in order to save money, a tendency in which the user usually uses bypaths, or conversely, being a novice driver, a tendency to use wider roads. Therefore, a branch point that is more suitable may be calculated using a travel history.

In this light, in the present embodiment, routes to the respective destinations are searched for so that a route indicated in a travel history of the user is traced (in other words, duplicated) as long as possible; candidate points for a branch point are calculated from the searched routes; the branch point is searched from the points; and route information based on the selected branch point is displayed. In the present embodiment, the branch point calculation unit 1007 further includes a branch point candidate calculation unit 1021 and a branch point selection unit 1022 (FIG. 17).

First, the route search unit 1013 searches for a plurality of routes from a departure point inputted to the departure point input unit 1012 (in the present embodiment, a current point whereat searching is performed) to a destination inputted to the multiple destination input unit 1004 so that a route indicated in the travel history of the user, which is accumulated in the travel history accumulation unit 1101, is traced as long as possible. Then, from the different searched routes, the branch point candidate calculation unit 1021 calculates a plurality of branch point candidates using the respective searched routes thereof. A description will now be provided using a specific example.

Figure 22:
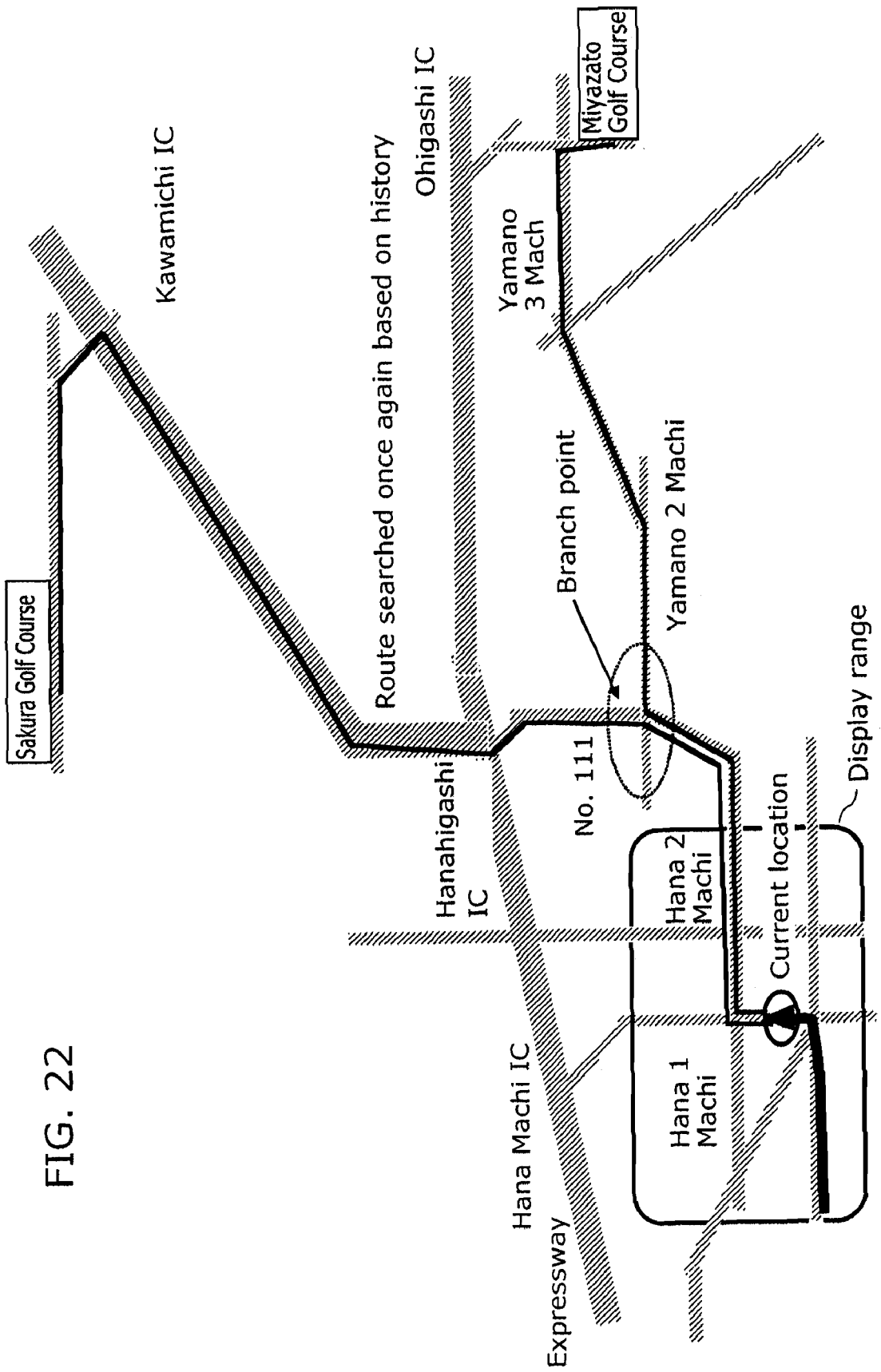
FIG. 22 is a diagram showing searched routes according to the second embodiment.

As described above, several routes respectively exist to the plurality of inputted destinations "Sakura Golf Course" and "Miyazato Golf Course". For instance, as for routes to one of the destinations, "Miyazato Golf Course", there is a route that passes the nodes "Hana 1 Machi", "Hana Machi IC", "Hanahigashi IC" and the like (FIG. 21), and a route that passes "Hana 1 Machi", "Hana 2 Machi" and "No. 111", which duplicates a route that exists in the history and is frequently used by the user (FIG. 22). In this case, the branch point with the searched route to the other destination, "Sakura Golf Course", which passes "Hana 1 Machi", "Hana Machi IC" and "Hanahigashi IC", is "Hanahigashi IC" in the case of the former route and "Hana 1 Machi" in the case of the latter route. Calculations may be performed using these points as branch point candidates.

The branch point selection unit 1022 is a unit which selects a branch point from the branch point candidates calculated by the branch point candidate calculation unit 1021. For instance, branch point selection may be delegated to the user to select which of the branch points should be preferably displayed as information, or automatic selection may be performed according to the distance from the current location.

In addition, a branch point from a route which traces the longest the route indicated in the user's travel history may be automatically selected. More specifically, in the present embodiment, the route that passes "Hana 1 Machi", "Hana 2 Machi" and "No. 111" may be prioritized on the basis that such a route exists in the travel history and is likely to be used by the user. In other words, the branch point "Hana 1 Machi" may be automatically selected.

Furthermore, this travel history may also be reflected on the route to "Sakura Golf Course" to calculate a more suitable branch point. For instance, when traveling to "Miyazato Golf Course", the user of the present example saves the expressway toll by turning right at "Hana 1 Machi" and using general roads such as "Hana 2 Machi" and "No. 111". On the other hand, since the user has never been to "Sakura Golf Course", a travel history thereto does not exist. Therefore, a general route search is performed and a route that proceeds straight through "Hana 1 Machi", gets on "Hana Machi IC", and reaches "Sakura Golf Course" via "Hanahigashi IC" and "Kawamichi IC" is searched. In addition, a branch point "Hana 1 Machi" is calculated from these routes.

However, such a branch point calculated simply from a route with a minimum cost may not necessary be suitable to the user. For instance, in the case of the present example, general roads such as "Hana 2 Machi" and "No. 111" may also be used when heading for "Sakura Golf Course". Therefore, a suitable branch point may be calculated by once again searching a route to "Sakura Golf Course" so that the route to "Miyazato Golf Course", which is a route to the other destination and which is accumulated in the history, may be traced as long as possible.

FIG. 22 shows a branch point calculated by once again searching for a route to "Sakura Golf Course" using the route to "Miyazato Golf Course", which exists in the history. For instance, as a result of a search for a route to "Sakura Golf Course" from a given intersection on the route to "Miyazato Golf Course" that exists in the history, in the case of the present example, a route that turns right at "Hana 1 Machi" and includes "Hana 2 Machi" and "No. 111" is shared, and a subsequent route is searched which departs from "No. 111" in a northward direction (upward direction), gets on the expressway at "Hanahigashi IC" and heads for "Sakura Golf Course". In addition, "No. 111" is set as the branch point.

As seen, instead of calculating a branch point by simply searching for routes for the current location to the respective destinations, routes may be searched in consideration to a travel history to calculate a branch point. In particular, when one of the routes exists in the travel history while the other route does not, calculating a route to the other destination based on a route existing in the travel history of the one of the routes instead of simply searching for a shortest route will also mean that the user will head for the other destination from a route which the user frequently uses and is familiar with. Therefore, even in cases where the user is an inexperienced driver or in cases where the user is unfamiliar with the area, the user may head for the final destination with ease.

Additionally, it is likely that the user will generally make a left or right turn at the branch point when heading for one of the destinations or, even when heading for either one of the destinations. Therefore, considering the travel history and causing the user to make a left or right turn with reference to a location that is usually well known to the user enables safer driving without increasing the burden on attention, and is an extremely effective method for providing route information.

Figure 23:
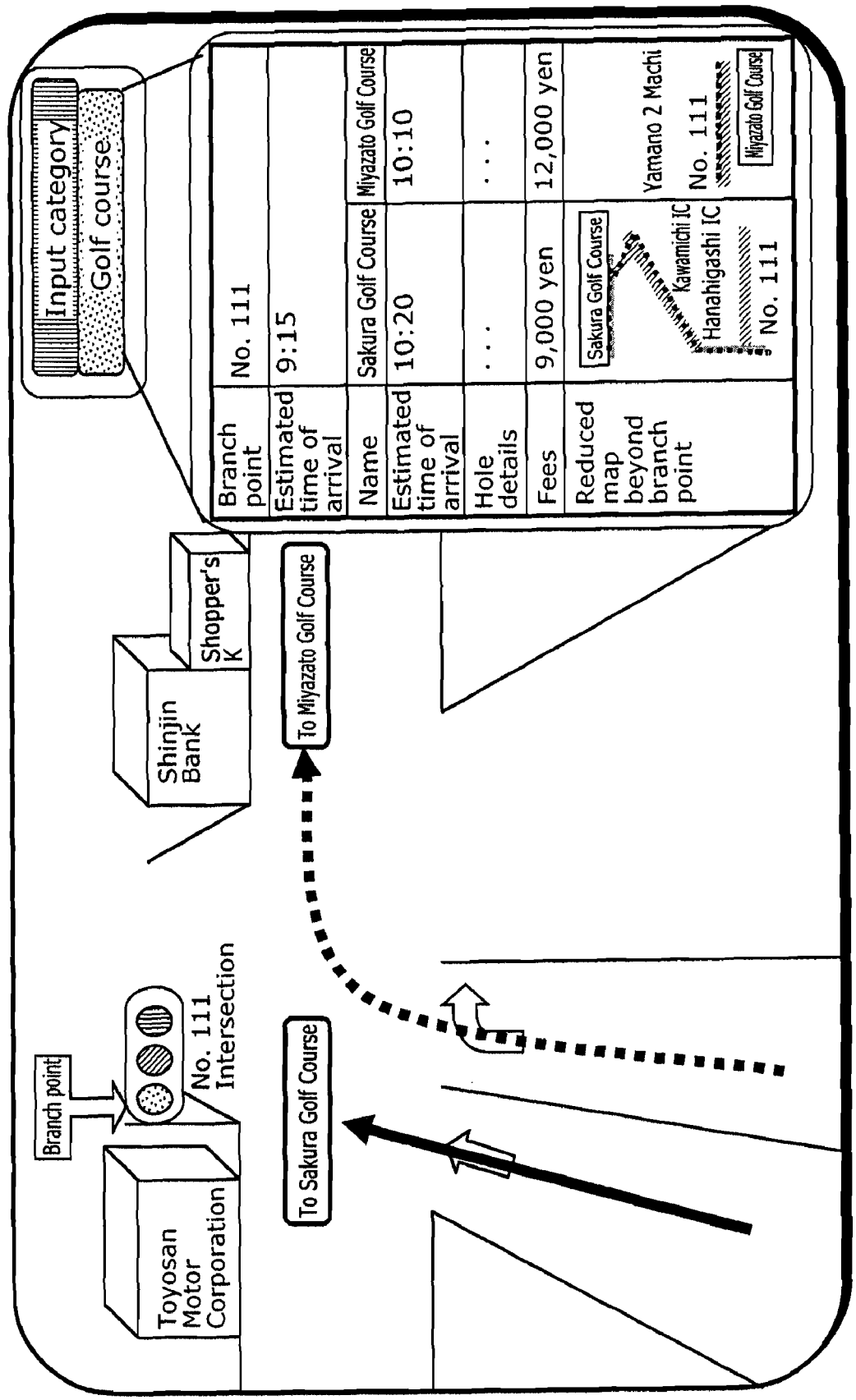
FIG. 23 is a diagram showing a display example of a screen according to the second embodiment.

FIG. 23 shows an example in which route information is displayed based on the above-mentioned calculated branch point "No. 111". For instance, route information beyond the branch point "No. 111" is contrasted and displayed at the right-hand side of the screen in the same manner as in FIG. 9. This allows differences in the required times subsequent to the branch point and the like to be easily comprehended.

In addition, the left-hand side of the screen is an example of a detailed display of the position of the branch point "No. 111". For instance, it is shown that the branch point "No. 111" is an intersection, and that stores such as "Toyosan Motors", "Shinjin Bank" and "Shopper's K" are located near the intersection. Additionally, an arrow (dotted line) indicates that "Miyazato Golf Course" may be reached by turning right as usual at "No. 111". On the other hand, an arrow (black bold line) indicates that "Sakura Golf Course" may be reached by proceeding straight through "No. 111".

Intersection "No. 111" is a position accumulated in the travel history or, in other words, a position that the user is familiar with. Therefore, by displaying the vicinity of "No. 111" in detail, the user will be able to comprehend in greater detail how routes may branch at the usually familiar intersection towards the other destination.

A variation may be contemplated which uses a travel history for the estimation of a destination. In this variation, for instance, the multiple destination input unit 1004 may search for positions included in a predetermined range from the direction in which a vehicle is currently headed from the travel history accumulation unit 1101, whereby the searched positions are inputted as an estimated destination. This case is an example in which the multiple destination input unit 1004 doubles as a destination prediction unit and a destination input unit as described in the claims.

Figure 24:
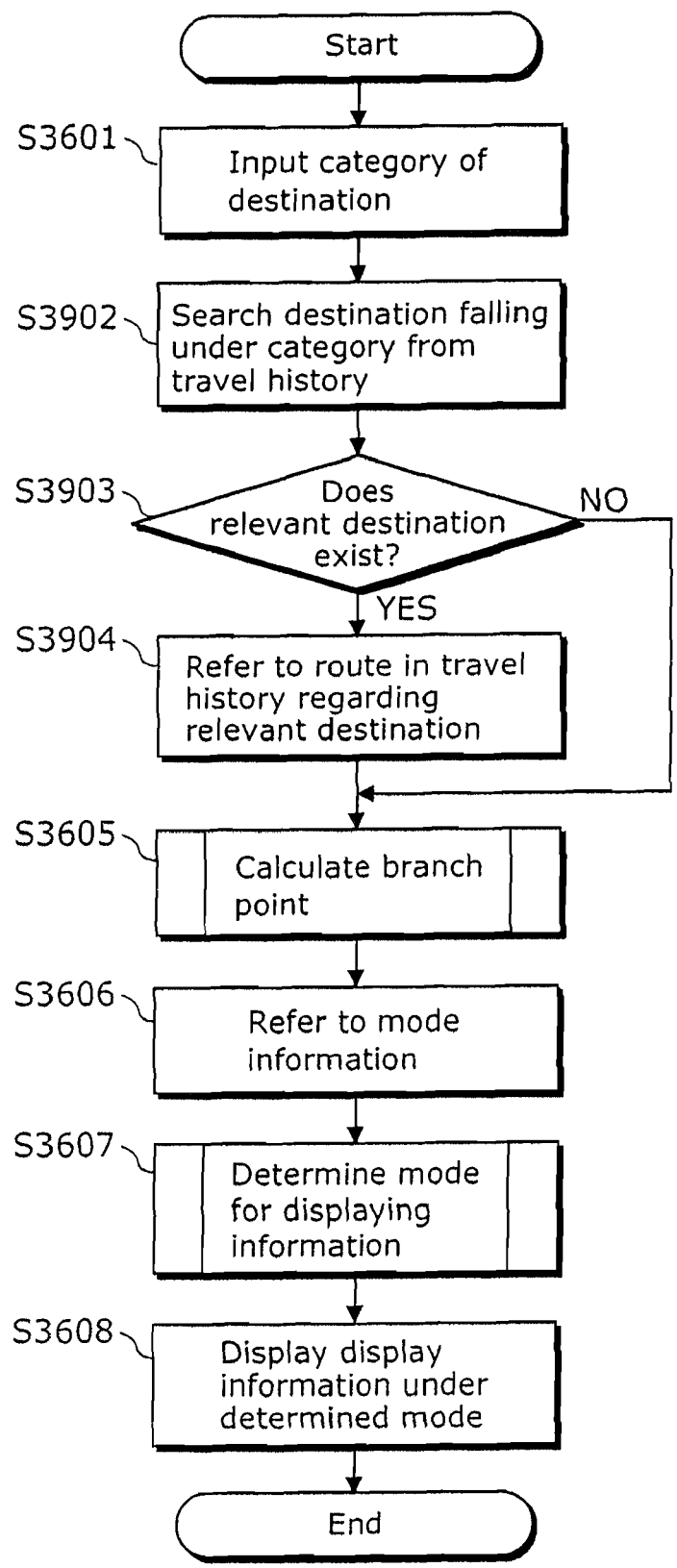
FIG. 24 is a flowchart according to the second embodiment.
Figure 25:
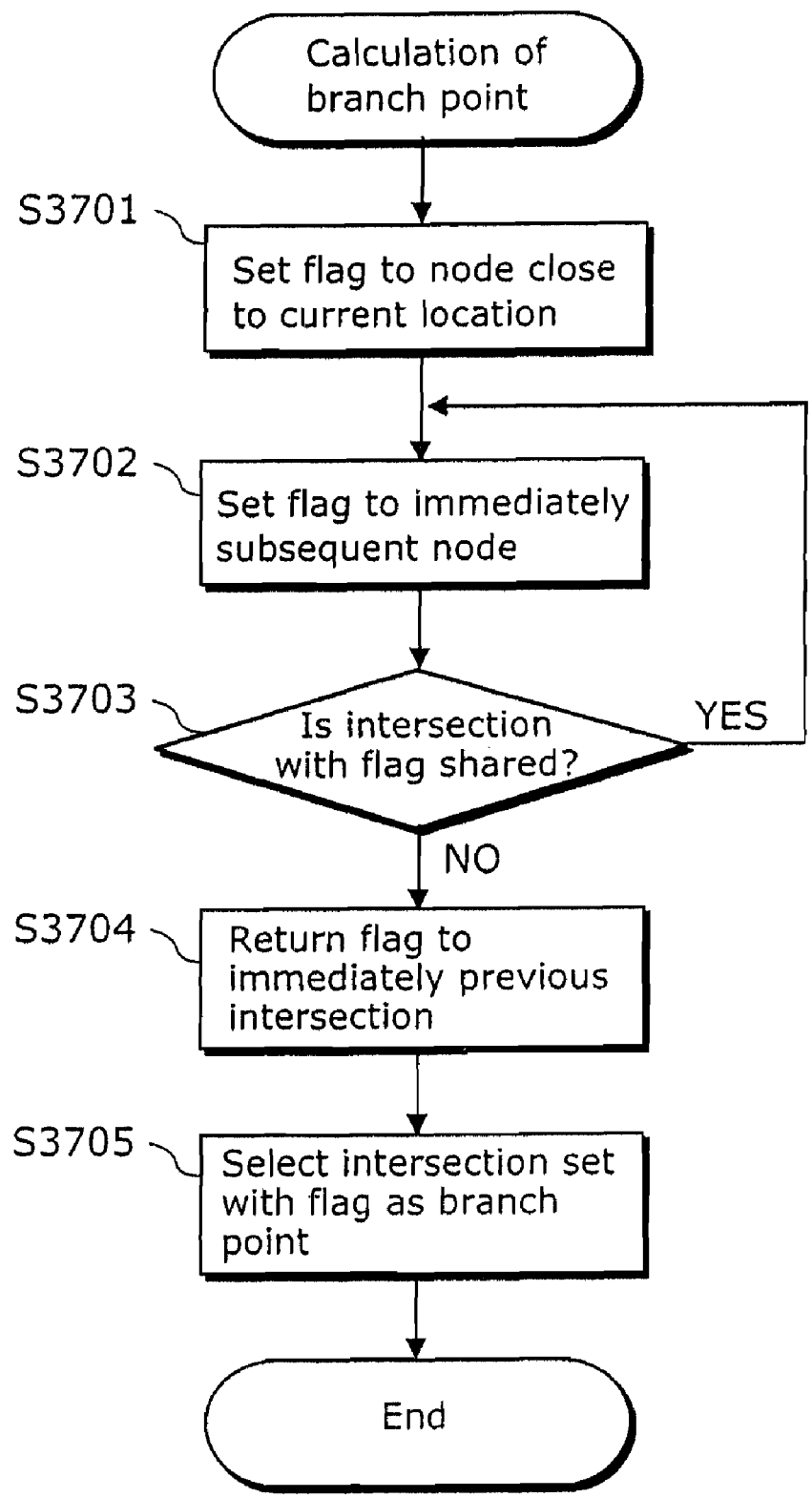
FIG. 25 is a flowchart according to the second embodiment.

A flow of operations of the present embodiment will now be described with reference to the flowcharts shown in FIGS. 24 and 25.

First, in the same mariner as the above-described first embodiment, a category is inputted to the category input unit 1001 (S3601). Then, destinations falling under the inputted category is searched from a travel histories accumulated in the travel history accumulation unit 1101 (S3902). Judgment is performed on whether a relevant destination exists in the travel history (S3903). If so, the processing proceeds to step S3904, and if not, a branch point is calculated in the same manner as the above-described first embodiment (to S3605). If so (Yes in S3903), routes accumulated in the travel history accumulation unit are further referred to (S3904). Then, a branch point is calculated by the branch point calculation unit 1007 using the travel history (S3605).

The calculation of a branch point is the same as in the above-described first embodiment. However, in the present embodiment, a branch point is calculated using a route accumulated in the travel history, instead of using a route searched by the route search unit. Calculation of a branch point is commenced by setting a flag to a node nearest to the current position (S3701), and setting the flag to an immediately subsequent node (S3702). With the searched route shown in FIG. 21, a flag is set to the intersection "Hana 1 Machi". Next, judgment is performed in whether the set flag is shared (S3703). If shared (Yes in S3704), the processing proceeds to step S3702, and if not (No in S3704), the processing proceeds to step S3704. Since "Hana 1 Machi" is shared by both, a flag is set to the immediately subsequent node (S3702). The flag moves to "Hana Higashi IC" by repeating this loop. In other words, this indicates that the route thus far is shared. Next, as a result of setting the flag to the immediately subsequent node (S3702), flags are set to different nodes, namely, "Ohigashi IC" and "Kawamichi IC" (No in S3703). At this point, the flag is returned to the immediately previous node (S3704), and the node to which the flag is set is calculated as a branch point (S3705). In other words, "Hanahigashi IC" becomes the branch point. In the case of FIG. 21, "Hana 1 Machi" becomes the branch point.

Next, in the same manner as in the above-described first embodiment, mode information is referred to (S3606), mode information is determined (S3607), and information display is performed using the calculated branch point (S3608).

(Description of Minimum Components According to the Second Embodiment)

Additionally, with respect to inputs to the multiple destination input unit 1004, while, in the present embodiment, components such as the category input unit 1001 and the like are provided and points falling under a category is searched from the map information accumulation unit 1003 by the multiple destination search unit 1002, inputs are not limited to this arrangement. Instead, a destination may be directly inputted to the multiple destination input unit 1004 to perform route search and calculate a branch point.

Furthermore, while route search has been described by providing respective route search units, namely, the first route search unit 1005 and the second route search unit 1006, search of respective routes may be performed by, for instance, a single route search unit (for instance, using the first route search unit 1005 as a route search unit 1005).

Moreover, while modes accumulated in the mode information accumulation unit 1008 have been referred to in order to change modes based on a branch point, such mode information is not a requisite component, and information related to a branch point may be directly displayed on the route information display unit 1011 instead.

Figure 26:
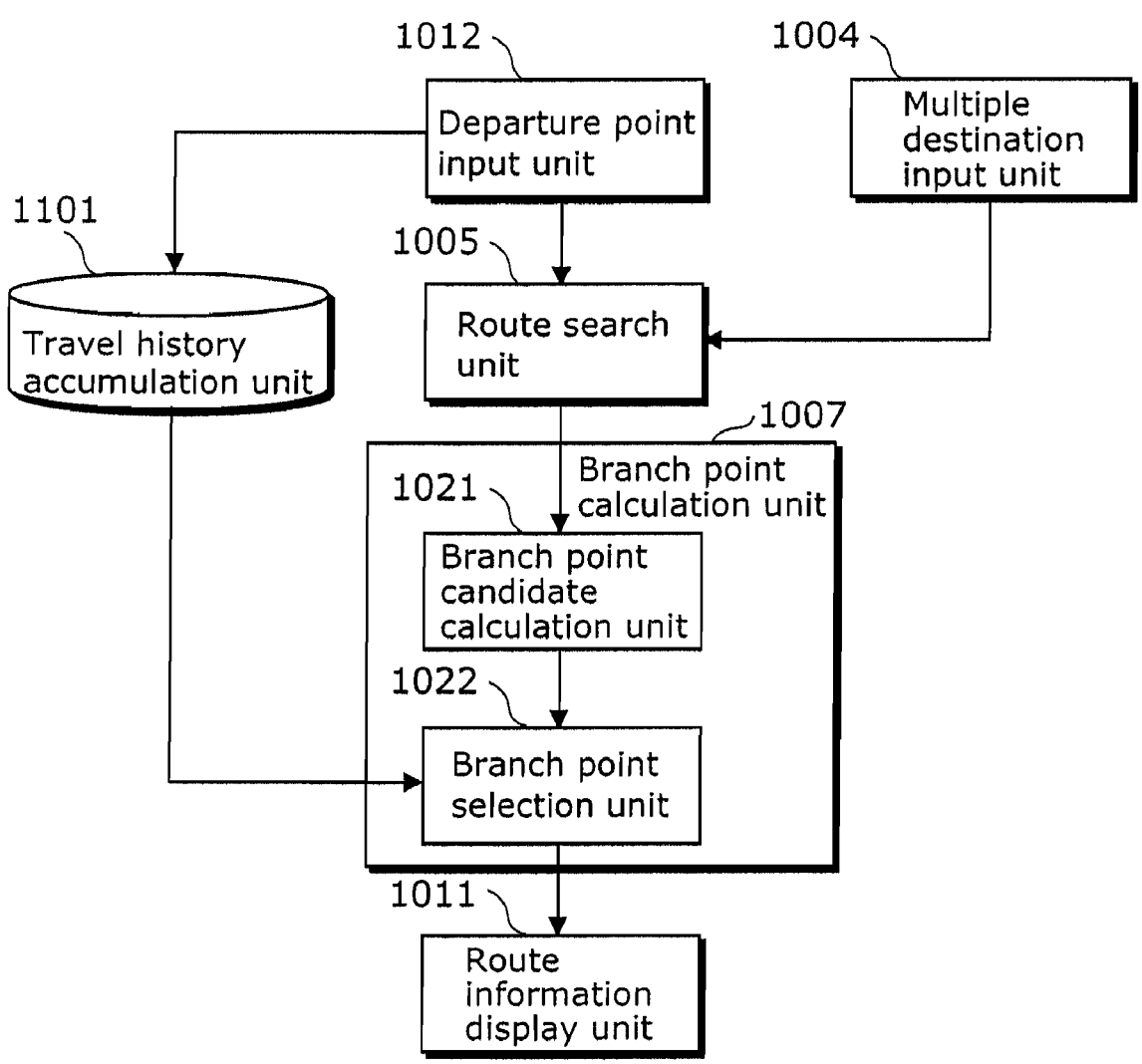
FIG. 26 is a system configuration diagram according to the second embodiment.

In other words, the components required to implement the present invention is not limited to FIG. 1, and for instance, the present invention may be implemented with the components shown in FIG. 26. FIG. 26 shows system components of the present invention, including: the multiple destination input unit 1004; the departure point input unit 1012; the route search unit 1005; the branch point calculation unit 1007; the branch point candidate calculation unit 1021; the branch point selection unit 1022; the route information display unit 1011; and the travel history accumulation unit 1101.

Details of the respective components are as described above. Several different routes from a departure point inputted to the departure point input unit 1012 to respective destinations inputted to the multiple destination input unit 1004 are searched by the route search unit 1005, and branch point candidates are calculated by the branch point candidate calculation unit 1021 of the branch point calculation unit 1007. Then, a branch point is selected by the branch point selection unit 1022 from the calculated branch point candidates based on travel histories accumulated in the travel history accumulation unit 1101. Subsequently, the branch point will be displayed on the route information display unit 1011.

Figure 27:
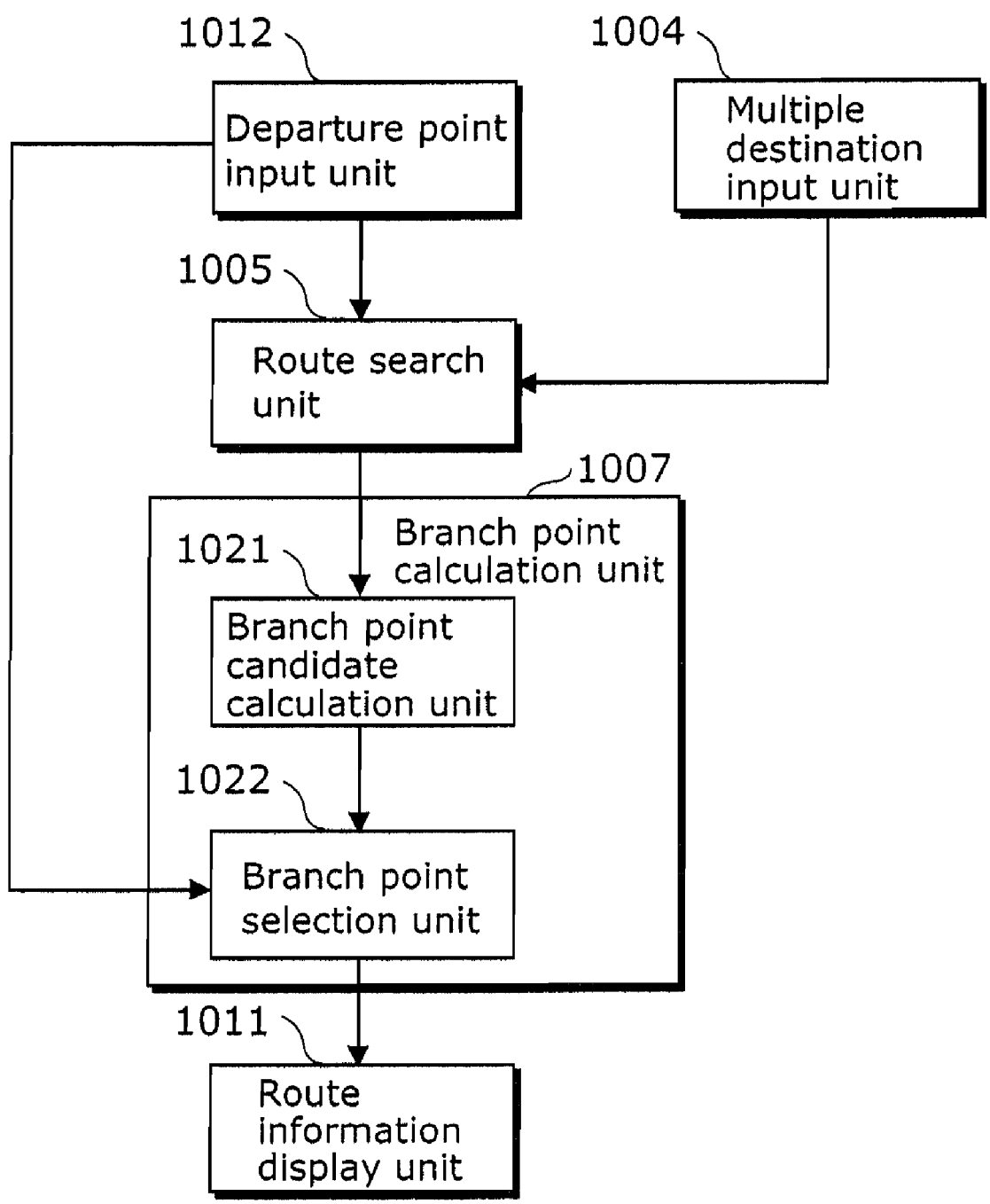
FIG. 27 is a system configuration diagram according to the second embodiment.

Incidentally, the travel history accumulation unit 1101 is not always necessary. A branch point may be selected based on the distance from a departure point (in the present embodiment, the current position of the user is used) inputted to the departure point input unit 1012. Therefore, selection of a branch point may be performed using, for instance, the components shown in FIG. 27. FIG. 27 shows system components of the present invention, including: the multiple destination input unit 1004; the departure point input unit 1012; a route search unit 1005; the branch point calculation unit 1007; the branch point candidate calculation unit 1021; the branch point selection unit 1022; and the route information display unit 1011.

Details of the respective components are as described above. Several different routes from a departure point inputted to the departure point input unit 1012 to respective destinations inputted to the multiple destination input unit 1004 are searched by the route search unit 1005, and branch point candidates are calculated by the branch point candidate calculation unit 1021 of the branch point calculation unit 1007. Then, a branch point is selected by the branch point selection unit 1022 from the calculated branch point candidates based on the departure point inputted to the departure point input unit 1012. Subsequently, the branch point is displayed on the route information display unit 1011. A description will now be provided using a specific example.

Figure 28:
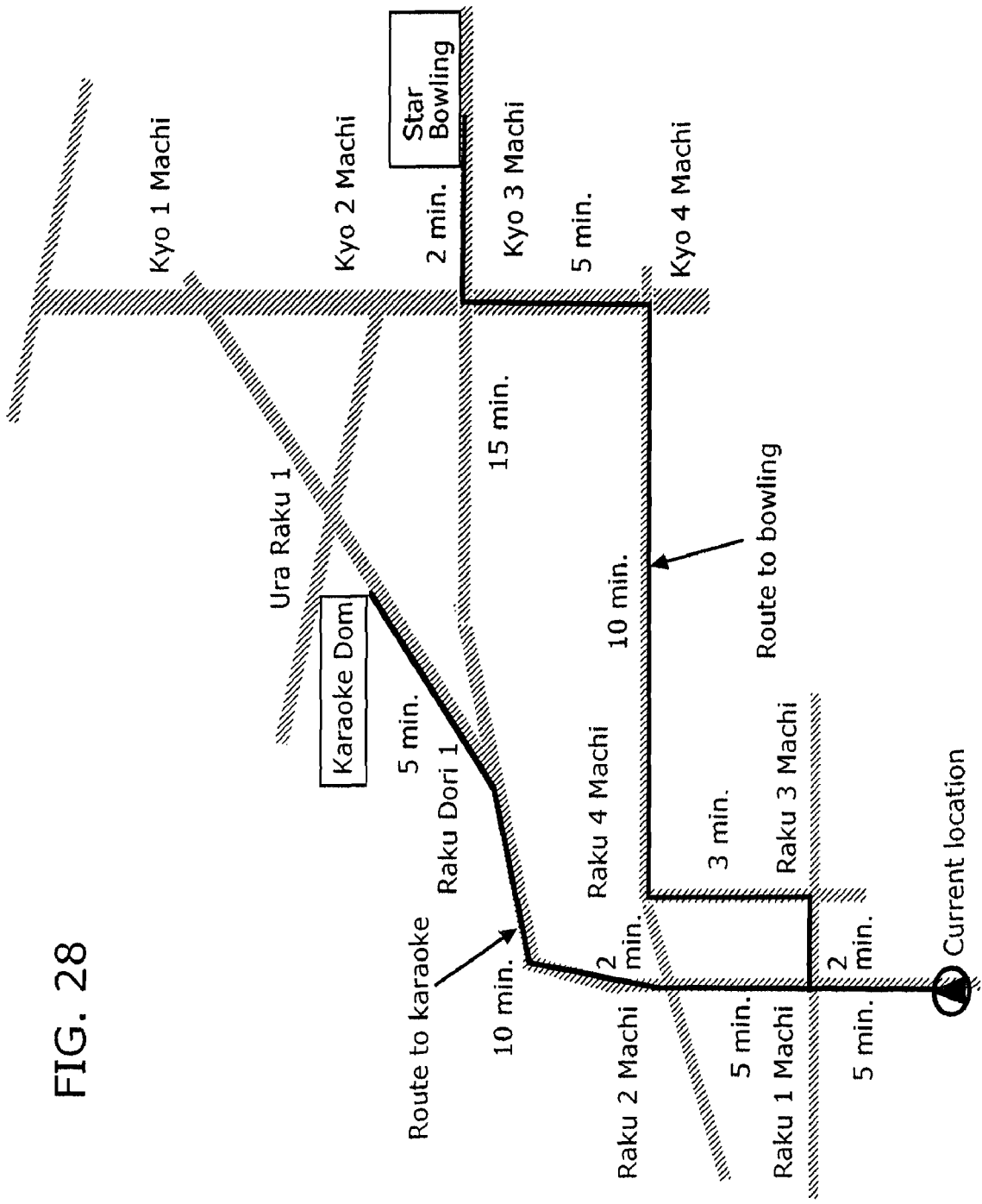
FIG. 28 is a diagram showing branch point calculation according a variation of the second embodiment.

Assume that, for instance, a category of "amusement" or the like has been inputted by the user, and "Karaoke Dom" and "Star Bowling" have been searched out as destinations. In other words, inputs to the multiple destination input unit 1004 are "Karaoke Dom" and "Star Bowling". FIG. 28 is a map representation of the current location of the user as well as the locations of "Karaoke Dom" and "Star Bowling".

In order to calculate a branch point at the branch point calculation unit 1007, routes to these destinations are first calculated. Routes from the current point inputted at the departure point input unit 1012 to the respective destinations are searched by the route search unit 1005.

Generally, as for routes to a destination, a shortest route is searched for using costs corresponding to transmit times or distances of routes. The black bold lines in FIG. 28 indicate searched routes to these destinations, and are considered the results of a search performed by, for instance, a general route search unit. In FIG. 28, the route to "Karaoke Dom" is a route that passes the intersections of "Raku 1 Machi", "Raku 2 Machi" and "Raku Dori 1". On the other hand, the route to "Star Bowling" is a route that passes the intersections of "Raku 1 Machi", "Raku 3 Machi", "Raku 4 Machi", "Kyo 4 Machi" and "Kyo 3 Machi".

Additionally, in this case, it is assumed that the route costs are the transit times between these intersections (nodes). These costs are shown in FIG. 28. For instance, the cost from the current location to "Raku 1 Machi" is 5 minutes; from "Raku 1 Machi" to "Raku 2 Machi" is 5 minutes; from "Raku 2 Machi" to "Raku Dori 1" is 10 minutes; and from "Raku Dori 1" to "Karaoke Dom" is 5 minutes. Therefore, the overall arrival time at "Karaoke Dom" from the current location is 25 minutes. In the same manner, to "Star Bowling", it takes 5 minutes to "Raku 1 Machi", 2 minutes to "Raku 3 Machi", 3 minutes to "Raku 4 Machi", 10 minutes to "Kyo 4 Machi", 5 minutes to "Kyo 3 Machi" and 2 minutes to "Star Bowling" for a total of 27 minutes.

FIG. 29 shows the results of these searched routes in a table format. The table shows the routes to the respective final destinations, as well as transit times up to the final destinations. A searched route ID "01" is a route to "Karaoke Dom". In this case, accumulated times are shown. Thus, the transit time at "Raku 1 Machi" is 5 minutes, while the transit time at "Raku 2 Machi" is 10 minutes, which is obtained by adding the 5 minutes to "Raku 1 Machi" with the 5 minutes from "Raku 1 Machi". In addition, a searched route ID "02" is a route to "Star Bowling". As seen, generally, in route search, costs between respective nodes are computed to calculate a shortest route.

Focusing now on the calculation of a branch point, in this case, the route up to "Raku 1 Machi" is shared, and the branch point is "Raku 1 Machi". However, as in this case, when the branch point is relatively close to the current location or when branching already occurs at the current location, the user will soon be faced with a need to decide on either one of the destinations. For instance, after further driving for a while, when attempting to change the destination in a flexible manner according to route conditions and final arrival times, the user will not be provided with sufficient time to think.

Therefore, for the present invention, a method will be described in which a plurality of routes is calculated, branch point candidates are calculated by the branch point candidate calculation unit 1021, and the branch point is calculated to a location that is closer to the destination or a location that is far from the current location is selected by the branch point selection unit 1022 from the branch point candidates.

For instance, among a plurality of inputted destinations, the destinations are compared and a plurality of routes to the destination that is further away from the current location is once again searched for. Incidentally, a plurality of routes to a destination that is further away is searched for because a plurality of routes is more likely to be calculated for a destination that is further away, and the time difference is smaller. On the other hand, when a plurality of routes to the destination that is closer is searched for, the plurality of routes will prove to be more time-consuming, and will end up being roundabouts. In the present example shown in FIG. 28, since the estimated time of arrival at "Star Bowling" is 27 minutes, which is more distant than the estimated time of arrival at "Karaoke Dom" of 25 minutes, routes to "Star Bowling" is calculated.

Figure 30:
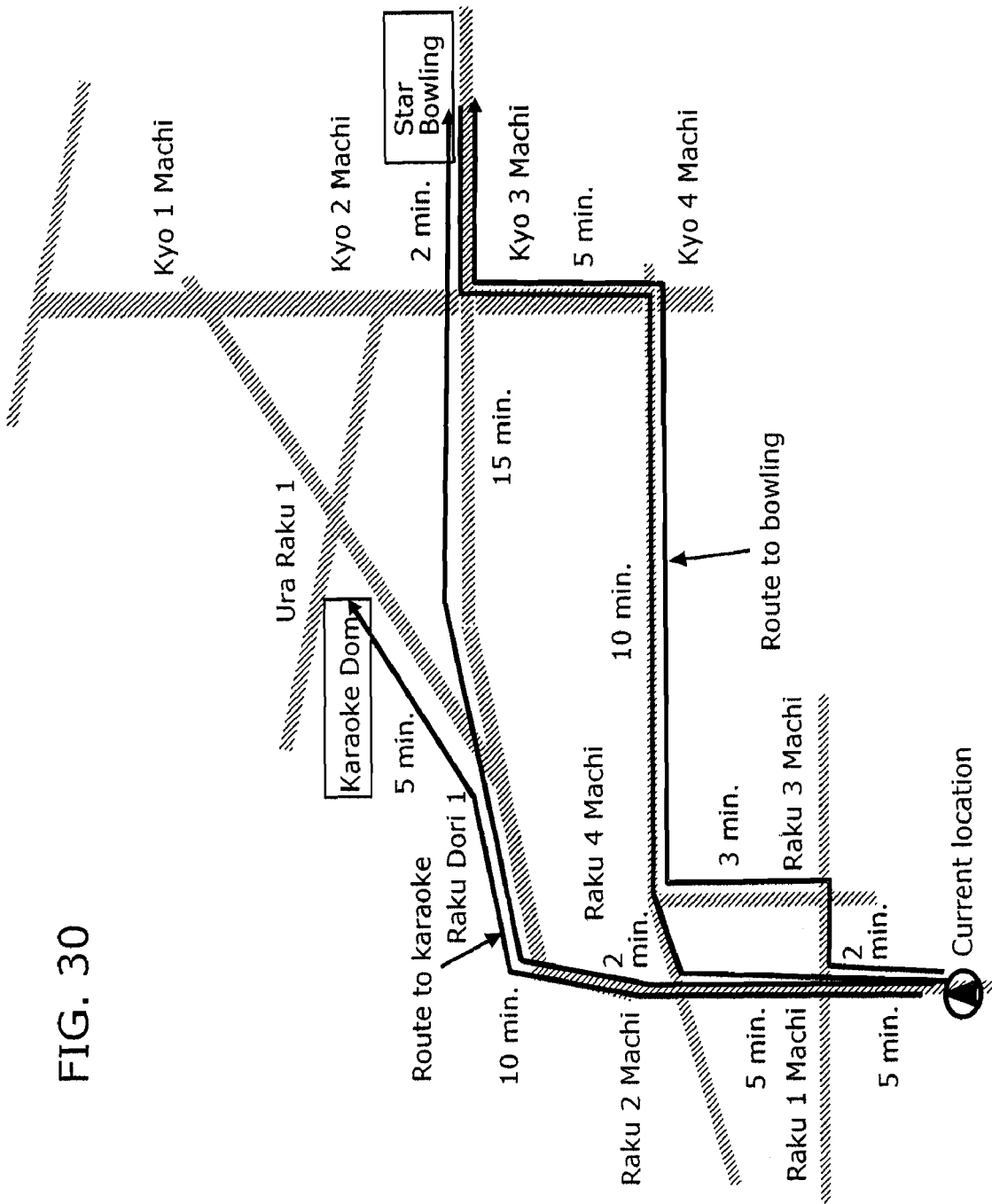
FIG. 30 is a diagram showing branch point calculation according to the variation of the second embodiment.

FIG. 30 shows a plurality of calculated routes to "Star Bowling". With respect to the shortest route from the current location that turns right at "Raku 1 Machi", two routes, namely, a route that proceeds straight through "Raku 1 Machi" and turns right at "Raku 2 Machi", and a route that proceeds straight through "Raku 1 Machi", "Raku 2 Machi" and turns right at "Raku Dori 1" have been newly calculated. FIG. 31 shows transits times for the plurality of routes using the transit time costs shown in FIG. 30. A route that turns right at "Raku 2 Machi" is shown as a searched route ID "03", while a route that proceeds straight through "Raku 1 Machi" and "Raku 2 Machi" is shown as a searched route ID "04".

A searched route ID "03" is a route that turns right at "Raku 2 Machi" and heads for "Star Bowling". From the current location, the route proceeds straight through "Raku 1 Machi" (transit time cost of 5 minutes), passes "Raku 2 Machi", "Raku 4 Machi", "Kyo 4 Machi" and "Kyo 3 Machi", and arrives at "Star Bowling". The overall transit time cost for this route is 29 minutes. While arrival time is 2 minutes later than the shortest route to "Star Bowling", which is indicated by the searched route ID "02" and which takes 27 minutes, this route shares its portion up to "Raku 2 Machi" with the route to "Karaoke Dom" that is indicated by the searched route ID "01". Thus the branch point is "Raku 2 Machi", and compared to "Raku 1 Machi", the branch point is calculated at a location that is further from the current location.

In addition, a searched route ID "04" is a route that proceeds straight through "Raku 2 Machi" and heads for "Star Bowling". From the current location, the route proceeds straight through "Raku 1 Machi" and "Raku 2 Machi" (transit time cost of 10 minutes), passes "Raku Dori 1" and "Kyo 3 Machi", and arrives at "Star Bowling". The total transit time cost for this route is 37 minutes. This route shares its portion up to "Raku Dori 1" with the route to "Karaoke Dom" that is indicated by the searched route ID "01". Thus the branch point is "Raku Dori 1", and compared to "Raku 2 Machi" or "Raku 1 Machi", the branch point is calculated at a location that is even more distant from the current location.

The user is faced with a situation where a plurality of destinations must be searched for and a determination must be made as to which destination the user will ultimately head for. However, when the branch point is relatively close to the current location, the user will soon be faced with the need to decide which destination the user will be heading for. For instance, after further driving for a while, when attempting to change the destination in a flexible manner according to route conditions and final arrival times, the user will not be provided with sufficient time to think.

Therefore, by using the present method to calculate a plurality of routes and select a branch point that is closer to a destination or a branch point that is further away from the current location (meaning the departure point), the user will be able to have enough time to comprehend information on a plurality of destinations and ultimately determine a destination.

On the other hand, compared to the shortest route to "Star Bowling", which is indicated by the searched route ID "02" and which takes 27 minutes, the searched route ID "04" takes 10 more minutes. In other words, among the three branch points, this branch point is calculated at a location that is furthest from the current location. However, this also means that the branch point is calculated as a relatively long detour compared to the shortest route. In this case, even if a branch point is calculated at a location that is far from the current location and the user is allowed time to make a final decision on a plurality of destinations, in a case where the user ultimately decides to travel to "Star Bowling", a route requiring 37 minutes, which exceeds the shortest travel time of 27 minutes by 10 minutes, is unfavorable.

Accordingly, a branch point may be arranged to be calculated in consideration of not only the location of the branch point, but also the route time cost. For instance, with respect to a shortest time of 27 minutes, a branch point may be calculated by setting a threshold (for instance, within plus 20 percent) using the required time of the shortest route as a reference, such as a buffer of plus 20 percent (approximately 6 minutes). In this case, since the searched route ID "04" with an arrival time of 37 minutes exceeds the threshold, the searched route ID "03" is used, and "Raku 2 Machi" becomes the branch point.

In addition, respective routes to a plurality of destinations need not be calculated, and one of the destinations may be used instead as an intermediate point. A description will now be provided with reference to FIGS. 32 and 33.

Figure 32:
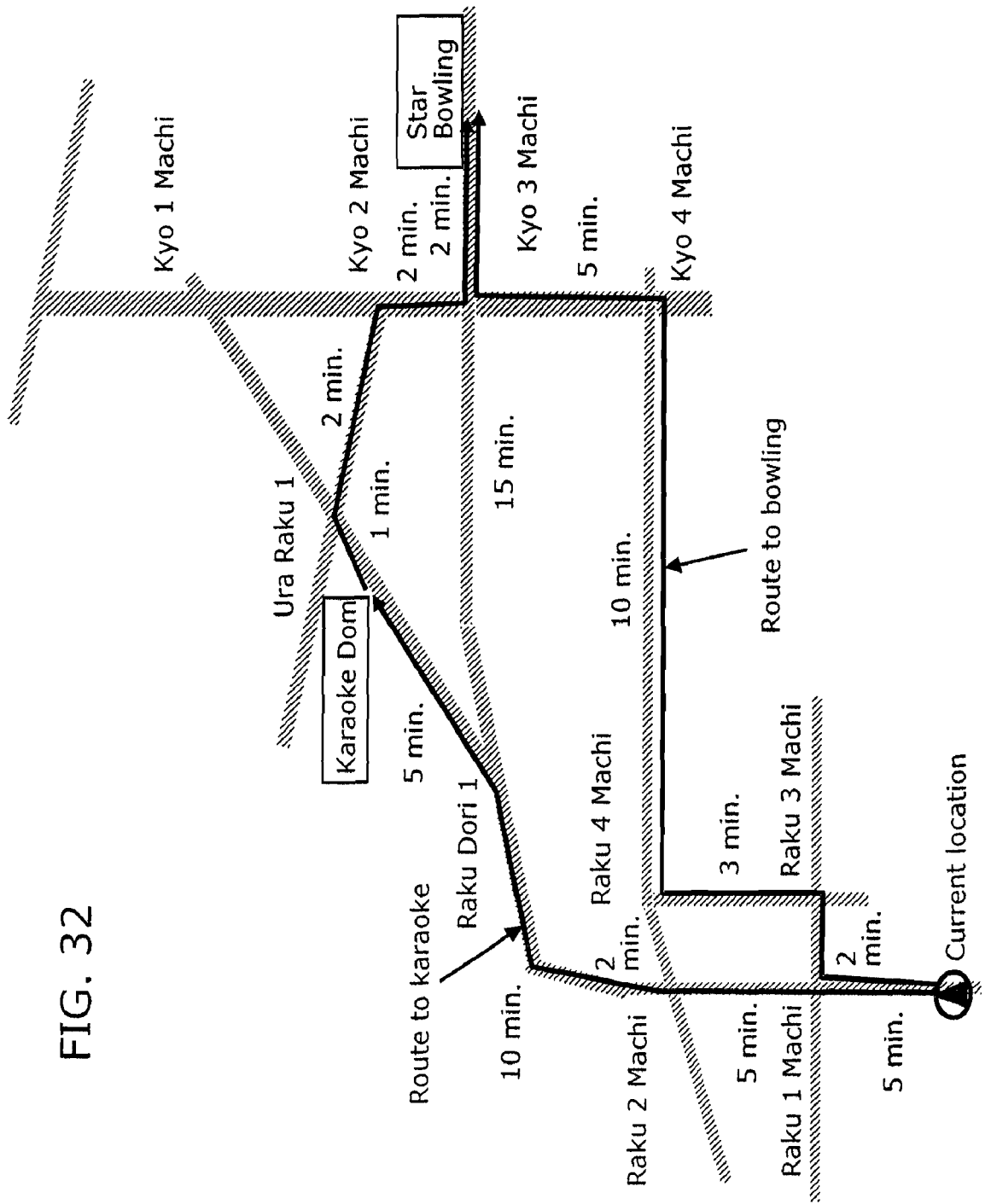
FIG. 32 is a diagram showing branch point calculation according to the variation of the second embodiment.

FIG. 32 shows a map indicating the current location of the user as well as the locations of the searched destinations "Karaoke Dom" and "Star Bowling", in the same manner as FIG. 28 and the like. In this case, when route search is performed using the respective destinations as final destinations, the same routes as shown in FIG. 28 will be calculated. On the other hand, when searching for a plurality of destinations and deliberating on which destination to head for, the user ultimately makes a final decision in consideration of conditions of destinations as well as conditions of traffic congestions and the like which vary from hour to hour. In addition, there may be cases where the user will first head for one of the destinations, and after studying crowding and the like at that destination, will then head for another destination. In consideration thereof, a method for calculating a route via one of the destinations to the other destination will now be described.

FIG. 33 shows routes to the respective destinations and transit times calculated using the transit costs of routes, in the same manner as FIG. 29 and the like. The searched route ID "01" is a route to "Karaoke Dom" that passes "Raku 1 Machi", "Raku 2 Machi" and "Raku Dori 1" before arriving at "Karaoke Dom". In addition, the overall arrival time is shown as "25 minutes". On the other hand, the searched route ID "02" is a route to "Star Bowling" that passes "Raku 1 Machi", "Raku 3 Machi" and "Raku 4 Machi" before arriving at "Star Bowling". In addition, the overall arrival time is shown as "27 minutes". At this point, the destination having the shorter arrival time is selected as an intermediate point (in other words, one of the destinations will become the branch point), and a route to the other destination is searched for. A searched route ID "05" is a result of a route search performed using "Karaoke Dom" as an intermediate point (branch point). The route arrives at "Star Bowling" via "Karaoke Dom", and passes through "Raku 1 Machi", "Raku 2 Machi", "Raku Dori 1", "Karaoke Dom", "Ura Raku 1", "Kyo 2 Machi" and "Kyo 3 Machi". Furthermore, the final arrival time of 32 minutes is within the threshold with respect to the shortest time of 27 minutes, and does not result in a relatively long detour. Therefore, it is also possible to calculate these routes as routes of a plurality of destinations.

(Third Embodiment)

For the above second embodiment, a method was described which calculates a branch point using travel history, and controls display modes of information using the branch point. When a plurality of destinations has been searched for, information may be arranged to be comprehended more effectively by the user by calculating a branch point of the plurality of destinations and displaying information based on the branch point. In addition, by taking travel history into consideration and, for instance, calculating a branch point by once again searching for a route to another destination using a route accumulated in the travel histories as a reference, it is also possible to head for a destination from a branch point on a route that is normally used by the user. Furthermore, as for the calculation method of branch points, for instance, a plurality of routes to a destination is calculated, the branch points on the respective routes are used as branch point candidates, and branch point is selected from the branch point candidates based on the current location or travel histories. At the same time, calculation methods of branch points are not limited to that described above. In this light, for the present variation, a calculation method for branch points will be described.

Figure 34:
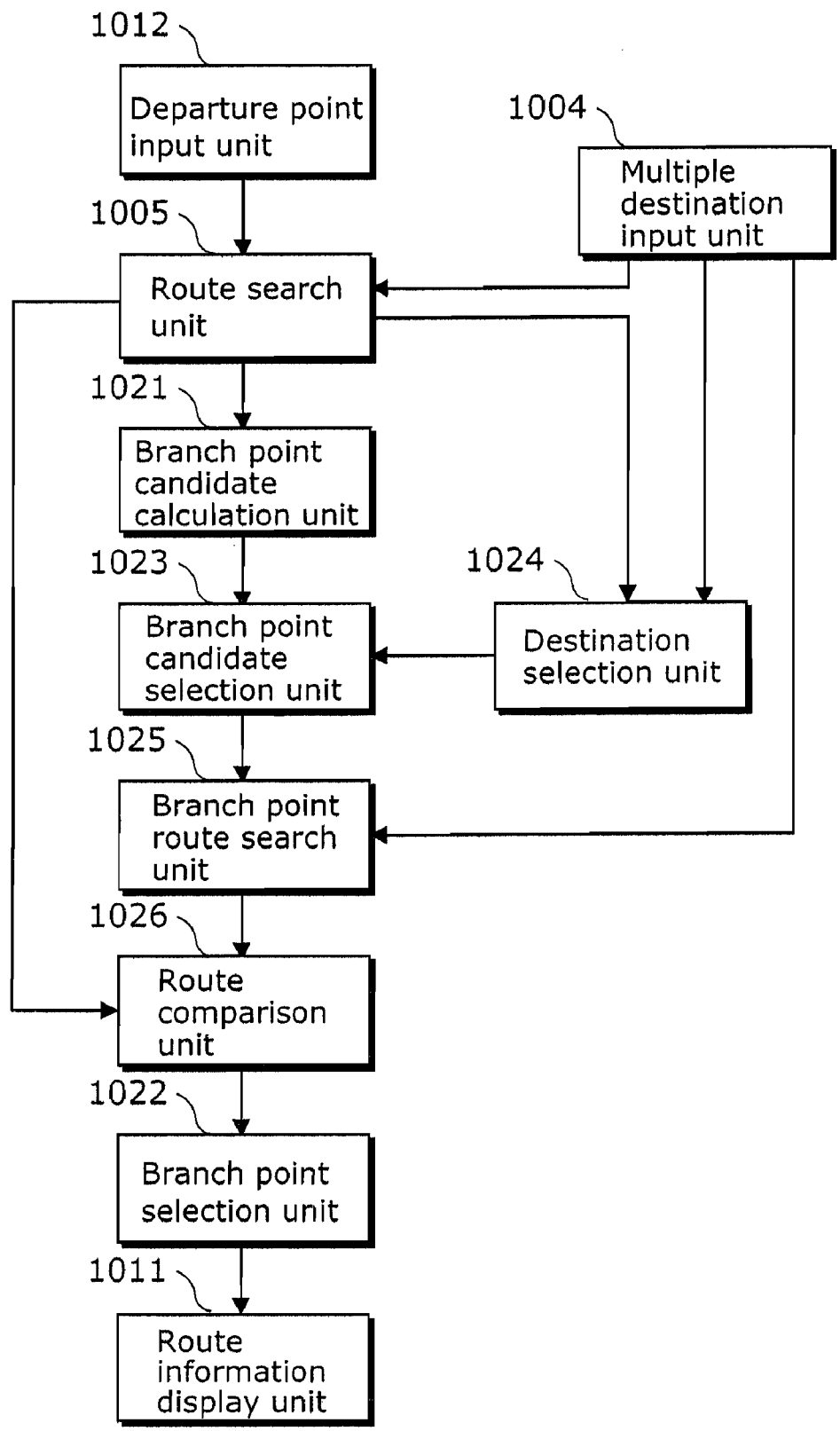
FIG. 34 is a system configuration diagram according to a third embodiment.

FIG. 34 is a system configuration diagram according to the present embodiment. The dame reference numerals as used for the components in the above-described embodiments are assigned to the same components in FIG. 34.

A multiple destination input unit 1004 is a unit to which a plurality of destinations is inputted. In addition, a departure point input unit 1012 is a unit to which a departure point is inputted, and in the case of the present embodiment, detects a current location at which searching is performed and sets the current location as the departure point. A route search unit 1005 is a unit which searches for routes from the inputted current point to the respective destinations.

Figure 35:
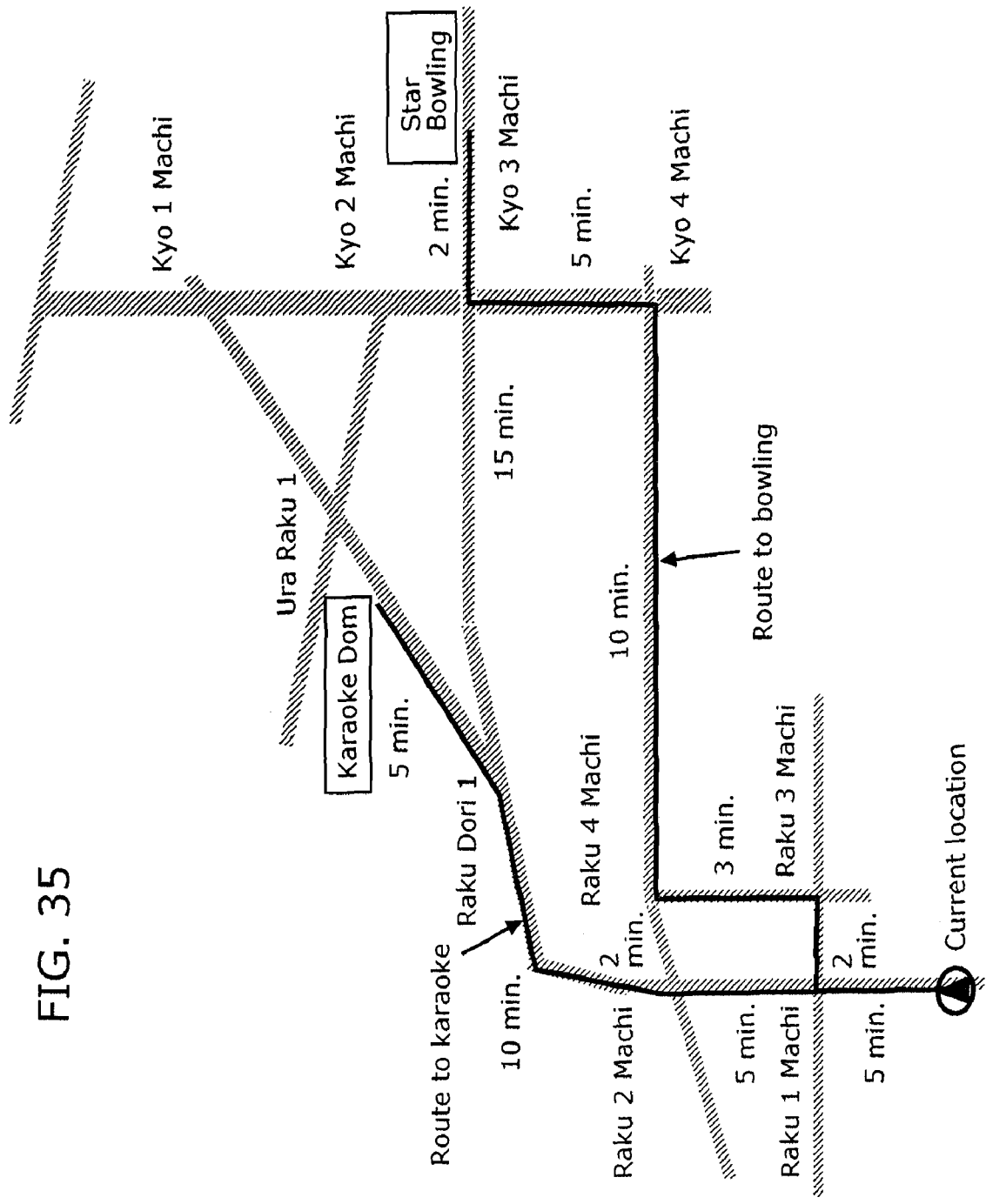
FIG. 35 is a diagram showing branch point calculation according to the third embodiment.

For instance, in the same manner as the above-described embodiment, assume that a category of "amusement" or the like is inputted by the user, and "Karaoke Dom" and "Star Bowling" are searched as destinations. In other words, inputs to the multiple destination input unit 1004 are "Karaoke Dom" and "Star Bowling". FIG. 35 is a map representation of the current location of the user as well as the locations of "Karaoke Dom" and "Star Bowling".

Generally, as for routes to a destination, a shortest route is searched using costs corresponding to transmit times or distances of routes. The black bold lines in FIG. 35 indicate searched routes to these destinations, and are considered the results of, for instance, a search performed by, for instance, a general route search unit.

In FIG. 35, the route to "Karaoke Dom" is a route that passes the intersections of "Raku 1 Machi", "Raku 2 Machi" and "Raku Dori 1". On the other hand, the route to "Star Bowling" is a route that passes the intersections of "Raku 1 Machi", "Raku 3 Machi", "Raku 4 Machi", "Kyo 4 Machi" and "Kyo 3 Machi". Additionally, in this case, it is assumed that transit times between these intersections (nodes) are the costs of routes. These costs are shown in FIG. 35. For instance, the cost from the current location to "Raku 1 Machi" is 5 minutes; from "Raku 1 Machi" to "Raku 2 Machi" is 5 minutes; from "Raku 2 Machi" to "Raku Dori 1" is 10 minutes; and from "Raku Dori 1" to "Karaoke Dom" is 5 minutes. Therefore, the overall arrival time at "Karaoke Dom" from the current location is 25 minutes. In the same manner, to "Star Bowling", it takes 5 minutes to "Raku 1 Machi", 2 minutes to "Raku 3 Machi", 3 minutes to "Raku 4 Machi", 10 minutes to "Kyo 4 Machi", 5 minutes to "Kyo 3 Machi" and 2 minutes to "Star Bowling" for a total of 27 minutes.

FIG. 36 shows the results of these searched routes in a table format. The table shows the routes to the respective final destinations, as well as transit times up to the final destinations. A searched route ID "01" is a route to "Karaoke Dom". In this case, accumulated times are shown. Thus, the transit time at "Raku 1 Machi" is 5 minutes, while the transit time at "Raku 2 Machi" is 10 minutes, which is obtained by adding the 5 minutes to "Raku 1 Machi" with the 5 minutes from "Raku 1 Machi". In addition, a searched route ID "02" is a route to "Star Bowling". As seen, generally, in route search, costs between respective nodes are computed to calculate a shortest route.

Focusing now on the calculation of a branch point, in this case, the route up to "Raku 1 Machi 2 is shared, and "Raku 1 Machi" is the branch point. However, as in this case, when the branch point is relatively close to the current location or when branching already occurs at the current location, the user will soon be faced with a need to decide on either one of the destinations. For instance, after further driving for a while, when attempting to change the destination in a flexible manner according to route conditions and final arrival times, the user will not be provided with sufficient time to think.

Therefore, in the present embodiment, a branch point is calculated by selecting one of the inputted plurality of destinations, setting a nodal sequence on a route to the selected destination as a branch point candidate, and once again searching for a route to the other destination from the branch point candidate.

A destination selection unit 1024 is a unit which selects either one of the destinations inputted to the multiple destination input unit 1004. In addition, a branch point candidate selection unit 1023 is a unit which selects, as a branch point candidate, a node on a route to the selected destination among the branch point candidates calculated by a branch point candidate calculation unit 1021. As for the selection of a destination, for instance, searched routes are contrasted and a destination that is closer to the current location is used as the destination. Thus, a node on the closer route is a branch point candidate.

A destination that is closer to the current location is selected and a node on routes to this destination is used as a branch point candidate because a plurality of routes is more likely to be calculated for a route to the other destination that is further away, and the time difference is smaller. On the other hand, when a route to the destination that is closer is once again searched for using the further route as a reference, the plurality of routes will prove to be more time-consuming, and will end up being long detours. A description will now be provided using a specific example.

In the present example shown in FIG. 35, since the estimated time of arrival at "Star Bowling" is 27 minutes, which is more distant than the estimated time of arrival at "Karaoke Dom" of 25 minutes, "Karaoke Dom" is selected at the destination selection unit 1024. Then, "Raku 1 Machi", "Raku Dori 1" and "Karaoke Dom", which are nodes on a route to the selected "Karaoke Dom", are selected as branch point candidates. Subsequently, routes from the respective branch point candidates to "Star Bowling" are once again searched by the branch point route search unit 1025.

Figure 37:
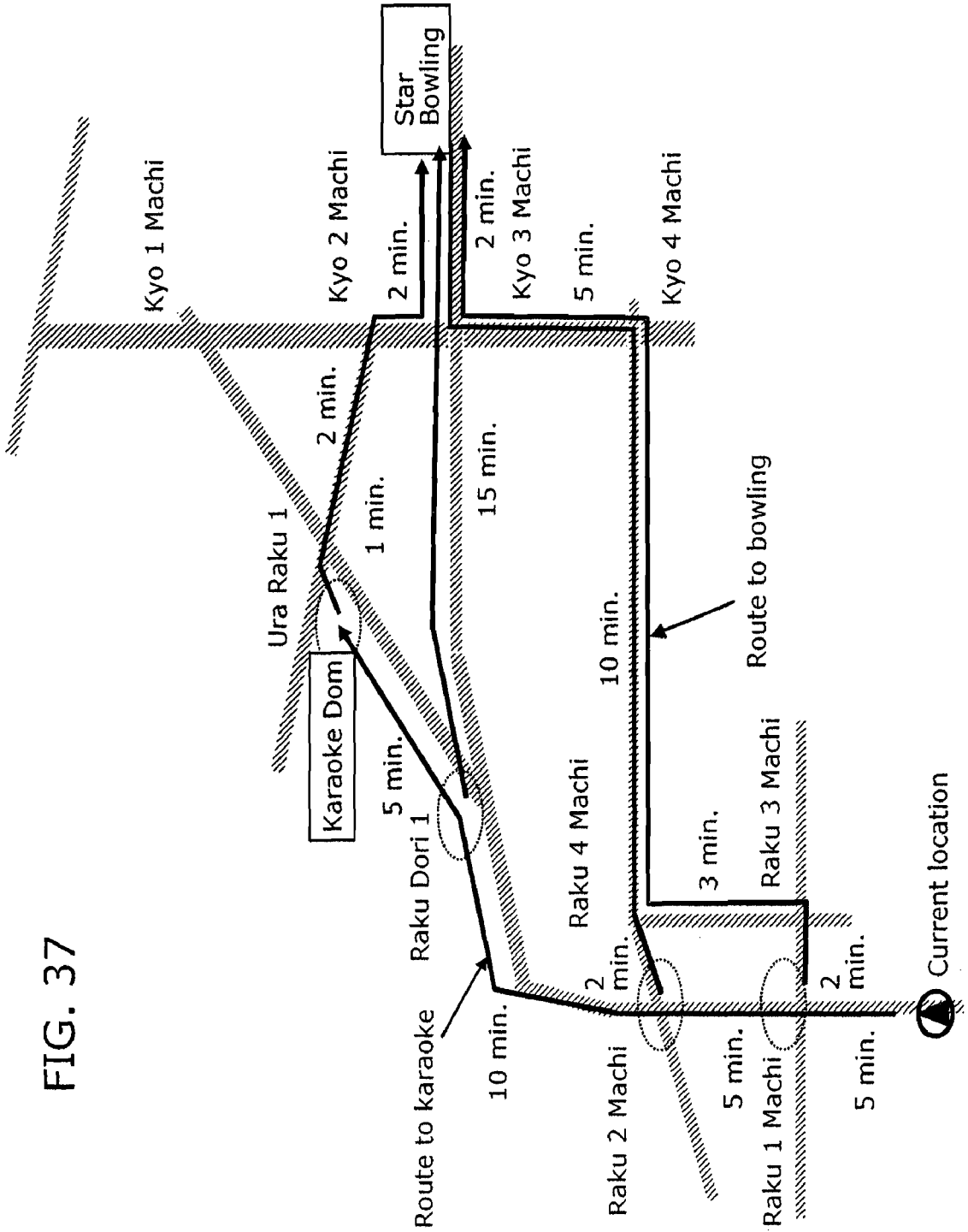
FIG. 37 is a diagram showing branch point calculation according to the third embodiment.

FIG. 37 is a map representation of a plurality of calculated routes from the respective branch point candidates to "Star Bowling". Routes from the respective branch point candidates of "Raku 1 Machi", "Raku 2 Machi", "Raku Dori 1" and "Karaoke Dom", which are nodes on a route from the current location to the selected "Karaoke Dom", to "Star Bowling", which is the other destination, are searched for. For instance, for a route from "Raku 1 Machi" to "Star Bowling", a route is searched which passes "Raku 1 Machi", "Raku 3 Machi", "Raku 4 Machi", "Kyo 4 Machi", "Kyo 3 Machi,", and arrives at "Star Bowling". In addition, for a route from "Raku 2 Machi", which is the next branch point candidate, to "Star Bowling", a route is searched which passes "Raku 2 Machi", "Raku 4 Machi", "Kyo 4 Machi", "Kyo 3 Machi", and arrives at "Star Bowling". FIG. 38 shows transit times for the plurality of routes using the transit time costs shown in FIG. 37. Shown are searched routes from the respective branch point candidates to the destination "Star Bowling" and route costs thereof.

For instance, a searched route ID "02" is a route searched using "Raku 1 Machi", which is a branch point candidate, as its departure point, and transit nodes and costs thereof are shown. Incidentally, for the present embodiment, since the searched route from the current location to "Star Bowling" is equivalent to the route from the branch point candidate "Raku 1 Machi", both are indicated as the searched route ID "02".

On the other hand, a searched route ID "03" indicates a route having the branch point candidate "Raku 2 Machi" as the departure point. Since the cost of the route to "Raku 2 Machi" is calculated as being 10 minutes from a searched route ID that is a route to "Karaoke Dom", a cost is shown to which a subsequent cost has been added. A route having the branch point candidate "Raku 2 Machi" as the departure point and arriving at "Star Bowling", and costs thereof are calculated as, for instance, 12 minutes to "Raku 4 Machi", 22 minutes to "Kyo 4 Machi", 27 minutes to "Kyo 3 Machi", and 29 minutes to "Star Bowling".

In a similar manner, a route that branches from the branch point candidate "Raku Dori 1" and a cost thereof are indicated as a searched route ID "04". It is shown that it takes 20 minutes to "Raku Dori 1", 35 minutes to "Kyo 3 Machi", and 37 minutes to "Star Bowling".

In addition, a searched route ID "05" indicates a route to "Star Bowling" which uses "Karaoke Dom" as a branch point candidate, and a cost thereof. For instance, when inputting a plurality of destinations, it is not certain that the user will travel to one of the destinations, and there may be cases where the user will travel to the other destination after heading for one of the destinations. Therefore, as shown, a route may be calculated using one of the destinations as a branch point candidate. The arrival time at "Karaoke Dom" is calculated as 25 minutes by the searched route ID "01", and for subsequent transit nodes, it is shown that it takes 26 minutes to "Ura Raku 1", 28 minutes to "Kyo 2 Machi", 30 minutes to "Kyo 3 Machi", and 32 minutes to "Star Bowling".

A route comparison unit 1026 is a unit which compares costs of routes from branch point candidates calculated by the branch point route search unit 1025. Based on the comparison results, a branch point is selected at the branch point selection unit 1022. A description will be provided using a specific example.

The above-mentioned searched route ID "03" is a route that turns right at "Raku 2 Machi" and heads for "Star Bowling". From the current location, the route proceeds straight through "Raku 1 Machi" (transit time cost of 5 minutes), passes "Raku 2 Machi", "Raku 4 Machi", "Kyo 4 Machi" and "Kyo 3 Machi", and arrives at "Star Bowling". The total transit time cost for this route is 29 minutes. While arrival time is 2 minutes later than the shortest route to "Star Bowling", which is indicated by the searched route ID "02" and which takes 27 minutes, this route shares its portion up to "Raku 2 Machi" with the route to "Karaoke Dom" that is indicated by the searched route ID "01". Thus, "Raku 2 Machi" becomes the branch point, and compared to "Raku 1 Machi", the branch point is calculated at a location that is further from the current location.

In addition, a searched route ID "04" is a route that proceeds straight through "Raku 2 Machi" and heads for "Star Bowling". From the current location, the route proceeds straight through "Raku 1 Machi" and "Raku 2 Machi" (transit time cost of 10 minutes), passes "Raku Dori 1" and "Kyo 3 Machi", and arrives at "Star Bowling". The total transit time cost for this route is 37 minutes. This route shares its portion up to "Raku Dori 1" with the route to "Karaoke Dom" that is indicated by the searched route ID "01". Thus, "Raku Dori 1" becomes the branch point, and compared to "Raku 2 Machi" or "Raku 1 Machi", the branch point is calculated at a location that is even more distant from the current location.

The user is faced with a situation where a plurality of destinations must be searched for and a determination must be made as to which destination the user will ultimately head for. However, when the branch point is relatively close to the current location, the user will soon be faced with the need to decide which destination to head for. For instance, after further driving for a while, when attempting to change the destination in a flexible manner according to route conditions and final arrival times, the user will not be provided with sufficient time to think. In consideration thereof, by using the present method to calculate routes from a branch point candidate, reference route costs, and to calculate a branch point at a location that is closer to the destination or a location that is more distant from the current location, it is possible to ultimately determine a destination while comprehending information on a plurality of destinations.

On the other hand, with respect to the shortest route to "Star Bowling", which is indicated by the searched route ID "02"

and which takes 27 minutes, the searched route ID "04" takes 10 more minutes. In other words, among the three branch points, this branch point is calculated at a location that is furthest from the current location. However, this also means that the branch point is calculated as a relatively long detour with respect to the shortest route. In this case, even if a branch point is calculated at a location that is far from the current location and the user is allowed time to make a final decision on a plurality of destinations, in a case where the user ultimately decides to travel to "Star Bowling", a route requiring 37 minutes, which exceeds the shortest travel time of 27 minutes by 10 minutes, is unfavorable. Accordingly, a branch point may be arranged to be calculated in consideration of not only the location of the branch point, but also the route time cost. For instance, a branch point may be calculated by setting a threshold with respect to the shortest travel time of 27 minutes, such as a buffer of plus 20 percent (approximately 6 minutes). In this case, since the searched route ID "04" with an arrival time of 37 minutes exceeds the threshold, the searched route ID "03" is used, and "Raku 2 Machi" becomes the branch point.

The route information display unit 1011 is a unit which displays information related to routes and the like using the branch point selected by the branch point selection unit 1022. Regarding displaying of route information using a branch point, as shown in the above-described first embodiment and the like, information required by the user may be displayed based on the branch point in a manner that is easily comprehended by, for instance, contrasting route information to the branch point with information beyond the branch point.

Incidentally, unlike the method that calculates a branch point by simply searching for a plurality of routes to a destination as shown in the above-described embodiment, by searching for routes using a node on a route to one of the destinations as a reference, the search range may be narrowed down and route search costs may be reduced. In addition, one of the destination routes may be arranged to be, for instance, selected by the user. Since the branch point is calculated on the selected route, it is likely that the branch point will be more suitable to the user. Alternatively, as shown in the above-described embodiment, a unit for accumulating travel history may be separately provided, whereby a route existing in the travel history may be selected as one of the destinations. Since a location that exists in the history and which the user is familiar with is calculated as a branch point, even if, for instance, the user has never been to the other destination, the route may be comprehended in an easier manner since the route branches towards the destination from a route that the user is familiar with. Furthermore, by enabling the user to contrast and comprehend differences between the estimated arrival time at the branch point and arrival times beyond the branch point, more comfortable driving may be promoted.

Figure 39:
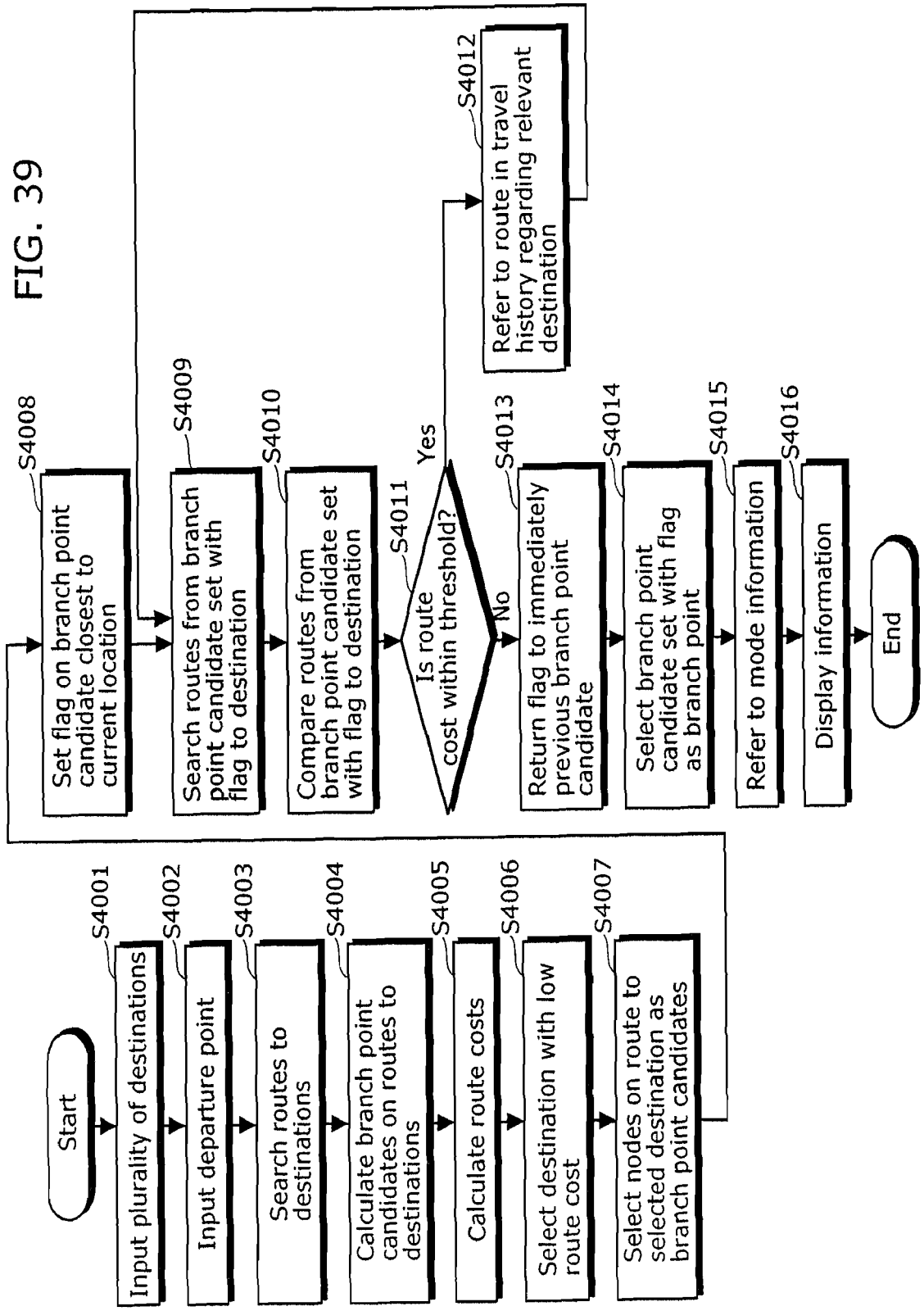
FIG. 39 is a flowchart according to the third embodiment.

A flow of operations of the present embodiment will now be described with reference to the flowchart shown in FIG. 39.

First, a plurality of destinations is inputted at the multiple destination input unit 1004 (S4001). In addition, a departure point is inputted at the departure point input unit 1012 (S4002). Then, routes from the inputted departure point to the respective destinations are searched by the route search unit 1005 (S403). In the present embodiment, routes are searched by sequences of nodes such as intersections, and a node is calculated as a branch point candidate (S4004). For instance, as shown in FIG. 35, routes to the inputted destinations "Karaoke Dom" and "Star Bowling" are searched, and a searched node is calculated as a branch point candidate.

Next, in order to select a destination that is to be used as a reference at the destination selection unit 1024, route costs to the respective destinations are calculated (S4005), and, for instance, the destination with a lower route cost is selected as a reference destination (S4006). Then, a branch point candidate on the route to the selected destination is selected (S4007), and a route from the selected branch point candidate to the other destination is once again searched by the branch point route search unit 1025.

For instance, in the case of FIG. 35, since the route cost to "Karaoke Dom" is 25 minutes and is lower than the route cost of 27 minutes that is required to "Star Bowling", "Karaoke Dom" is selected. Then, "Raku 1 Machi", "Raku 1 Machi", "Raku 2 Machi", "Raku Dori 1" and "Karaoke Dom", which are branch point candidates on the route to "Karaoke Dom", are selected as branch point candidates, and routes from these branch point candidates to "Star Bowling" is searched for once again.

For instance, a flag is set to the branch point candidate that is closest to the current point (S4008), and a route from the set branch point candidate is searched for (S4009). Then, the cost of the searched route is compared with a route cost searched from the current position by the route comparison unit 1026 (S4010), and a judgment is made on whether the cost is within a threshold (for instance, plus 20 percent) (S4011). If within the threshold, the flag is set to the next branch point candidate (S4012), and the processing proceeds to step S4009. On the other hand, if the route cost exceeds the threshold (No in S4011), the flag is returned to the immediately previous branch point candidate (S4013), whereby the branch point candidate to which the flag has been set is selected as a branch point by the branch point selection unit 1022 (S4014). Then, for instance, in the same manner as in the above-described first embodiment, mode information is referred to (S4015), and information is displayed (S4016).

(Variation of the Third Embodiment)

In the above-described embodiment, when ultimately determining a branch point from the branch point candidates, while a branch point is selected using a threshold (for instance, under 20 percent using the cost of the comparison route as a reference), selection of branch points is not limited to this arrangement. For instance, the user may input a desired arrival time to the other destination and the like, whereby a branch point may be calculated and displayed based on whether the arrival time is met. A description will now be provided using a specific example.

Figure 40:
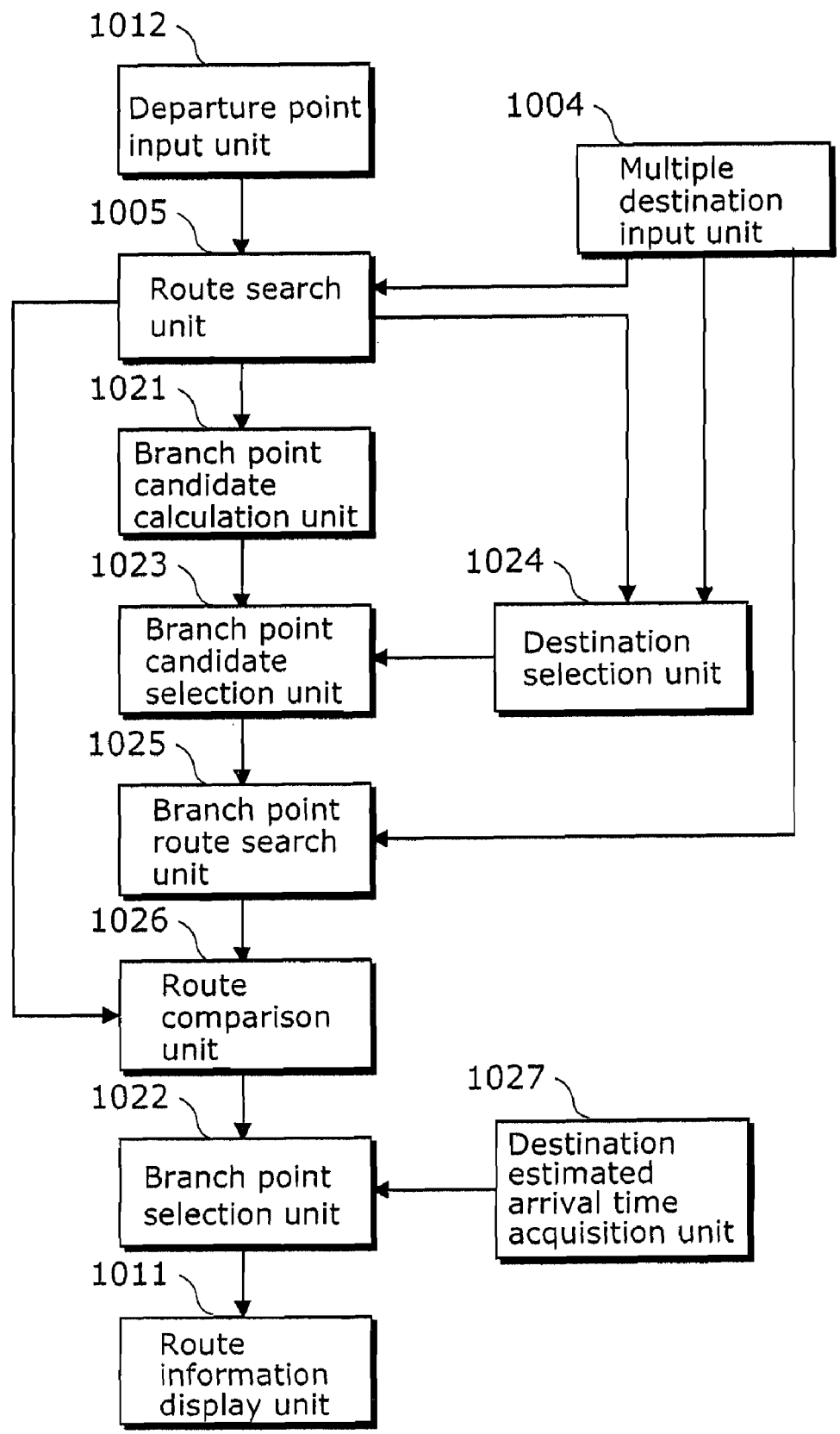
FIG. 40 is a system configuration diagram according to a variation of the third embodiment.

FIG. 40 is a system configuration diagram according to the present embodiment, wherein a destination estimated arrival time acquisition unit 1027 is added to the components shown in FIG. 34. Incidentally, the same reference numerals used in the above-described embodiments are used for the same components in FIG. 40, and descriptions thereof will not be provided.

The destination estimated arrival time acquisition unit 1027 is a unit which acquires a scheduled must-arrive time at an inputted destination. For the present embodiment, a method for determining a branch point according to an estimated time acquired by the destination estimated arrival time acquisition unit 1027 will be described below using a specific example.

Figure 41:
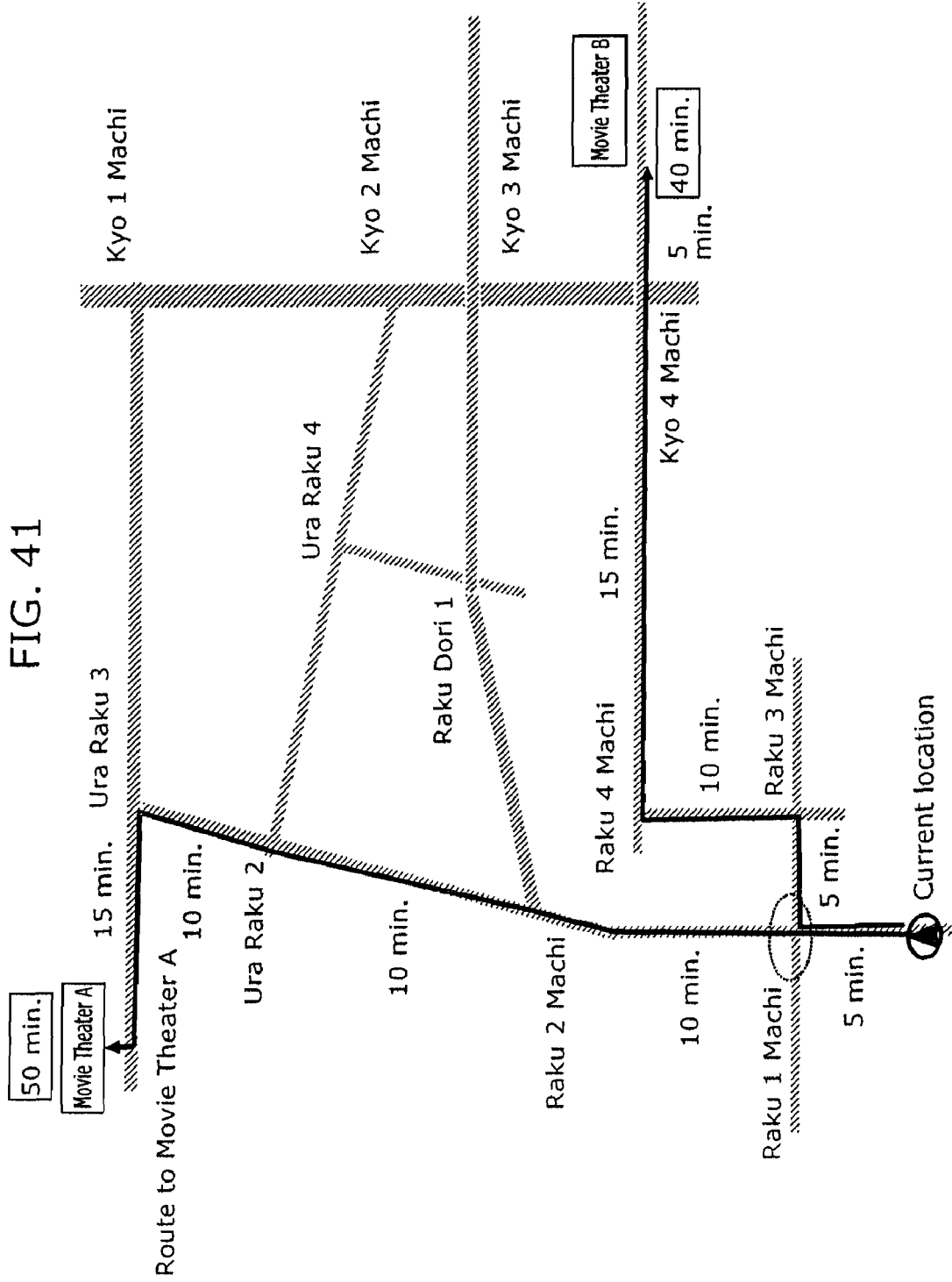
FIG. 41 is a diagram showing route search according to the variation of the third embodiment.

For instance, assume that a plurality of destinations, namely, "Movie Theater A" and "Movie Theater B", is inputted by the user. FIG. 41 is a map representation of a positional relationship between the current location of the user and the locations of "Movie Theater A", "Movie Theater B", and the like. In FIG. 41, the black bold line indicates respective searched routes searched by the route search unit 1005 to the respective destinations of "Movie Theater A" and "Movie Theater B". As for a route to "Movie Theater A", a route is searched which passes "Raku 1 Machi", "Raku 2 Machi", "Ura Raku 2", "Ura Raku 3" and reaches "Movie Theater A".

In addition, route costs (defined as required times for transit) between nodes are also shown in FIG. 41. Generally, route search is performed using these route costs. For instance, it is shown that it takes 5 minutes to reach "Raku 1 Machi" from the current location, and 10 minutes from "Raku 1 Machi" to "Raku 2 Machi". From these route costs, it is learned that a total of 50 minutes (5 min.+10 min.+10 min.+10 min.+15 min.) is required to reach "Movie Theater A,".

On the other hand, as for a route to "Movie Theater B", a route is searched which passes "Raku 1 Machi", "Raku 3 Machi", "Raku 4 Machi", "Kyo 4 Machi" and reaches "Movie Theater B". It is found that a total route cost of 40 minutes (5 min.+5 min.+10 min.+15 min.+5 min.) is required.

At this point, if a last matching node among common nodes as shown in the first embodiment will be used as the branch point, "Raku 1 Machi" becomes the branch point. However, this branch point is not necessarily suitable to the user. For instance, as in the case of "Raku 1 Machi", when the branch point is relatively close to the current position, the user must soon determine to which of the destinations "Movie Theater A" or "Movie Theater B" the user should proceed. However, depending on the user, there may be cases where suitable branch points differ according to the arrival time at the destination or the like. A description will now be provided using a specific example.

Figure 42:
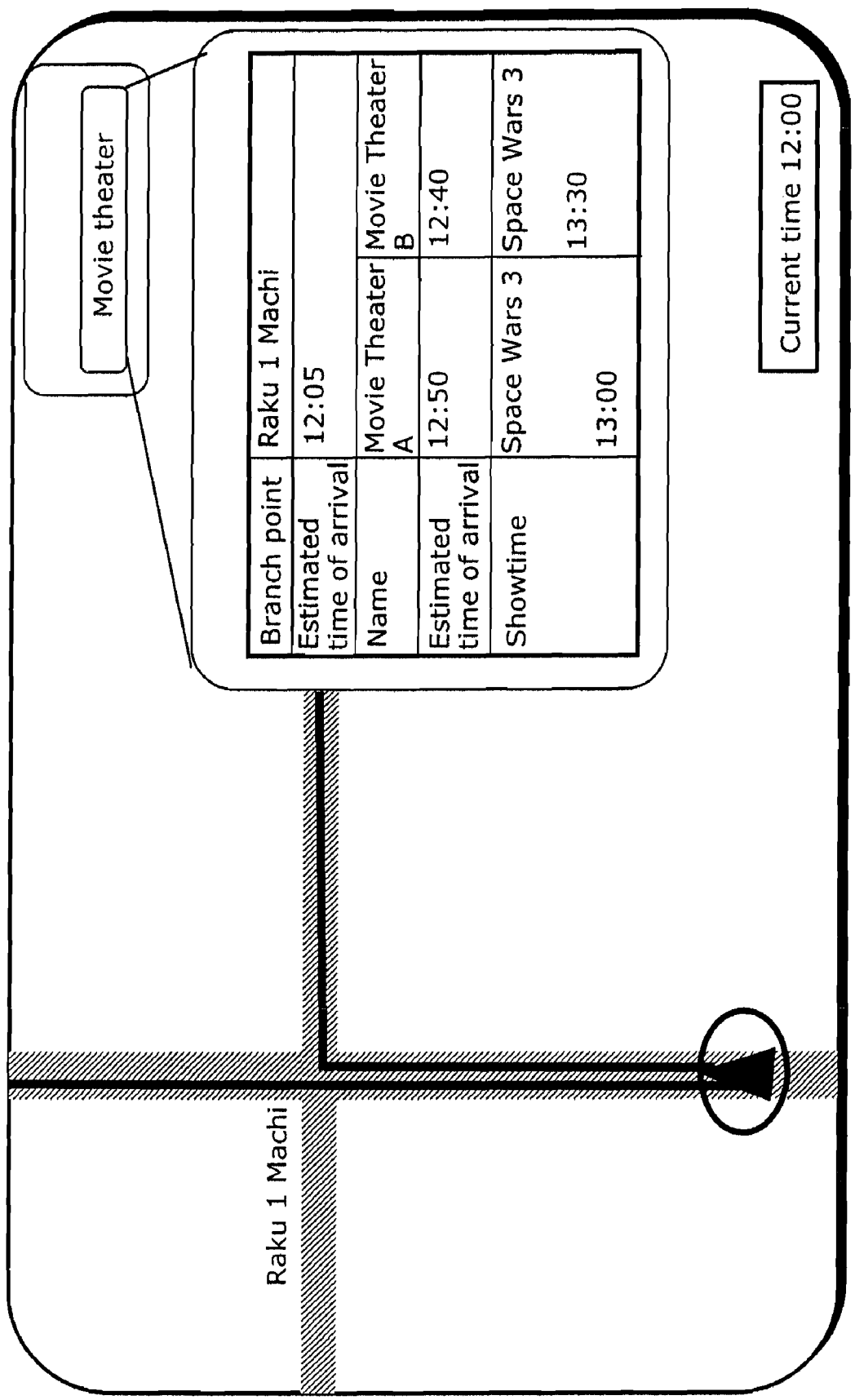
FIG. 42 is a diagram showing route search according to the variation of the third embodiment.

FIG. 42 is a display example of a route information display unit 1011 according to the present embodiment. For instance, assume that the user in the present example wants to see the movie "Space Wars 3". Additionally assume that the user inputs, as a plurality of destinations, "Movie Theater A" and "Movie Theater B" where "Space Wars 3" is being played. Further assume that the current time is 11:00, and the showtime of "Space Wars 3" at "Movie Theater A" is 13:00 while the showtime of "Space Wars 3" at "Movie Theater B" is 13:30. Moreover, at the present moment, as a result of a route search, it is shown that the required time to "Movie Theater A" is 50 minutes and the estimated time of arrival is "12:50", as described above. Similarly, it is shown that the required time to "Movie Theater B" is 40 minutes and the estimated time of arrival is "12:40".

In this case, the showtime at each movie theater is an example of a scheduled must-arrive time at a destination. The destination estimated arrival time acquisition unit 1027 may acquire such a scheduled must-arrive time at a destination from, for instance, an information providing service operated by a movie theater, a ticket agency or the like via a network.

At this point, when "Raku 1 Machi" is set as the branch point, the user must decide within the next 5 minutes to head for either "Movie Theater A" or "Movie Theater B". However, depending on the user, there may be cases where a destination is ultimately determined in consideration of an estimated time of arrival which may change due to traffic conditions and the like.

For instance, at the present moment, assume that the user desires to travel to "Movie Theater A" since the estimated time of arrival at "Movie Theater A" is 12:50 and the showtime of "Space Wars 3" is 13:00. However, this is the estimated time of arrival at the present stage, and the arrival time may subsequently change depending on traffic conditions and the like, whereby the user may not make it by the 13:00 showtime.

On the other hand, the estimated time of arrival at "Movie Theater B" is 12:40, which allows for sufficient time until the 13:30 showtime at "Movie Theater B". However, since the 13:30 showtime is later than "Movie Theater A", assume that the user desires to see the movie at "Movie Theater A" if possible.

In this light, assume that the user decides to first head for "Movie Theater A", and if conditions change on route, will give up of seeing the movie at "Movie Theater A" and will head for "Movie Theater B". This means that "Raku 1 Machi", which will be passed in 5 minutes, is not preferable to the present user, and if a branch point that allows the user to proceed to either destination exists further on, such a branch point should be preferable.

Figure 44:
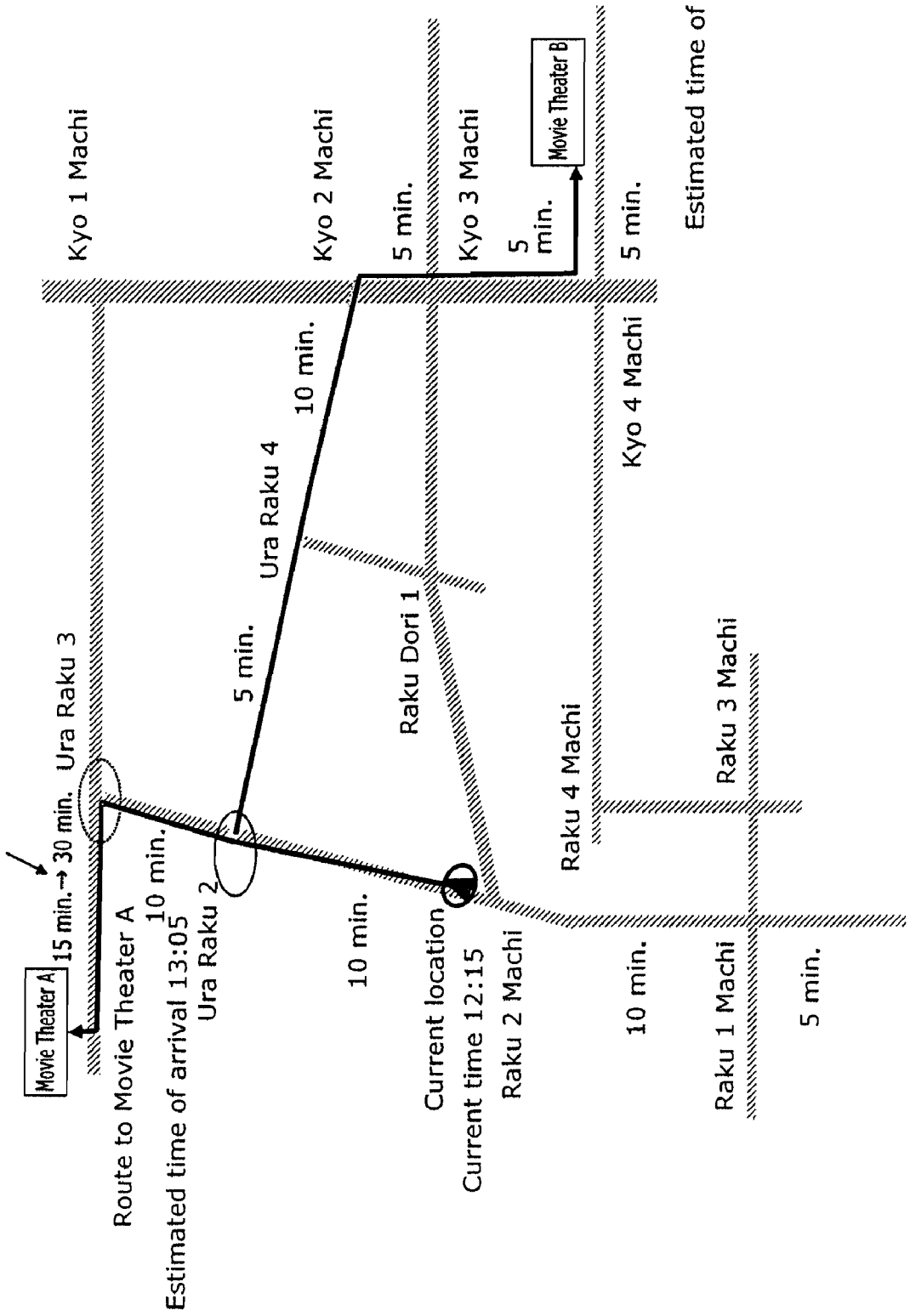
FIG. 44 is a diagram showing route search according to the variation of the third embodiment.

For instance, FIG. 44 shows a current location of the user and route costs after a predetermined time has lapsed (a lapse of 15 minutes is assumed) when the user has been temporarily heading for "Movie Theater A". Assume now that, on route, a congestion has occurred between, for instance, the intersection of "Ura Raku 3" and "Movie Theater A", resulting in an increase in route cost. Then, assume that the arrival time at "Movie Theater A" increases, and as a result, the estimated time of arrival is now 13:05 and the user will no longer make it by 13:00. Assume that, at this point, the user ultimately decides to head for "Movie Theater B".

By searching for a route from the current position to "Movie Theater B", a route which turns right at "Ura Raku 2", and passes "Ura Raku 4", "Kyo 2 Machi", "Kyo 3 Machi" and "Kyo 4 Machi", is searched out as indicated by the black bold line in FIG. 44. In addition, route costs of, for instance, 5 minutes from "Ura Raku 2" to "Ura Raku 4", as well as a total route cost of 30 minutes are shown. The estimated time of arrival at "Movie Theater B" is shown as 12:55, which means that the location allows the user to make it to "Movie Theater B" before the showtime of 13:30 even if the user heads for "Movie Theater B" just now.

Therefore, since the user will still make it on time even if deciding to head for "Movie Theater B" after arriving at "Ura Raku 2", "Ura Raku 2" may be considered as a suitable branch point for the user.

Figure 45:
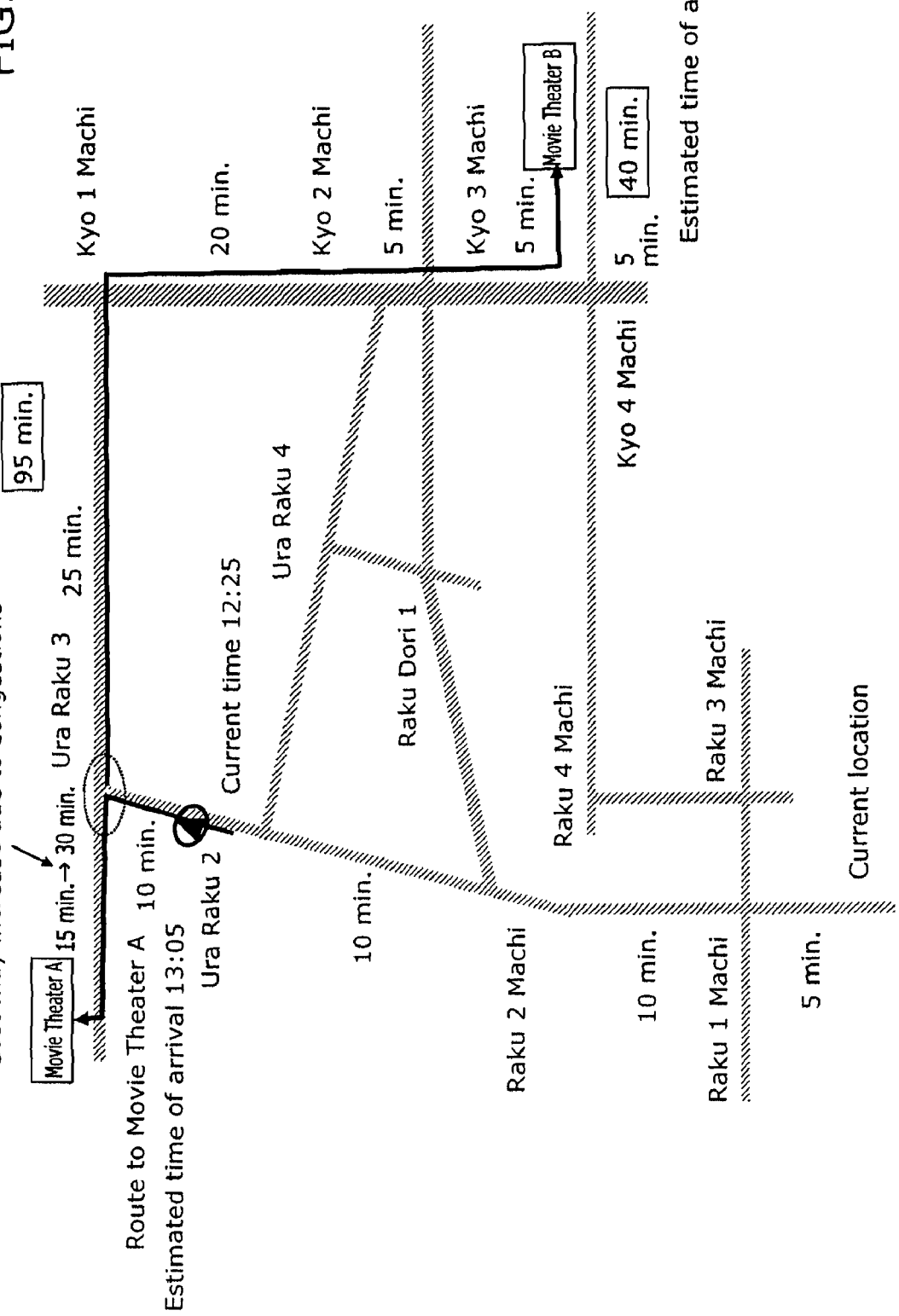
FIG. 45 is a diagram showing route search according to the variation of the third embodiment.

On the other hand, FIG. 45 shows a current location of the user at a given point after further driving. In addition, as a result of driving, the current time is shown as 12:25. Assume, for instance, the user ultimately decides to head for "Movie Theater B" at the point shown in FIG. 45. Assume also that, as a result of a route search, a route which turns right at "Ura Raku 3", passes "Kyo 1 Machi", "Kyo 2 Machi", "Kyo 2 Machi", "Kyo 3 Machi" and "Kyo 4 Machi", and arrives at "Movie Theater B". However, in a case where the user decides to head for "Movie Theater B" at the point shown in FIG. 45, route costs are 10 minutes to "Ura Raku 3", 25 minutes to "Kyo 1 Machi", 20 minutes to "Kyo 2 Machi", 5 minutes to "Kyo 3 Machi", 5 minutes to "Kyo 4 Machi", and 5 minutes to "Movie Theater B" for a total route cost of 70 minutes. As a result, the estimated time of arrival at "Movie Theater B" is now 13:55, which means that the user will not make the 13:30 showtime either.

In other words, in the case of the present example, by passing "Ura Raku 2" and coming as far as "Ura Raku 3", the user will not make the desired arrival time at "Movie Theater B" of 13:30. Therefore, "Ura Raku 3" is not a suitable branch point for the user. The point which enables the user to ultimately head for "Movie Theater B" will be "Ura Raku 2", which is shown in FIG. 44. In other words, in a case where the user drives while considering to which of "Movie Theater A" and "Movie Theater B" the user should proceed, the ultimately suitable branch point will be "Ura Raku 2".

Accordingly, for the present embodiment, a method will be described in which a branch point is calculated in consideration of a final estimated time of arrival that is desired by the user.

Figure 43:
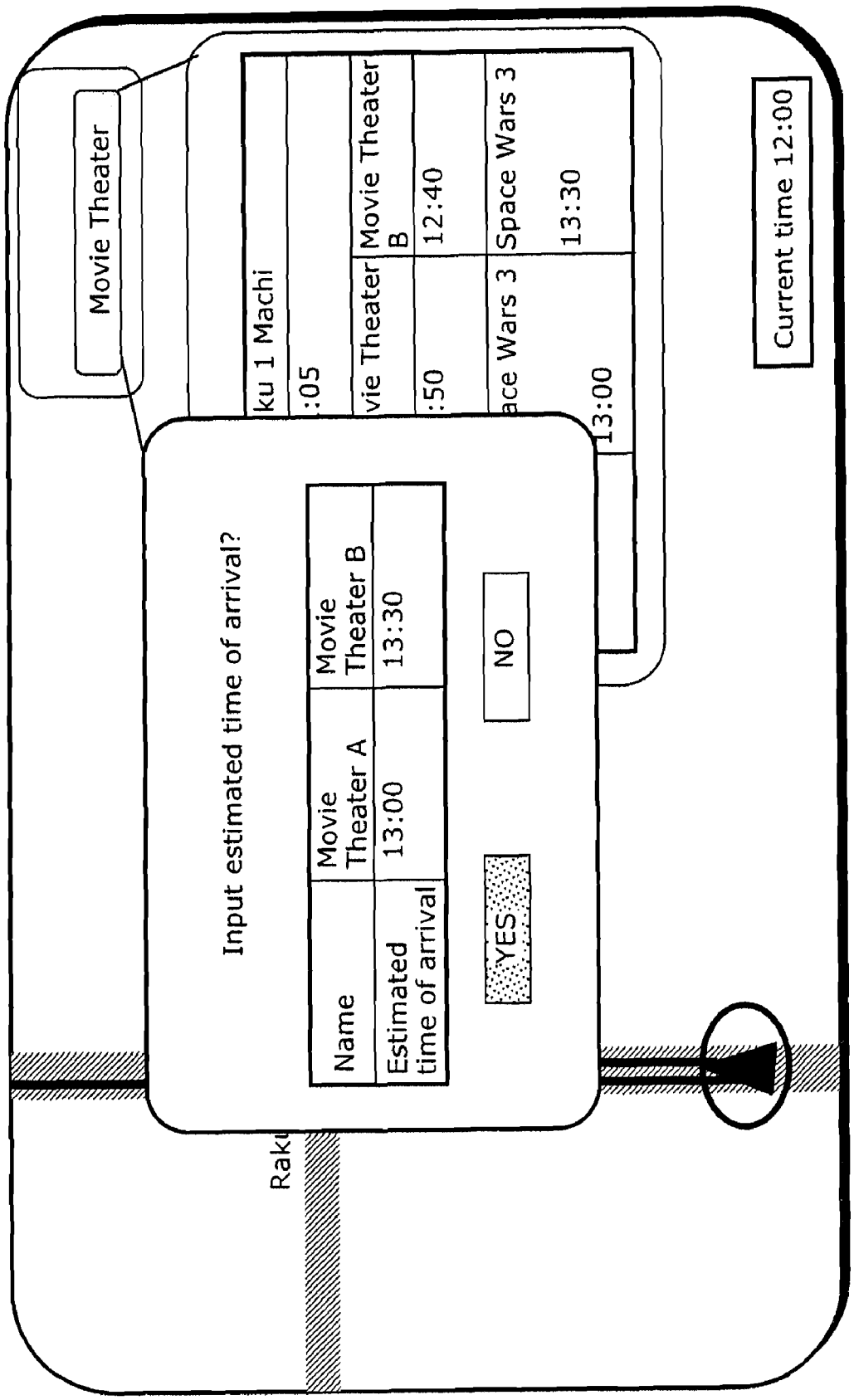
FIG. 43 is a diagram showing a display example according to the variation of the third embodiment.

For instance, in the present embodiment, a desired arrival time is acquired by the destination estimated arrival time acquisition unit 1027. In the case of the present example, since the showtime of "Space Wars 3" at "Movie Theater B" is 13:30, ultimately making this time is suffice, and "13:30" is inputted. Meanwhile, it is assumed that the user will first head for "Movie Theater A" for which the user still has a chance of arriving in time. FIG. 43 shows an example of input of estimated times of arrival at the respective destinations by the destination estimated arrival time acquisition unit 1027. The respective destinations and estimated times of arrival thereat, including the estimated time of arrival at "Movie Theater A" of "13:00" and the estimated time of arrival at "Movie Theater B" of "13:30", are displayed at the center of the screen, and are acquired when the user selects "YES". Incidentally, it is also possible to have the user set an estimated time of arrival. In addition, the estimated time of arrival may be automatically set based on a showtime at a movie theater or the like.

On the other hand, among the inputted destinations, "Movie Theater A", which is desired by the user, is selected by the destination selection unit 1024. Then, a node on a route to "Movie Theater A" that is selected by the branch point candidate selection unit 1023 is selected as a branch point candidate.

Figure 46:
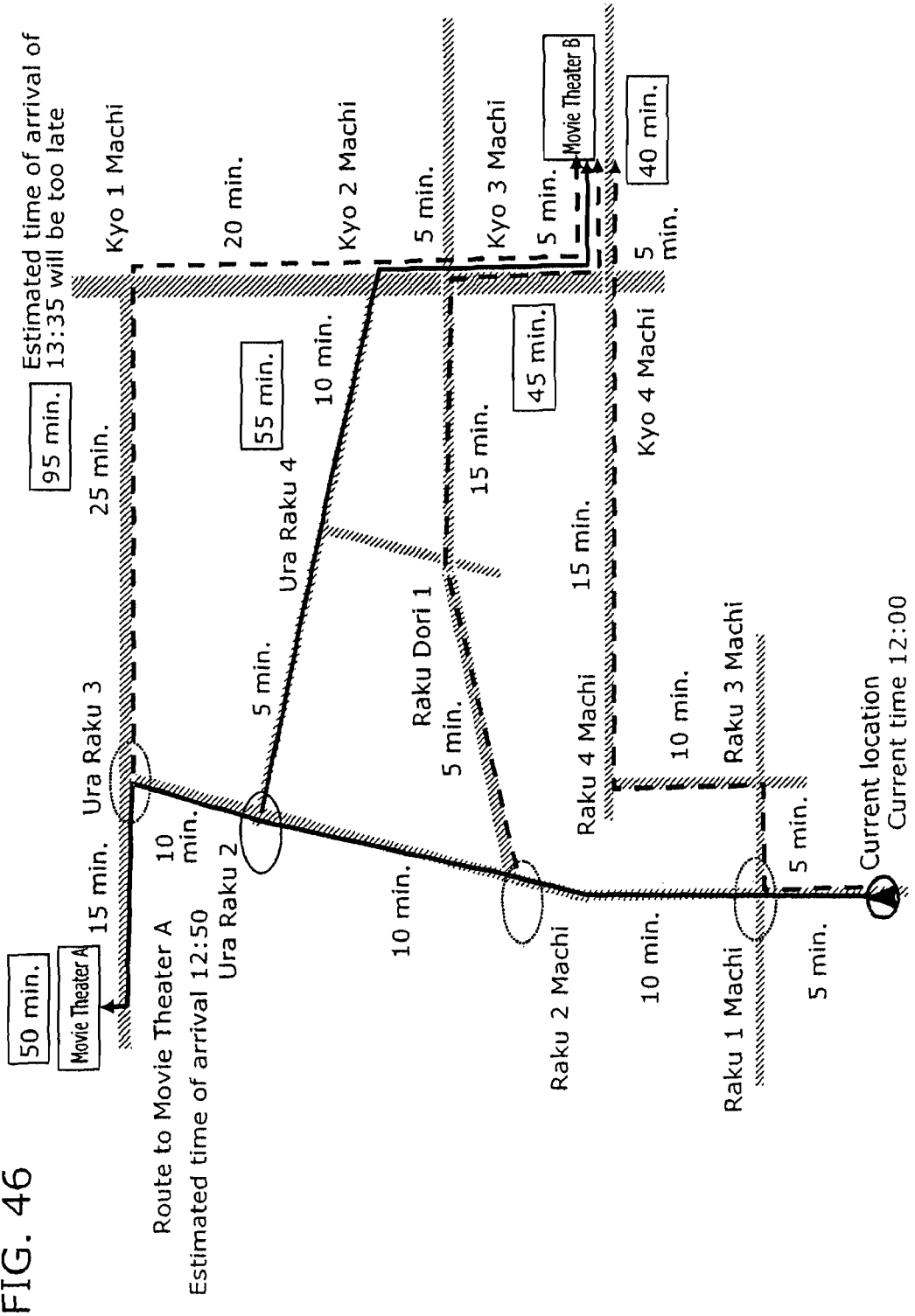
FIG. 46 is a diagram showing route search according to the variation of the third embodiment.

FIG. 46 is a diagram describing branch point calculation. A route to the selected destination "Movie Theater A" is searched for, and the nodes "Raku 1 Machi", "Raku 2 Machi", "Ura Raku 2" and "Ura Raku 3" are selected as branch point candidates. Then, the branch point route search unit 1025 searches once again for a route to "Movie Theater B" from the selected branch point candidates. For instance, as a route from "Raku 2 Machi" to "Movie Theater B", a route is searched which passes "Raku 2 Machi", "Raku Dori 1", "Kyo 3 Machi", "Kyo 4 Machi", and arrives at "Movie Theater B". In addition, as a route from "Ura Raku 2" that is a branch point candidate to "Movie Theater B", a route which passes "Ura Raku 2", "Ura Raku 4", "Kyo 2 Machi", "Kyo 3 Machi", "Kyo 4 Machi", and arrives at "Movie Theater B" is searched out. Furthermore, as a route from "Ura Raku 3" that is a branch point candidate to "Movie Theater B", a route which passes "Ura Raku 3", "Kyo 1 Machi", "Kyo 2 Machi", "Kyo 3 Machi", "Kyo 4 Machi", and arrives at "Movie Theater B" is searched out. Moreover, route costs between the respective nodes are shown in FIG. 46.

FIG. 47 indicates the respective searched routes described above using searched route IDs in the same manner as FIG. 38 and the like, and shows route costs between the respective nodes as well as overall route costs. For instance, a searched route ID "01", is a route from the current position to "Movie Theater A" and a route cost thereof, and it is shown that a total of 50 minutes is required. In addition, a searched route ID "02" is a route that turns left at "Raku 1 Machi", and it is shown that a total of 40 minutes is required. A searched route ID "03" is a route from the branch point candidate "Raku 2 Machi" to "Movie Theater B", and it is shown that a total of 45 minutes is required. Furthermore, a searched route ID "04" is a route from the branch point candidate "Ura Raku 2" to "Movie Theater B", and it is shown that a total of 55 minutes is required. A searched route ID "05" is a route from the branch point candidate "Ura Raku 3" to "Movie Theater B", and it is shown that a total of 95 minutes is required. In this case, with the searched route ID "05", since the estimated time of arrival of 13:35 (12:00+95 minutes) exceeds the inputted arrival time of 13:30 at the present moment, it is not suitable as a branch point. Therefore, the searched route ID "04", which is furthest from the current point but still does not exceed the inputted arrival time is selected. As a result, "Ura Raku 2" is selected as the branch point.

Figure 48:
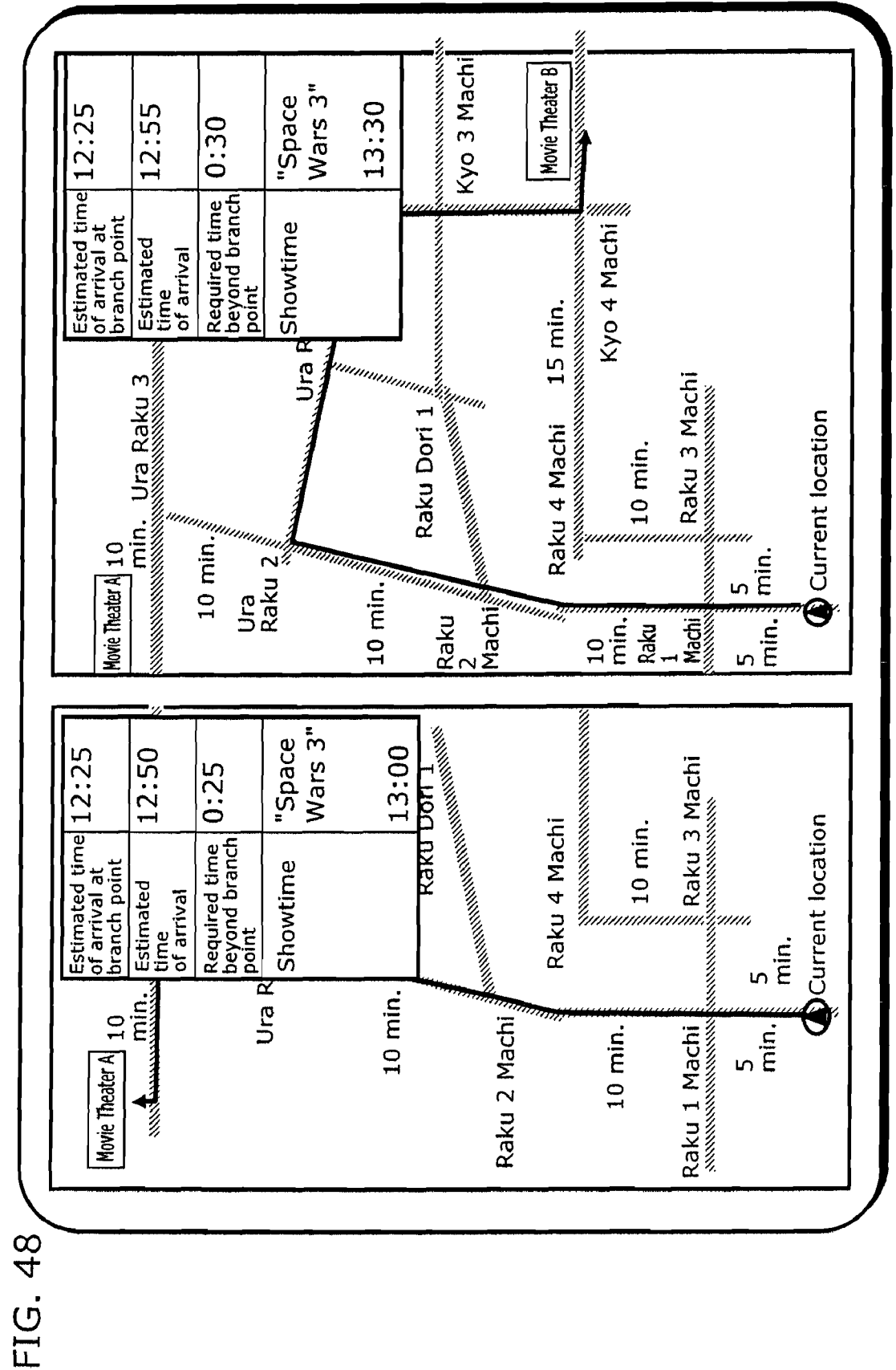
FIG. 48 is a diagram showing route search according to the variation of the third embodiment.

FIG. 48 is an example displaying route information to each destination based on the calculated branch point "Ura Raku 2". The left-hand side of the screen shows route information to "Movie Theater A". Since it takes 25 minutes to reach the branch point "Ura Raku 2", the estimated time of arrival at the branch point is shown as "12:25". In addition, a required time of "25 minutes" is shown from the branch point "Ura Raku 2" to "Movie Theater A", and the estimated time of arrival at "Movie Theater A" is shown to be "12:50". On the other hand, a travel route to "Movie Theater B" after passing the branch point "Ura Raku 2" is shown at the right-side of the screen. A required time in the case where the user heads for "Movie Theater B" after passing the branch point is shown to be "30 minutes". Furthermore, the estimated time of arrival in the case where the user travels to "Movie Theater B" via branch point "Ura Raku 2" is shown to be "12:55".

As shown in FIG. 41, the arrival time when using the route that proceeds directly to "Movie Theater B" from the current position is "12:40", which takes 15 more minutes than the route that passes branch point "Ura Raku 2". However, even the route via the branch point "Ura Raku 2" allows the user to make it in time for the 13:30 showtime. In addition, no congestions have occurred at the current position at which "Raku 1 Machi" has not yet been passed, the required time beyond the branch point is shown to be "25 minutes", and there is still a chance of making the 13:00 showtime at "Movie Theater A" at this stage. Therefore, information may be provided in a manner reflecting actions desired by the user, such as initially heading for "Movie Theater A".

Incidentally, in the display example shown in FIG. 48, estimated times of arrival at the respective points are displayed in the respective screens in list format. More specifically, "branch point estimated time of arrival 12:55" is displayed at both sides of the screen, while "estimated time of arrival 12:50" at "Movie Theater A" is displayed on the left-hand side of the screen and "estimated time of arrival 12:55" at "Movie Theater B" is displayed on the right-hand side of the screen. However, display modes of the screen is not limited to this arrangement, and, for instance, a relevant time may be displayed in the vicinity of each point on a screen (for instance, the display example shown in FIG. 9 or the like) which displays a current location. With a car navigation system, generally, a user often drives while performing current location display which displays the current location of the user and the vicinity thereof at a predetermined scale.

In this case, a transit time at a predetermined point may be displayed on the screen that is currently displayed or, in other words, the respective estimated times of arrival may be displayed near "Movie Theater A", "Movie Theater B" and the intersection "Ura Raku 2" which is the branch point, instead of displaying by switching screens as shown in FIG. 48. For a driver who is driving, merely displaying an estimated time of arrival that is required by the user on a screen currently being displayed enables just the required information to be provided in an easy manner without placing a burden on comprehending information.

Nowadays, as acquisition of information is performed on a realtime basis and congestion information becomes more and more detailed, there may be cases where, if possible, a route that proceeds to both destinations is taken until latest conditions are known, and an ultimate destination is then decided. In this case, instead of simply searching for routes and calculating a branch point from the searched routes, it is necessary to calculate an optimum branch point that is required by the user which enables the user to reach both destinations. By using the present invention, a more suitable branch point may now be calculated.

(Fourth Embodiment)

In the above embodiment, a method was described for a case where a plurality of destinations is inputted whereby a search is performed using one of the plurality of destinations as an intermediate point. More specifically, in FIG. 32, "Karaoke Dom" and "Star Bowl" are inputted, whereby a route to "Star Bowl" which uses "Karaoke Dom" as a branch point or, in this case, an intermediate point, is searched out.

Generally, when searching for a plurality of destinations and deliberating which destination to head for, there are cases where the user makes an ultimate decision in consideration of constantly changing traffic conditions and the like. In addition, there are also cases where the user visually observes the availability of spaces in parking lots or the crowdedness of stores at one of the final destinations and decides to head for the other final destination. As seen, by searching for routes which use the other destination as an intermediate point, required information may be provided automatically without cumbersome operations, thereby enabling safe and comfortable driving.

In addition, control thereof may be performed using category types, similarities/differences or resemblances of categories of the final destinations. A description will now be provided using a specific example.

Figure 49:
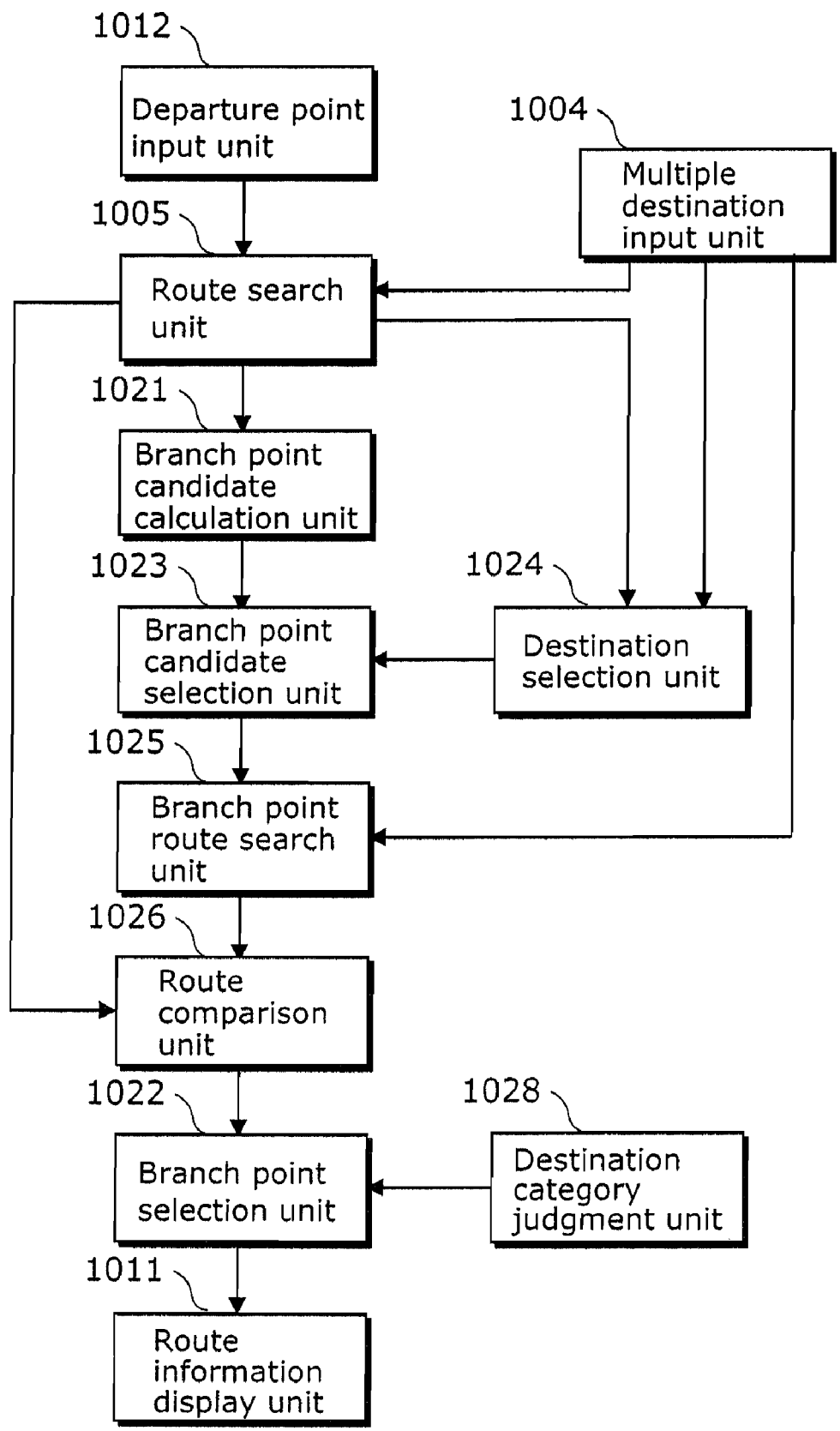
FIG. 49 is a system configuration diagram according to a fourth embodiment.

FIG. 49 is a system configuration diagram. A destination category judgment unit 1028 is added to the components shown in FIG. 34. The destination category judgment unit 1028 is a unit which judges, for instance, similarities/differences of categories of destinations inputted to the multiple destination input unit 1004. Then, according to the similarities/differences of categories, judgment is made on whether one of the destinations is to be used as an intermediate point, and a branch point is selected by the branch point selection unit 1022. For instance, when the categories are the same, one of the destinations is not to be selected as a branch point or, in other words, is not to be selected as an intermediate point. On the other hand, when different, one of the destinations is to be selected as a branch point or, in other words, is to be selected as an intermediate point. In this case, the destination category judgment unit 1028 is an example of a destination classification judgment unit as described in the claims.

If the categories of the inputted destinations are the same, in many cases, the user generally desires to head for one of the plurality of destinations, and attempts to ultimately decide on which destination to head for according to conditions. On the other hand, if the categories of the inputted destinations are different, there are cases where the user desires to ultimately proceed to either of the plurality of destinations, and is merely deciding an order of which destination to initially head for according to conditions.

In consideration thereof, control is performed according to the similarities/differences of categories on whether a destination will be selected as a branch point.

Incidentally, in the present system, the processes involving performing route search from a plurality of inputted destinations and up to the calculation of branch point candidates are the same as the above-described embodiment.

Figure 50:
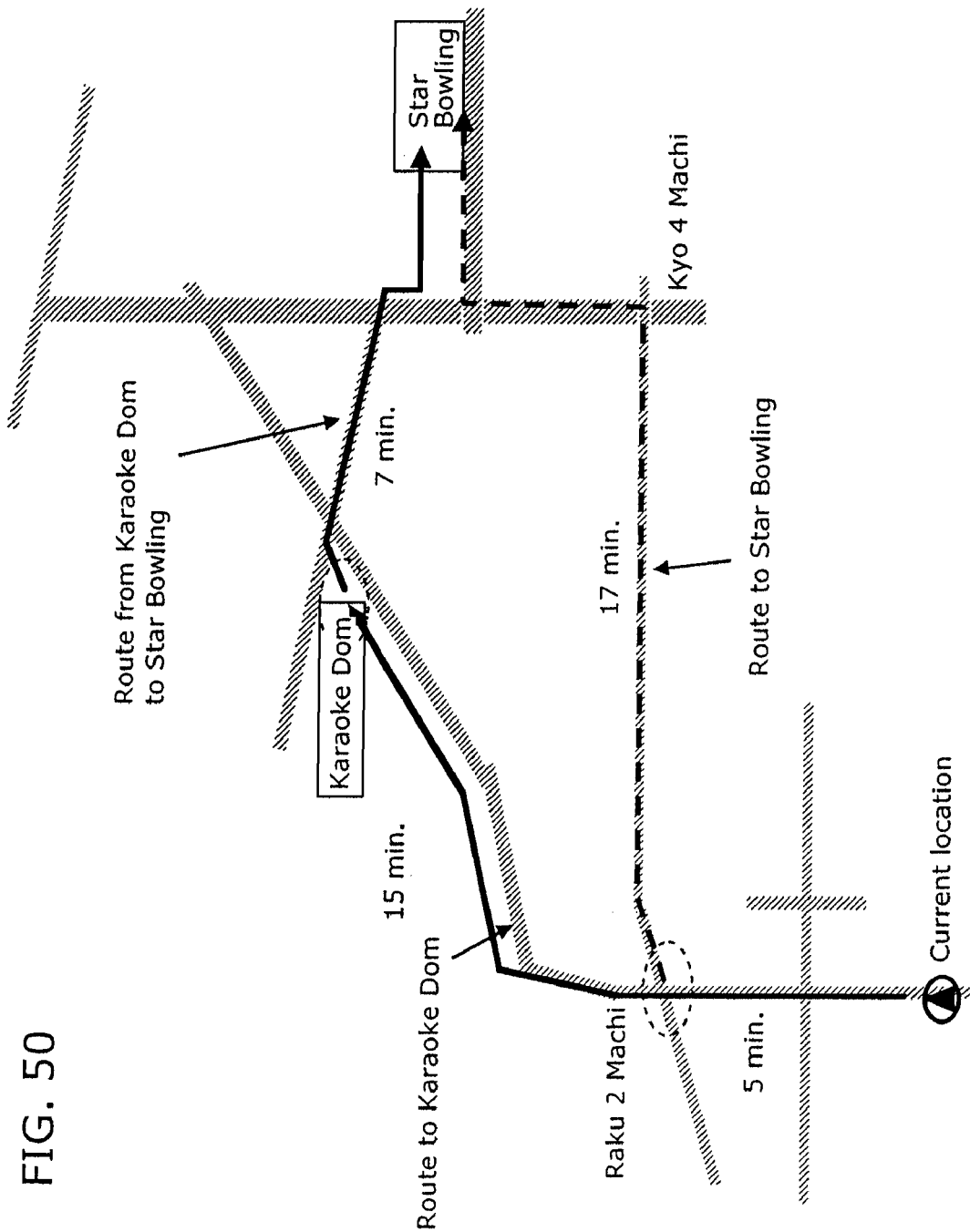
FIG. 50 is a diagram showing branch point selection according to the fourth embodiment.

FIG. 50 is a diagram showing searched routes and branch point candidates. "Karaoke Dom" and "Star Bowling" are inputted to the multiple destination input unit 1004, and a route to "Karaoke Dom" is searched for by the route search unit 1005.

In addition, branch point candidates are calculated by the branch point candidate calculation unit 1021, and routes from the respective branch point candidates to "Star Bowling" are searched by the branch point route search unit 1025. For instance, assume that two routes are searched out, namely, a route that turns right at the intersection of "Raku 2 Machi" and heads straight for "Star Bowling", and a route that proceeds to "Star Bowling" via "Karaoke Dom". At this point, while routes is compared by the route comparison unit 1026 and an optimum branch point is selected by the branch point selection unit 1022, in the present example, control is further performed according to categories of destinations.

In the present example, it is assumed that the category of "Karaoke Dom" is karaoke, and the category of "Star Bowling" is bowling. In this case, since the categories differ, "Karaoke Dom" is selected as a branch point or, in other words, selected as an intermediate point, and route display is performed. When categories differ as described, there may be cases where the user desires to visit both "Karaoke Dom" and "Star Bowling", and is selecting which destination to head for first. Providing route information by selecting one of the destinations as a branch point or, in other words, an intermediate point enables safe driving while considering conditions of traffic congestions and the like without cumbersome operations.

Figure 51:
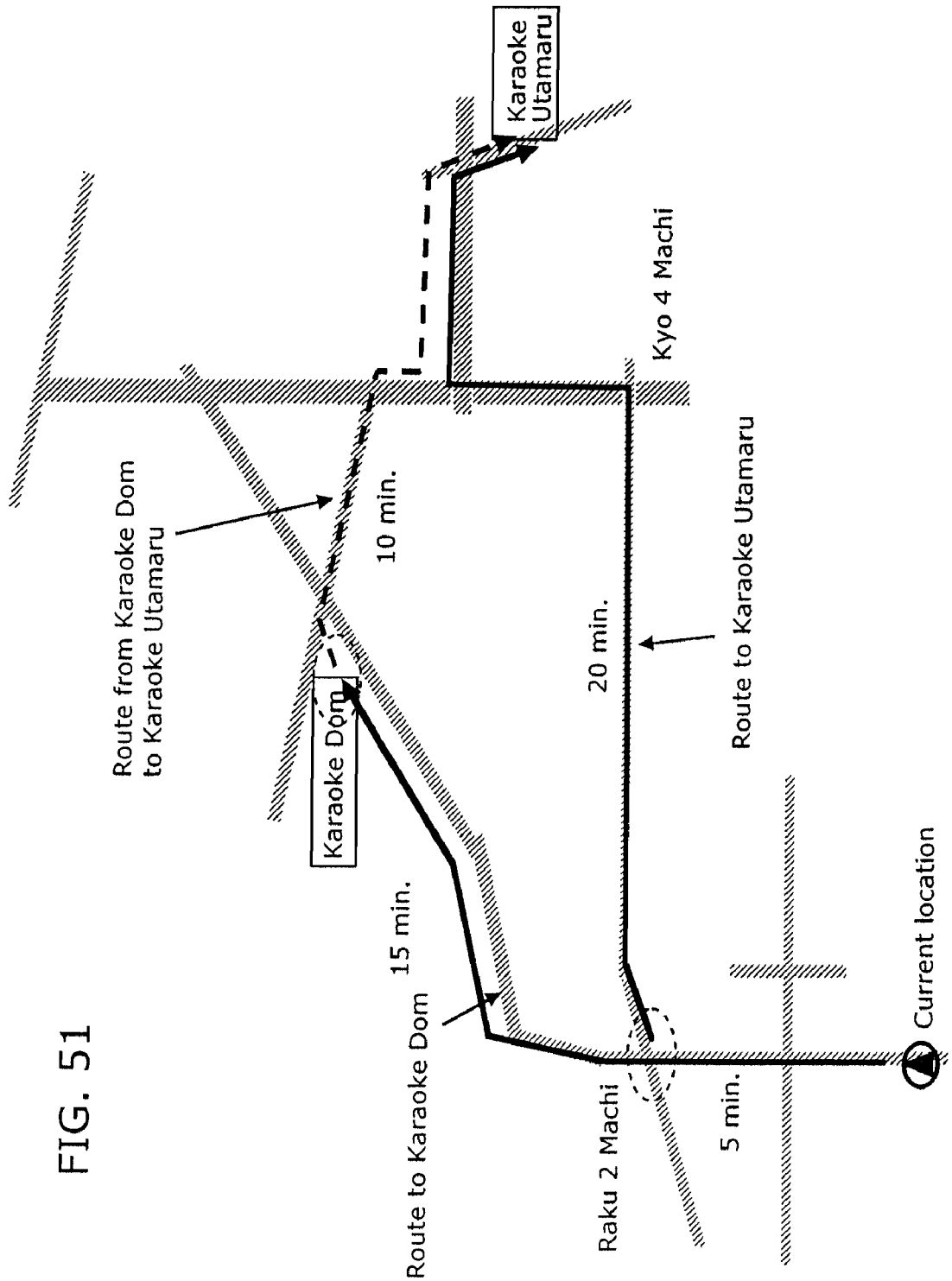
FIG. 51 is a diagram showing branch point selection according to the fourth embodiment.

FIG. 51 is a diagram showing a case where destinations falling under different categories are inputted. "Karaoke Dom" and "Karaoke Utamaru" are inputted to the multiple destination input unit 1004, and a route to "Karaoke Dom" is searched for by the route search unit 1005. In addition, branch point candidates are calculated by the branch point candidate calculation unit 1021, and routes from the respective branch point candidates to "Karaoke Utamaru" are searched by the branch point route search unit 1025. For instance, assume that two routes are searched out, namely, a route that turns right at the intersection of "Raku 2 Machi" and heads straight for "Karaoke Utamaru", and a route that proceeds to "Karaoke Utamaru" via "Karaoke Dom".

Since both of these destinations fall under the category of karaoke, the route that uses "Karaoke Dom" as a branch point or, in other words, the route via "Karaoke Dom" is not selected. Therefore, the intersection of "Raku 2 Machi" is selected as the branch point, and the route that proceeds straight through and heads for "Karaoke Dom" and the route that turns right and heads for "Karaoke Utamaru" is displayed.

As seen, when the categories are the same, the user rarely desires to ultimately head for both karaokes, and it is conceivable that the user has selected either one of the karaokes in order to, for instance, avoid congestion, and is on route. Therefore, when the categories are the same, instead of selecting a route that uses one of the destinations as a branch point, an optimum branch point may be arranged to be selected in consideration of time and the like, as shown in the above-described embodiment.

Furthermore, it is also possible to perform control as to whether one of the destinations is selected as an intermediate point for the other according to category types. A description will now be provided with reference to FIGS. 52, 53 and 54.

Figure 52:
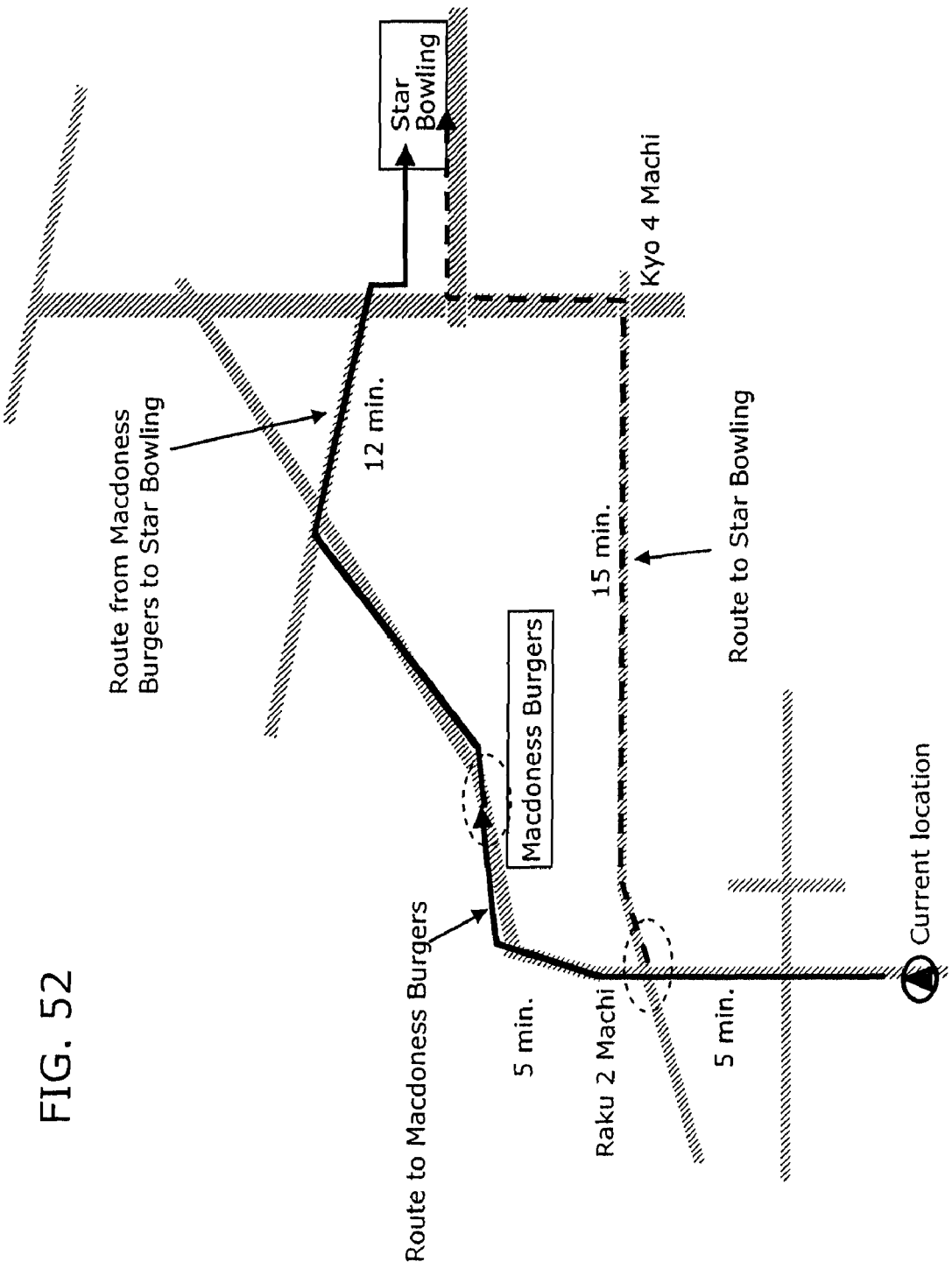
FIG. 52 is a diagram showing branch point selection according to the fourth embodiment.

FIG. 52 is a diagram describing selection of branch point candidates. In FIG. 52, "Star Bowling" and "Macdoness Burgers" are inputted as a plurality of destinations. In addition, a route to "Macdoness Burgers", as well as routes from the respective branch point candidates to "Star Bowling" are searched out. Assume that, for instance, two routes are searched out, namely, a route that turns right at the intersection of "Raku 2 Machi" and heads straight for "Star Bowling", and a route that proceeds to "Star Bowling" via "Macdoness Burgers". In this case, "Macdoness Burgers" falls under the category of fastfood.

Generally, fastfood restaurants such as "Macdoness Burgers" are places where refreshments are taken and where people generally do not stay long. Fastfood restaurants are also provided with drive-throughs and the like, and are positions where business may be concluded in a relatively short period of time before moving on. Assume that, for instance, the user of the present example ultimately heads for "Star Bowling", but intends to stop by "Macdoness Burgers" if time permits, and is attempting to make a determination according to traffic conditions. Assume also that the plurality of destinations has been inputted.

As described above, with a destination having a relatively short duration of stay, the user often travels to a new location after visiting the destination. Therefore, it is desirable to search for routes using one of the destinations as a branch point or, in other words, an intermediate point, while taking time into consideration. In this light, judgment may be made on whether a destination is to be used as an intermediate point to another location depending on, for instance, the categories of the inputted destinations. For instance, route search may be performed by using a destination with a relatively short duration of stay as an intermediate point, while a destination with a relatively long duration of stay is not selected as an intermediate point.

For instance, the destination category judgment unit 1028 may be arranged to accumulate categories as well as information indicating general duration of stay at destinations falling under the categories. In this case, the destination category judgment unit 1028 is an example of a destination duration judgment unit as described in the claims. Then, according to the obtained duration of stay, judgment is made on whether one of the destinations is to be used as an intermediate point for the other destination, and a branch point is selected by the branch point selection unit 1022.

FIG. 53 is a diagram showing information indicating a relationship between categories and durations of stay. Durations of stay at destinations falling under the respective categories are shown, with 15 minutes for fastfood, 1 hour for a restaurant, 2 hours for a movie theater, and 1 hour for bowling. For instance, a branch point may be accurately calculated from branch point candidates by judging a duration of stay based on these categories of destinations and calculating route costs by adding durations of stay.

For instance, in FIG. 53, it is shown that the required time to "Star Bowling" is 20 minutes (=5 min.+15 min.). On the other hand, the required time is 22 minutes (=5 min.+5 min.+ 12 min.) when traveling via "Macdoness Burgers" and 37 minutes (=22 min.+15 min.) when a duration of stay of 15 minutes at "Macdoness Burgers" is added. This means that it is possible to proceed to "Star Bowling" in a relatively short period of time even when traveling via "Macdoness Burgers". At this point, as shown in the above-described embodiment, judgment may be made on whether a destination is to be selected as a intermediate point by judging whether a predetermined range is exceeded, such as whether the overtime equals or exceeds 1 hour.

Figure 54:
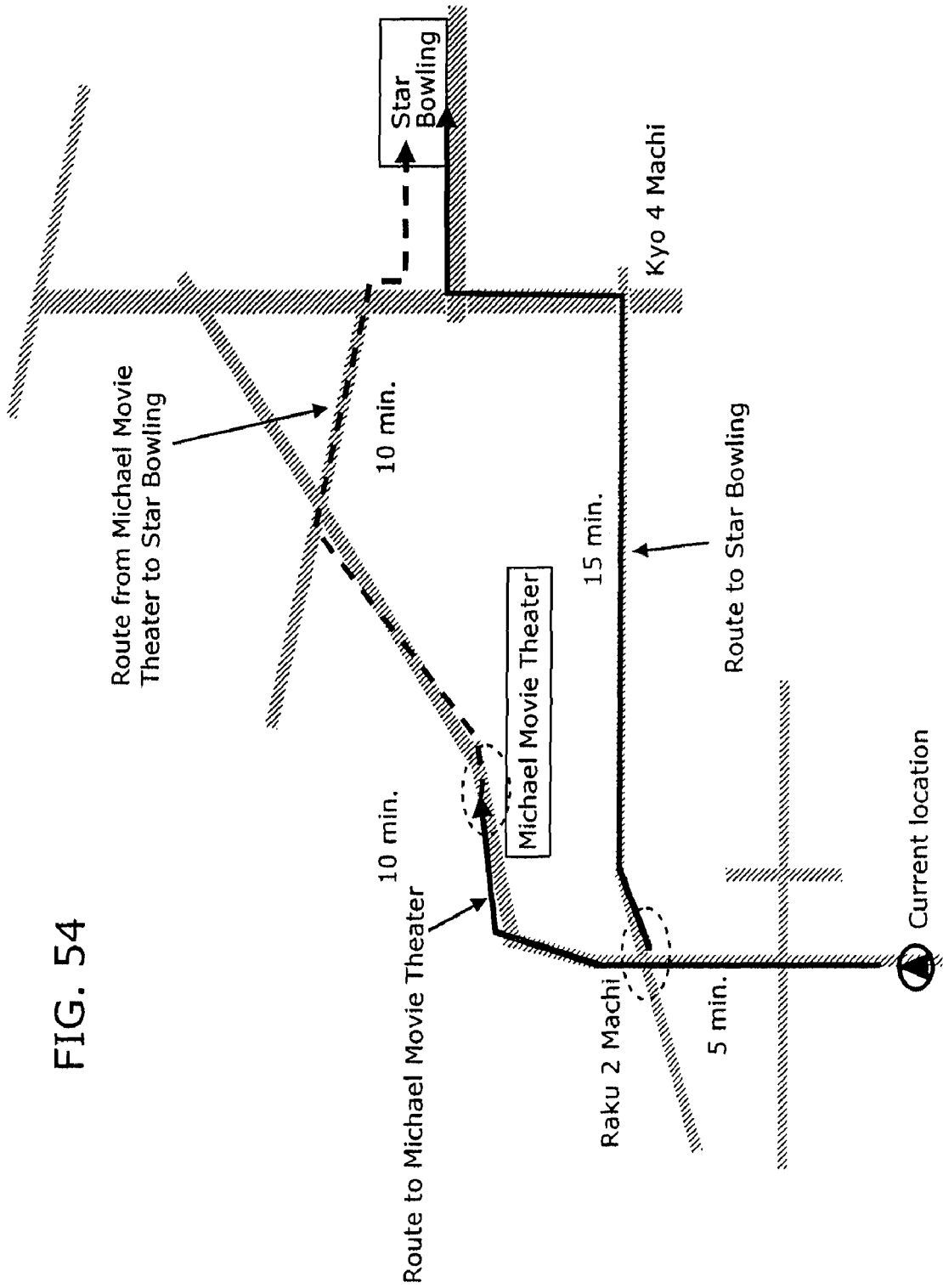
FIG. 54 is a diagram showing branch point selection according to the fourth embodiment.

Similar to FIG. 53, FIG. 54 is a diagram describing control of intermediate point selection according to category. In FIG. 54, "Star Bowling" and "Michael Movie Theater" are inputted as a plurality of destinations. In addition, a route to "Michael Movie Theater", a route that turns right at the intersection of "Raku 2 Machi" and heads straight for "Star Bowling", and a route via "Michael Movie Theater" are searched for. In this case, it is shown that the category of "Michael Movie Theater" is movie theater, and a duration of stay of 2 hours is shown in FIG. 53.

At this point, by calculating a required time for each route, it is shown that the required time to "Star Bowling" is 20 minutes (=5 min.+15 min.). On the other hand, the required time when traveling via "Michael Movie Theater" is 25 minutes (=5 min.+10 min.+10 min.), and the required time is 1 hour 25 minutes (=1 hour+25 min.) when adding a duration of stay of 1 hour at "Michael Movie Theater". In other words, traveling via "Michael Movie Theater" results in a considerable delay in comparison to the required time when heading straight for "Star Bowling".

As seen, when final destinations are inputted in which durations of stay at one of the destinations is conceivably long, it is difficult to envisage that the plurality of final destinations was simultaneously inputted in order to stop by at one of the final destinations before heading for the other final destination, and it is often desirable to assess that the input was made in order to select either one. Accordingly, determination of intermediate point selection may be performed by referencing destination categories, as shown in the present example.

In addition, there are cases where judgment on whether one of the two destination becomes an intermediate point for the other destination or whether one of the two destinations becomes the destination may be made based on the past behavior of the user. In consideration thereof, the travel history of the user may be accumulated as shown in the above-described embodiment, whereby control may be performed using the travel history. The travel history of the user may be accumulated by, for instance, adding the travel history accumulation unit 1101 shown in FIG. 17 to the configuration shown in FIG. 49.

FIG. 55 is a diagram showing accumulated travel histories. Similar to the travel histories shown in FIG. 18, travel histories accumulated in association with driving by the user is shown. For instance, as a travel history ID "01", a history has been accumulated in which the user had left home at 9:40 on Sep. 10, 2006, and arrived at a final destination, "Macdoness Burgers", at 10:00 on the same day. In addition, as a travel history ID "02", a history has been accumulated in which the user had left "Macdoness Burgers" at 10:18 on the same day, and arrived at a final destination, "Star Bowling", at 10:41 on the same day.

From these travel histories, it is found that the user had previously left home to first visit "Macdoness Burgers", and subsequently proceeded to "Star Bowling". As seen, in a case where the user has previously first traveled to one final destination as an intermediate point and subsequently headed for another destination, it is conceivable that the user will now show similar behavior. Therefore, control of whether to use a destination as an intermediate point may be made in consideration of continuity of travel according to travel history.

Incidentally, control of whether a route to the other destination is to be searched for once again after passing the branch point may be performed according to a category. Passing a selected branch point means that one of the destinations has been selected, and the other had not been selected. Therefore, automatic deletion may be performed without once again searching for a route to the other destination that has not been selected. A description will now be provided with reference to the drawings.

Figure 56:
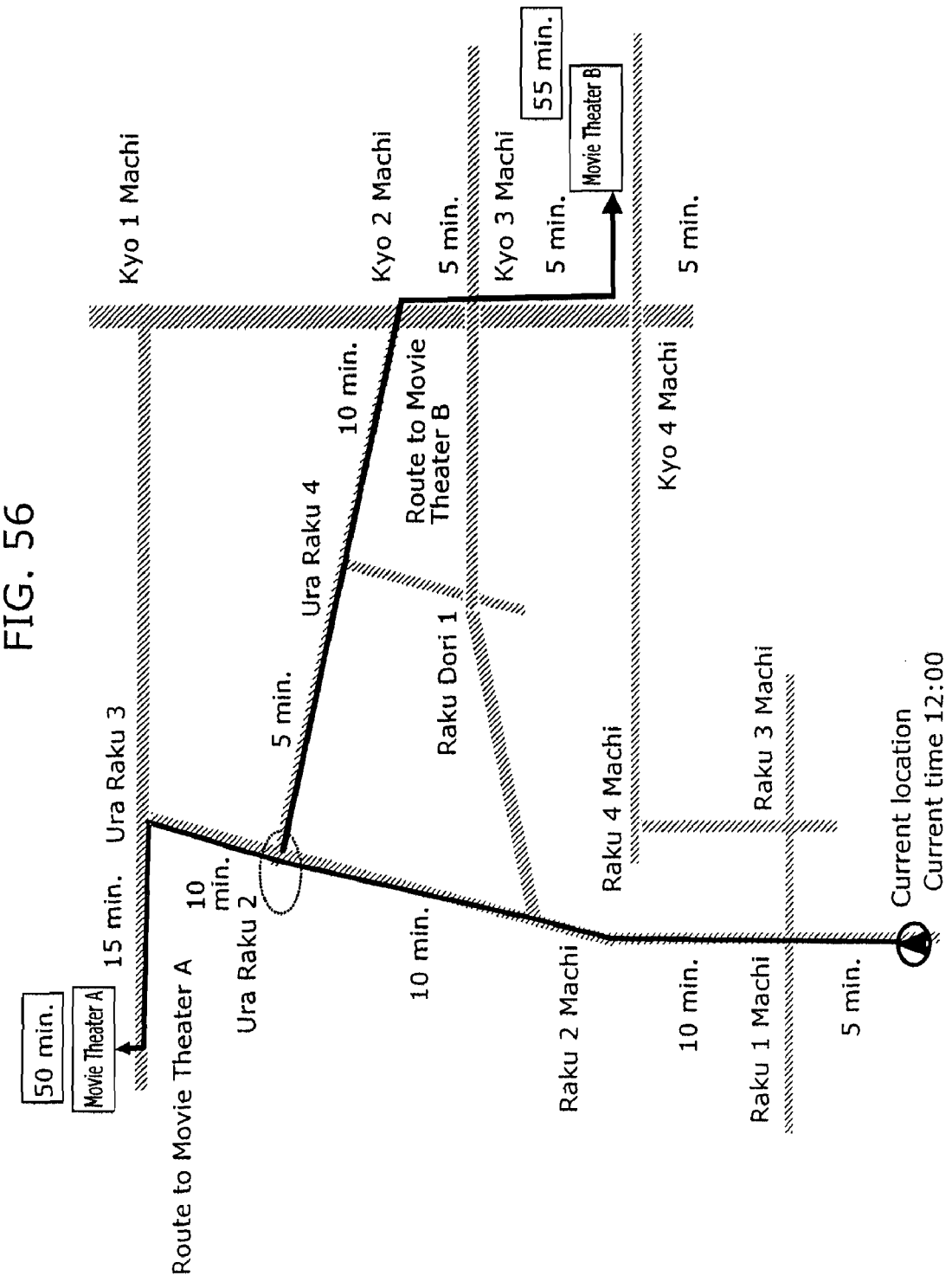
FIG. 56 is a diagram showing branch point selection according to the fourth embodiment.

FIG. 56 is a diagram describing route search after passing a branch point. Similar to FIGS. 41, 45 and the like, for FIG. 56, a plurality of destinations, namely, "Movie Theater A" and "Movie Theater B", have been inputted, the intersection of "Ura Raku 2" has been selected as the branch point from branch point candidates, and a route to "Movie Theater A" and a route to "Movie Theater B" which branches at the intersection of "Ura Raku 2" are shown. As described above, this enables driving while contrasting the arrival time at "Movie Theater A" with the arrival time at "Movie Theater B" without cumbersome operations.

Figure 57:
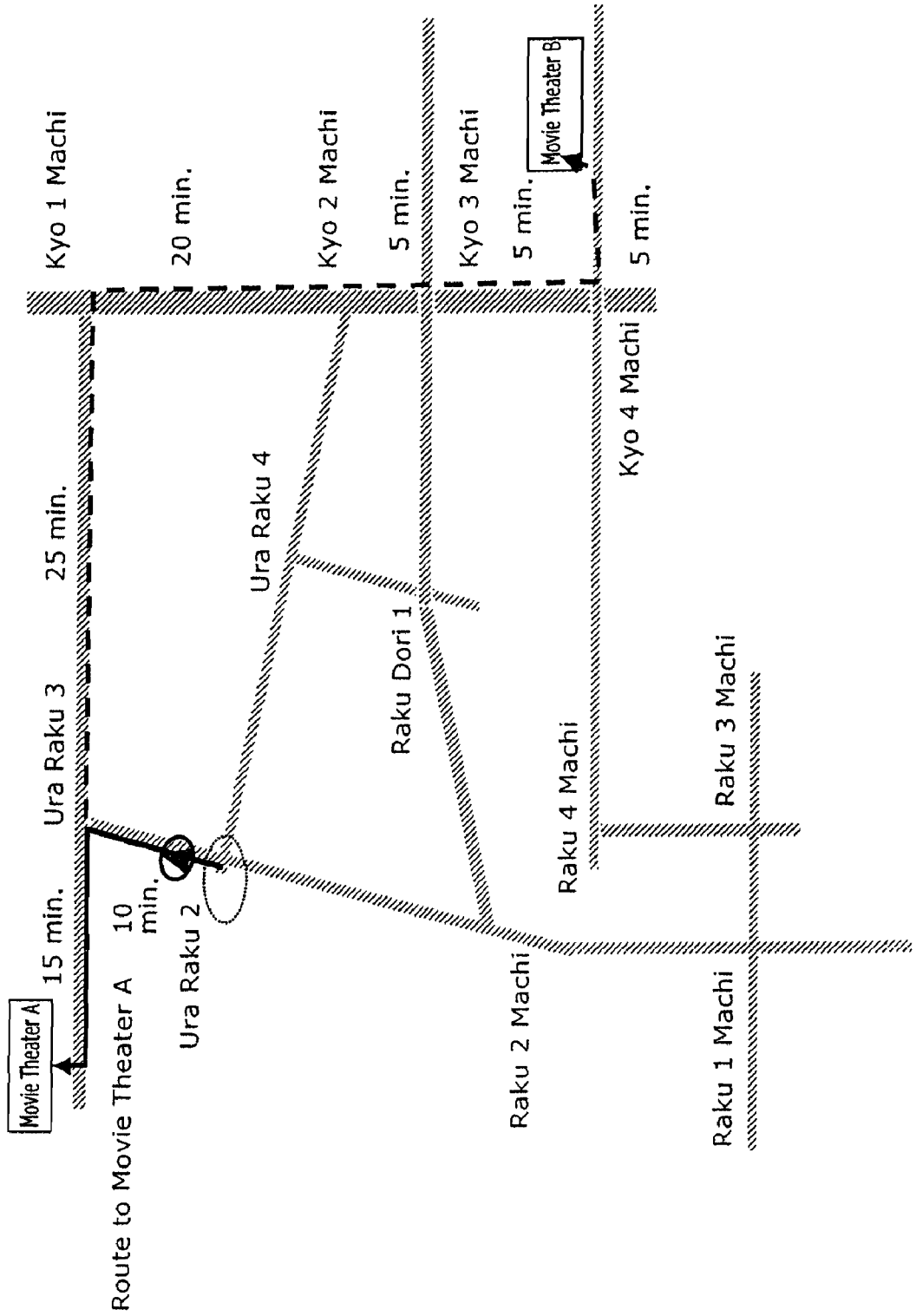
FIG. 57 is a diagram showing branch point selection according to the fourth embodiment.

On the other hand, FIG. 57 is a diagram showing a situation where the user has passed the intersection of "Ura Raku 2" that is a branch point. In this case, passing and proceeding straight through the intersection of "Ura Raku 2" means that the user has ultimately selected "Movie Theater A". With a conventional car navigation system or the like which, generally, subsequently continues to search for routes to the inputted destinations, routes to "Movie Theater B" is to be searched once again. In other words, in the present example, even after passing the intersection of "Ura Raku 2", since it is possible to trace the route indicated by the dotted line which turns right at the intersection of "Ura Raku 3" and heads for "Movie Theater B", a conventional car navigation system will once again search for and display the route indicated by the dotted line.

However, since passing a calculated branch point as shown in the present invention and selecting one of the routes means that the other destination was not selected, once again searching for routes to the other destination as described above even in such a case result in providing unnecessary information, and is undesirable from the perspective of driving.

Therefore, after passing a branch point, it is preferable to perform automatic deletion of a route without once again searching for a route to the other destination. For instance, in the case of the present example, it is assumed that routes to "Movie Theater B" is not to be searched after proceeding straight through and passing the intersection of "Ura Raku 2" that is the branch point.

In addition, for such deletions of routes, it is also possible to use similarities/differences of categories of destinations which have been described above. For instance, when destinations falling under the same category, such as a movie theater, are inputted, the user intends to ultimately head for only one of the destinations. Therefore, when the category is the same, the above-described deletion of routes after passing a branch point may be performed.

Figure 58:
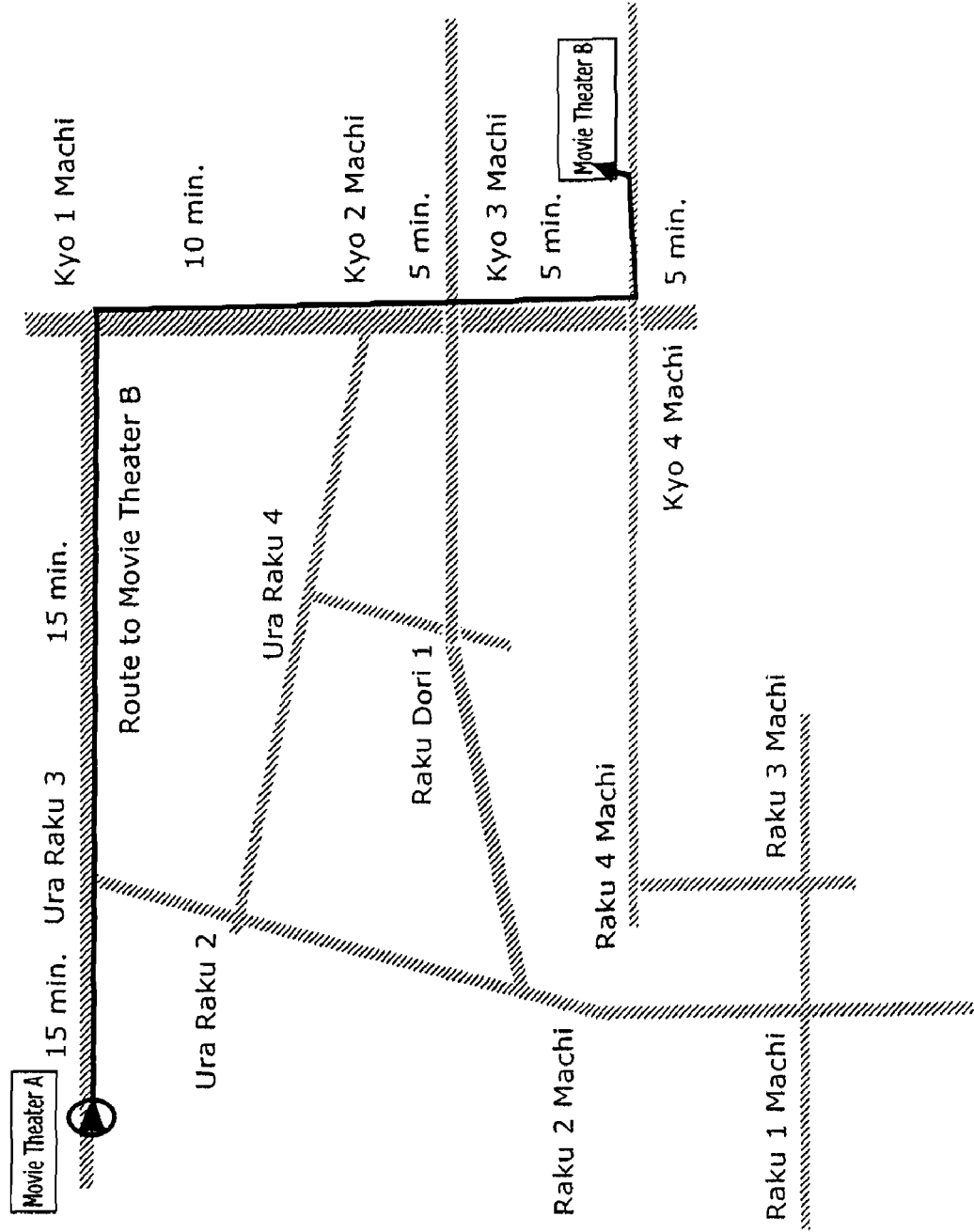
FIG. 58 is a diagram showing branch point selection according to the fourth embodiment.

Furthermore, for such deletions of routes, it is also possible to use durations of stay with respect to categories of destinations. For instance, FIG. 58 is a diagram showing a case where the user recommences traveling after heading for "Movie Theater A". Assume that the user, who has proceeded straight through the intersection of "Ura Raku 2" and selected "Movie Theater A" in FIG. 57, subsequently arrives at "Movie Theater A", and recommences traveling immediately afterwards.

At this point, by referencing the duration of stays related to categories of destinations shown in FIG. 53, the duration of stay for a movie theater is shown as 2 hours. Nevertheless, when the actual duration of stay for the user at a destination is, for instance, around 10 minutes, which is shorter than the duration of stay related to the category of the destination, it is conceivable that the user recommences traveling because the original purpose cannot be achieved since, for instance, the movie theater is full. Therefore, in a case where the duration of stay is shorter than the average duration of stay of 2 hours, a route to the other destination among the inputted plurality of destinations or, in other words, "Movie Theater B", may be once again searched for and displayed. In FIG. 58, a route from "Movie Theater A" to "Movie Theater B" is searched out.

On the other hand, if the duration of stay is 2 hours or more, it is determined that the purpose has been achieved and a route to "Movie Theater B" is not to be searched. In this manner, by controlling route information for a plurality of destinations in consideration of durations of stay related to the categories of destinations, information that better reflects the behavior objectives of the user may be provided without having to perform cumbersome operations, and comfortable and safe driving may be supported.

Incidentally, so far, it has been described that branch points are calculated from map information accumulated in the map information accumulation unit 1003, using points (nodes) such as intersections and landmarks as candidates thereof. Generally, nodal information based on units of intersections or landmarks are accumulated in the map information, and route search is generally performed based on temporal costs which accrue between these nodes. In addition, with car navigation systems, since the points at which routes branch are generally intersections, it is shown that a branch point may be obtained by searching for a sequence of nodes such as intersections as routes and calculating a branch point.

However, when presenting the user who is on route with information related to a branch point, there may be cases where presenting the information at the branch point will be too late. For instance, when an intersection provided with a right-turn lane and a straight through lane is calculated as a branch point, the actual point where a branching action may be taken is not the intersection but the point where the right-turn lane and the straight through lane begin.

In this case, the point at which information related to the branch point should be provided to the user is not the calculated branch point, but the point where the right-turn lane and the straight through lane provided at the intersection begin. In consideration thereof, the location of a branch point may be corrected using not only nodes such as intersections, but also using information related to traffic regulations of the route, such as left-turn and right-turn lanes. A description will now be provided with reference to the drawings.

Figure 59:
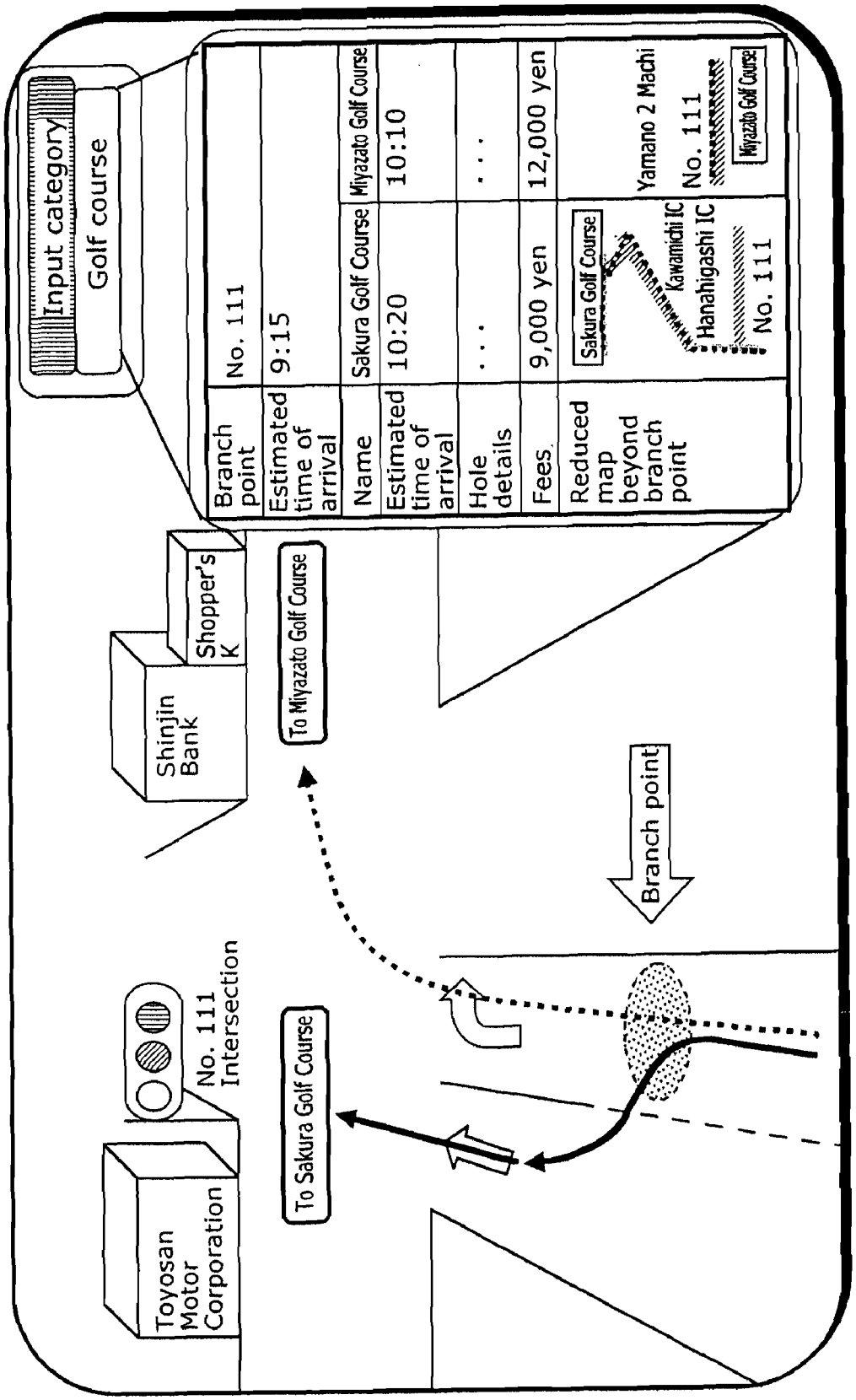
FIG. 59 is a diagram showing branch point selection according to the fourth embodiment.

FIG. 59 is a diagram describing branch point calculation using traffic regulations. Similar to FIG. 23, for FIG. 59, "Sakura Golf Course" and "Miyazato Golf Course" are inputted as destinations. In addition, as a result of a route search using intersections and the like as nodes, the intersection of "No. 111" is calculated as a branch point. The user proceeds straight through the intersection of "No. 111" when heading for "Sakura Golf Course", and turns right at the intersection of "No. 111" when heading for "Miyazato Golf Course".

In this case, although the branch point on the route is the intersection of "No. 111", assume that the straight through lane shown at the left-hand side of the screen must be taken when heading for "Sakura Golf Course", and the right-turn lane shown towards the center must be taken when heading for "Miyazato Golf Course". In such a case, simply providing information at the intersection of "No. 111" that is the branch point on the route will be too late for changing lanes, and is therefore inappropriate.

For instance, assume that the user has been and is traveling in the right-turn lane. Then, when deciding to ultimately head for "Sakura Golf Course" after considering information such as fees or arrival times, it is necessary to change lanes to the straight through lane at the left-hand side. However, notifying such information at the intersection of "No. 111" can possibly induce a forced lane change, and is therefore dangerous.

In this light, it is desirable to accumulate, for instance, information related to the traffic regulations of the routes such as configurations of left-turn and right-turn lanes at intersections together with the above-described map information in the map information accumulation unit 1003, and correct the branch point at a point at which the user will actually take a branching action by referencing such information. In this case, the map information accumulation unit 1003 is an example of a traffic regulation accumulation unit as described in the claims.

As in the present example, when a right-turn lane and a straight through lane are provided and lanes to be taken differ according to the destinations, it is now possible to provide information in a safer manner by correcting the branch point to the point where the lanes begin and providing information based on the corrected branch point.

In addition, while a description is provided using left-turn and right-turn lanes, in a case where, for instance, an expressway and an ordinary road becomes a branch point, the branch point of action becomes before a lane for entering the expressway. Furthermore, as shown in the above-described embodiment, usual travel histories may be accumulated in advance, and when, for instance, the user is uncomfortable with narrow roads or the like or is a novice driver, a point that is further in front or an immediately previous intersection or the like of the calculated branch point may be calculated as a branch point. As a result, it is now possible to calculate a branch point in consideration of the driving characteristics of the driver.

The present invention may be utilized as a route information display device that is installed in, for instance, a car navigation device or a mobile terminal, and which enables easier comprehension of information by considering branch points of routes to a plurality of destinations.

The invention claimed is:

1. A route information display device comprising:
a multiple destination input unit operable to accept input of a plurality of different destination and categories for each of the different destination;
a route search unit configured to search for and set as a travel route, a route from a departure point to a first destination among the different destinations;
a branch point candidate calculation unit configured to calculate, after the route is set by the route search unit, a plurality of branch point candidates located on the set route and including at least the first destination;
a branch point route search unit configured to search for a plurality of branch points routes from each of the plurality of branch point candidates to a second destination that is other than the first destination among the different destinations;
a destination category judgment unit configured to judge whether a category of the first destination and a category of the second destination are in a same category or a different category;
a branch point selection unit configured to select, as branch point to the second destination, a branch point candidate other than the first destination when it is judged that the category of the first destination as the branch point to the second destination are the same category, and to select the first destination as the branch point to the second destination when it is judged that the category of the first destination and the category of the second destination are different categories; and
a route information display unit configured to display a route to the first destination and a branch point route from the selected branch point candidate to the second destination,
wherein the destination category judgment unit is configured to store information indicating a category and a general duration of stay at a destination belonging to the category, and the branch point selection unit is configured to select, as the branch point to the second destination, the branch point candidate that is other than the first destination, when an overtime is equal to or above a predetermined threshold, and to select the first destination as the branch point to the second destination when the overtime is below the predetermined threshold, the overtime being obtained by subtracting: (i) an amount of time required by a route that branches at the branch point candidate other than the first destination and leads to the second destination, from (ii) an amount of time obtained by adding the general duration of stay stored in the destination category judgment unit for the category of the first destination to an amount of time required by a route that leads to the second destination via the first destination.

2. A route information display method performed by a route information display device including a multiple destination input unit, a route search unit, a branch point candidate calculation unit, a branch point route search unit, a destination category judgment unit, a branch point selection unit, and a route information display unit, the route information display method comprising:
accepting, by the multiple destination input unit, an input of a plurality of different destination and categories for each of the different destinations;
searching for and setting as a travel route, by the route search unit, a route from a departure point to a first destination among the different destinations;
calculating, by the branch point candidate calculation unit, after the route is set, a plurality of branch point candidates located on the set route and including at least the first destination;
searching, by the branch point search unit, for a plurality of branch point routes from each of the plurality of branch point candidates to second destination that is other than the first destination among the different destinations;
judging, by the destination category judgment unit, whether a category of the first destination and a category of the second destination are a same category or a different category;
selecting, by the branch point selection unit, as a branch point to the second destination, a branch point candidate other than the first destination when it is judged that category of the first destination and the category of the second destination are the same category, and selecting the first destination and the category of the branch point to the second destination when it is judged that the category of the first destination and the category of the second destination are different categories; and
displaying, by the route information display unit, a route to the first destination and a branch point route from the selected branch point candidate to the second destination,
wherein the route information display method further comprises:
obtaining, by the destination category judgment unit, a general duration of stay at a destination belonging to the category of the first destination, and
selecting, by the branch point selection unit, as the branch point to the second destination, the branch point candidate that is other than the first destination, when an overtime is equal to or above a predetermined threshold, and selecting the first destination as the branch point to the second destination when the overtime is below the predetermined threshold. the overtime being obtained by subtracting: (i) an amount of time required by a route that branches at the branch point candidate other than the first destination and leads to the second destination, from (ii) an amount of time obtained by adding the general duration of stay stored in the destination category judgment unit for the category of the first destination to an amount of time required by a route that leads to the second destination via the first destination.

3. A non-transitory computer-readable recording medium storing a program that causes a computer to perform:

accepting an input of a plurality of different destinations and categories for each of the different destinations:

searching for and setting as a travel route, a route from a departure point to a first destination among the different destinations;

calculating, after the route is set, a plurality of branch point candidates located on the set route and including at least the first destination;

searching for a plurality of branch point routes from each of the plurality of branch point candidates to a second destination that is other than the first destination among the different destinations;

judging whether a category of the first destination and a category of the second destination are a same category or a different category;

selecting, as a branch point to the second destination, a branch point candidate other than the first destination when it is judged that the category of the first destination and the category of the second destination are the same category, and selecting the first destination as the branch point the second destination when it is judged that the category of the first destination and the category of the second destination are different categories; and displaying a route to the first destination and a branch point route from the selected branch point candidate to the second destination, wherein the program causes the computer to further perform steps comprising:

obtaining, a general duration of stay at a destination belonging to the category of the first destination, and selecting, as the branch point to the second destination, the branch point candidate that is other than the first destination, when an overtime is equal to or above a predetermined threshold, and selecting the first destination as the branch point to the second destination when the overtime is below the predetermined threshold, the overtime being obtained by subtracting: (i) an amount of time required by a route that branches at the branch point candidate other than the first destination and leads to the second destination, from (ii) an amount of time obtained by adding the general duration of stay stored in the destination category judgment unit for the category of the first destination to an amount of time required by a route that leads to the second destination via the first destination.

* * * * *